US006990867B2

(12) United States Patent
Okada

(10) Patent No.: US 6,990,867 B2
(45) Date of Patent: Jan. 31, 2006

(54) FORCE DETECTION DEVICE

(75) Inventor: Kazuhiro Okada, Ageo (JP)

(73) Assignee: Wacoh Corporation, Ageo (JP)

( * ) Notice: Subject to any disclaimer, the term of this patent is extended or adjusted under 35 U.S.C. 154(b) by 0 days.

(21) Appl. No.: 10/799,381

(22) Filed: Mar. 12, 2004

(65) Prior Publication Data

US 2004/0187593 A1 Sep. 30, 2004

(30) Foreign Application Priority Data

Mar. 31, 2003 (JP) ............................ 2003-096168

(51) Int. Cl.
*G01B 7/16* (2006.01)
*G01L 1/00* (2006.01)

(52) U.S. Cl. ........................................................ 73/780

(58) Field of Classification Search .................. 73/841, 73/514.32, 862.43, 862.043, 514.16, 780; 324/681

See application file for complete search history.

(56) References Cited

U.S. PATENT DOCUMENTS

| | | | | |
|---|---|---|---|---|
| 4,905,523 | A | 3/1990 | Okada | 73/862.04 |
| 4,967,605 | A | 11/1990 | Okada | 73/862.04 |
| 4,969,366 | A | 11/1990 | Okada | 73/862.08 |
| 5,014,415 | A | 5/1991 | Okada | 29/621.1 |
| 5,035,148 | A | 7/1991 | Okada | 73/862.04 |
| 5,092,645 | A | 3/1992 | Okada | 294/86.4 |
| 5,182,515 | A | 1/1993 | Okada | 324/259 |
| 5,263,375 | A | 11/1993 | Okada | 73/862.042 |
| 5,295,386 | A | 3/1994 | Okada | 73/1 D |
| 5,343,765 | A | 9/1994 | Okada | 73/862.043 |

(Continued)

FOREIGN PATENT DOCUMENTS

| | | |
|---|---|---|
| EP | 1 134 811 | 9/2001 |

(Continued)

OTHER PUBLICATIONS

Minami, T., "Transparent and conductive multicomponent oxide...", Journal of Vacuum Science and Technology, vol. 17, No. 4, Jul. 1999, pp. 1765-1772.

(Continued)

*Primary Examiner*—Max Noori
*Assistant Examiner*—Octavia Davis
(74) *Attorney, Agent, or Firm*—Ladas & Parry LLP

(57) ABSTRACT

Forces and moments are detected in a distinguished manner by a simple structure. An outer box-like structure formed of a metal is set on top of an insulating substrate and an insulating inner box-like structure is contained in the interior. Five electrodes E1 to E5 are positioned on a top plate of the inner box-like structure. Four electrodes E6 to E9 are positioned on the four side surfaces of the inner box-like structure. Capacitance elements C1 to C5 are arranged by electrodes E1 to E5 and a top plate of the outer box-like structure and capacitance elements C6 to C9 are arranged by electrodes E6 to E9 and side plates of the outer box-like structure. A force Fx in the X-axis direction is detected by means of the capacitance difference between C6 and C7, a force Fy in the Y-axis direction is detected by means of the capacitance difference between C8 and C9, a force Fz in the Z-axis direction is detected by means of the capacitance of C5, a moment My about the Y-axis is detected by means of the capacitance difference between C1 and C2, and a moment Mx about the X-axis is detected by means of the capacitance difference between C3 and C4.

25 Claims, 27 Drawing Sheets

U.S. PATENT DOCUMENTS

| | | | | |
|---|---|---|---|---|
| 5,365,799 | A | 11/1994 | Okada | 73/862.041 |
| 5,392,658 | A | 2/1995 | Okada | 73/862.043 |
| 5,406,848 | A | 4/1995 | Okada | 73/517 R |
| 5,421,213 | A | 6/1995 | Okada | 73/862.043 |
| 5,437,196 | A | 8/1995 | Okada | 73/862.043 |
| 5,492,020 | A | 2/1996 | Okada | 73/862.626 |
| 5,497,668 | A | 3/1996 | Okada | 73/862.626 |
| 5,531,002 | A | 7/1996 | Okada | 29/25.41 |
| 5,531,092 | A | 7/1996 | Okada | 73/1 D |
| 5,571,972 | A | 11/1996 | Okada | 73/862.043 |
| 5,639,973 | A | 6/1997 | Okada | 73/862.043 |
| 5,646,346 | A | 7/1997 | Okada | 73/504.04 |
| 5,668,318 | A | 9/1997 | Okada | 73/504.11 |
| 5,675,086 | A * | 10/1997 | Kihara et al. | 73/718 |
| 5,682,000 | A | 10/1997 | Okada | 73/862.043 |
| 5,744,718 | A | 4/1998 | Okada | 73/514.33 |
| 5,744,864 | A | 4/1998 | Cillessen et al. | |
| 5,780,749 | A | 7/1998 | Okada | 73/862.043 |
| 5,811,693 | A | 9/1998 | Okada | 73/862.043 |
| 5,831,163 | A | 11/1998 | Okada | 73/504.12 |
| 5,850,040 | A | 12/1998 | Okada | 73/504.04 |
| 5,856,620 | A | 1/1999 | Okada | 73/514.32 |
| 5,962,787 | A | 10/1999 | Okada et al. | 73/514.32 |
| 5,987,985 | A | 11/1999 | Okada | 73/504.04 |
| 6,003,371 | A | 12/1999 | Okada | 73/504.02 |
| 6,053,057 | A | 4/2000 | Okada | 73/862.043 |
| 6,076,401 | A | 6/2000 | Okada | 73/504.12 |
| 6,098,461 | A | 8/2000 | Okada | 73/514.34 |
| 6,158,291 | A | 12/2000 | Okada | 73/862.043 |
| 6,159,761 | A | 12/2000 | Okada | 438/53 |
| 6,185,814 | B1 | 2/2001 | Okada | 29/621.1 |
| 6,205,856 | B1 | 3/2001 | Okada | 73/504.11 |
| 6,269,697 | B1 | 8/2001 | Okada | 73/504.02 |
| 6,282,956 | B1 | 9/2001 | Okada | 73/504.12 |
| 6,314,823 | B1 | 11/2001 | Okada | 73/862.043 |
| 6,367,326 | B1 | 4/2002 | Okada | 73/504.12 |
| 6,378,381 | B1 | 4/2002 | Okada et al. | 73/862.043 |
| 6,474,133 | B1 | 11/2002 | Okada | 73/1.38 |
| 6,477,903 | B2 | 11/2002 | Okada | 73/862.043 |
| 6,512,364 | B1 | 1/2003 | Okada | 324/158.1 |
| 6,530,283 | B2 | 3/2003 | Okada et al. | 73/780 |
| 6,716,253 | B2 | 4/2004 | Okada | 73/52 |
| 6,809,529 | B2 * | 10/2004 | Okada et al. | 324/681 |
| 2003/0047785 | A1 | 3/2003 | Kawasaki | |

FOREIGN PATENT DOCUMENTS

| | | |
|---|---|---|
| EP | 1 172 858 | 1/2002 |
| EP | 1 209 748 | 5/2002 |
| JP | 61-292029 | 12/1986 |
| JP | 5-215627 | 8/1993 |

OTHER PUBLICATIONS

Pantelides, S.T., “Electronic structure and properties of magnesium oxide”, Physical Review B, vol. 10, No. 12, Dec. 15, 1974, pp. 5203-5212.

Surpliance, N.A., “The electrical conductivity of calcium and strontium oxides”, Brit. J. Appl. Phys., vol. 17, 1966, pp. 175-180.

* cited by examiner

Fig.11

| | C1 | C2 | C3 | C4 | C5 | C6 | C7 | C8 | C9 |
|---|---|---|---|---|---|---|---|---|---|
| +Fx | 0 | 0 | 0 | 0 | 0 | − | + | 0 | 0 |
| −Fx | 0 | 0 | 0 | 0 | 0 | + | − | 0 | 0 |
| +Fy | 0 | 0 | 0 | 0 | 0 | 0 | 0 | − | + |
| −Fy | 0 | 0 | 0 | 0 | 0 | 0 | 0 | + | − |
| +Fz | − | − | − | − | − | 0 | 0 | 0 | 0 |
| −Fz | + | + | + | + | + | 0 | 0 | 0 | 0 |
| +Mx | 0 | 0 | − | + | 0 | 0 | 0 | 0 | 0 |
| −Mx | 0 | 0 | + | − | 0 | 0 | 0 | 0 | 0 |
| +My | + | − | 0 | 0 | 0 | 0 | 0 | 0 | 0 |
| −My | − | + | 0 | 0 | 0 | 0 | 0 | 0 | 0 |

Fig.12

$$
\begin{cases}
Fx = C7 - C6 \\
Fy = C9 - C8 \\
Fz = -C5 \\
\left( \begin{array}{l} \text{OR} \quad Fz = -(C1 + C2 + C3 + C4 + C5) \\ \text{OR} \quad Fz = -(C1 + C2 + C3 + C4) \end{array} \right) \\
Mx = C4 - C3 \\
My = C1 - C2
\end{cases}
$$

Fig.17

| | C1 | C2 | C3 | C4 | C5 | C6 | C7 | C8 | C9 |
|---|---|---|---|---|---|---|---|---|---|
| +Fx | 0 | 0 | 0 | 0 | 0 | − | + | 0 | 0 |
| −Fx | 0 | 0 | 0 | 0 | 0 | + | − | 0 | 0 |
| +Fy | 0 | 0 | 0 | 0 | 0 | 0 | 0 | − | + |
| −Fy | 0 | 0 | 0 | 0 | 0 | 0 | 0 | + | − |
| +Fz | − | − | − | − | − | 0 | 0 | 0 | 0 |
| −Fz | + | + | + | + | + | 0 | 0 | 0 | 0 |
| +Mx | 0 | 0 | − | + | 0 | 0 | 0 | 0 | 0 |
| −Mx | 0 | 0 | + | − | 0 | 0 | 0 | 0 | 0 |
| +My | + | − | 0 | 0 | 0 | 0 | 0 | 0 | 0 |
| −My | − | + | 0 | 0 | 0 | 0 | 0 | 0 | 0 |
| +Mz | + | + | + | + | 0 | 0 | 0 | 0 | 0 |
| −Mz | − | − | − | − | 0 | 0 | 0 | 0 | 0 |

Fig.18

$$
\begin{cases}
Fx = C7 - C6 \\
Fy = C9 - C8 \\
Fz = -C5 \\
\left( \begin{array}{l} \text{OR} \quad Fz = -(C1 + C2 + C3 + C4 + C5) \\ \text{OR} \quad Fz = -(C1 + C2 + C3 + C4) \end{array} \right) \\
Mx = C4 - C3 \\
My = C1 - C2 \\
Mz = C1 + C2 + C3 + C4 - f(Fz)
\end{cases}
$$

FORCE DETECTION DEVICE

BACKGROUND OF THE INVENTION

This invention concerns a force detection device, and particularly concerns a force detection device suited for measuring forces and moments independently.

Various types of force detection devices are used for controlling motions of robots and industrial machines. Compact force detection devices are also incorporated as man-machine interfaces of input devices for electronic equipment. In order to achieve size and cost reduction, a force detection device used in such an application is required to be as simple in structure as possible and is required to detect forces of the respective coordinate axes in three-dimensional space independently each other.

Multi-axis force detection devices that are presently used can be classified into two types, that is, a type, with which specific directional components of a force that acts on a three-dimensional structure are detected as displacements that arise at a specific part, and a type, with which the directional components are detected as mechanical strains that arise at a specific part. A capacitance element type force detection device is a representative device of the former displacement detection type, and with this device, a capacitance element is constituted by a pair of electrodes and the displacement arising at one of the electrodes due to an acting force is detected based on a static capacitance value of the capacitance element. Such a static capacitance type force detection device is disclosed, for example, in Japanese Unexamined Patent Application Publication No. 5-215627/1993. Meanwhile, a strain gauge type force detection device is a representative device of the latter strain detection type, and with this device, a mechanical strain that arises as a result of an acting force is detected as a change of gauge resistance or other form of electrical resistance. Such a strain gauge type force detection device is disclosed, for example, in Japanese Unexamined Patent Application Publication No. 61-292029/1986.

In general, the objects of detection by a force detection device are force components in the direction of predetermined coordinate axes and moment components about the predetermined coordinate axes. In the case where an XYZ three-dimensional coordinate system is defined in three-dimensional space, the objects of detection will be the six components of the force components Fx, Fy, and Fz in the directions of the respective coordinate axes and the moment components Mx, My, and Mz about the respective coordinate axes. However priorly, regardless of the displacement detection type or the strain detection type, a force detection device of a considerably complex three-dimensional structure was required to detect the respective components independent of each other.

SUMMARY OF THE INVENTION

Thus an object of this invention is to provide a force detection device that can detect forces and moments in a distinguished manner by means of a structure that is as simple as possible.

(1) The first feature of the invention resides in a force detection device comprising:

a base plate, having a top surface parallel to an XY plane in an XYZ three-dimensional coordinate system having an X-axis, a Y-axis and a X-axis;

a first displaceable plate, positioned along a plane intersecting a positive part of the X-axis and supported on the base plate in a displaceable manner;

a second displaceable plate, positioned along a plane intersecting a negative part of the X-axis and supported on the base plate in a displaceable manner;

a first fixed plate, positioned between the Z-axis and the first displaceable plate and fixed onto the base plate;

a second fixed plate, positioned between the Z-axis and the second displaceable plate and fixed onto the base plate;

a fixed top plate, positioned along a plane spanning across a vicinity of an upper edge of the first fixed plate and a vicinity of an upper edge of the second fixed plate;

a displaceable top plate, positioned above the fixed top plate, supported so as to be displaceable with respect to the base plate, and transmitting, to an upper edge of the first displaceable plate and an upper edge of the second displaceable plate, a force in a direction along the XY plane;

a force receiving member, positioned on the Z-axis above the displaceable top plate in order to receive a force that is to be detected;

a connecting member, positioned along the Z-axis in order to connect the force receiving member and the displaceable top plate;

a first X-axis distance sensor, detecting a distance between the first displaceable plate and the first fixed plate;

a second X-axis distance sensor, detecting a distance between the second displaceable plate and the second fixed plate;

an inclination degree sensor, detecting an inclination degree of the displaceable top plate with respect to the fixed top plate; and a detection processing unit, detecting a force Fx in the X-axis direction, acting on the force receiving member, based on a difference between a detection value of the first X-axis distance sensor and a detection value of the second X-axis distance sensor, and detecting a moment My about the Y-axis, acting on the force receiving member, based on a detection value of an inclination degree in relation to the X-axis direction that is detected by the inclination degree sensor.

(2) The second feature of the invention resides in a force detection device according to the first feature, further comprising:

a third displaceable plate, positioned along a plane intersecting a positive part of the Y-axis and supported on the base plate in a displaceable manner;

a fourth displaceable plate, positioned along a plane intersecting a negative part of the Y-axis and supported on the base plate in a displaceable manner;

a third fixed plate, positioned between the Z-axis and the third displaceable plate and fixed onto the base plate;

a fourth fixed plate, positioned between the Z-axis and the fourth displaceable plate and fixed onto the base plate;

a first Y-axis distance sensor, detecting a distance between the third displaceable plate and the third fixed plate; and a second Y-axis distance sensor, detecting a distance between the fourth displaceable plate and the fourth fixed plate; and wherein the detection processing unit detects a force Fy in the Y-axis direction, acting on the force receiving member, based on a difference between a detection value of the first Y-axis distance sensor and a detection value of the second Y-axis distance sensor, and detects a moment Mx about the X-axis, acting on the force receiving member, based on a detection value of an inclination degree in relation to the Y-axis direction that is detected by the inclination degree sensor.

(3) The third feature of the invention resides in a force detection device according to the first or second feature, further comprising:

a Z-axis distance sensor, detecting a distance between the displaceable top plate and the fixed top plate;

wherein the detection processing unit detects a force Fz in the Z-axis direction, acting on the force receiving member, based on a detection value of the Z-axis distance sensor.

(4) The fourth feature of the invention resides in a force detection device according to the first to the third features, further comprising:

a rotation angle sensor, detecting a rotation angle about the Z-axis of the displaceable top plate with respect to the fixed top plate;

wherein the detection processing unit detects a moment Mz about the Z-axis, acting on the force receiving member, based on a detection value of the rotation angle sensor.

(5) The fifth feature of the invention resides in a force detection device according to the first to the third features:

wherein fixed electrodes are formed on surfaces of the fixed plates that oppose the displaceable plates, displaceable electrodes are formed on surfaces of the displaceable plates that oppose the fixed plates, and distance sensors for detecting distances between the fixed plates and the displaceable plates are arranged by capacitance elements, each comprising a fixed electrode and a displaceable electrode that oppose each other, to enable detection of distances based on static capacitance values of the capacitance elements.

(6) The sixth feature of the invention resides in a force detection device according to the first feature:

wherein, when the X-axis and the Y-axis are projected onto a top surface of the fixed top plate, a first fixed electrode is formed on a projected image of a positive part of the X-axis and a second fixed electrode is formed on a projected image of a negative part of the X-axis;

wherein, on a bottom surface of the displaceable top plate, a first displaceable electrode is formed at a position opposing the first fixed electrode and a second displaceable electrode is formed at a position opposing the second fixed electrode; and wherein a first capacitance element is constituted of the first fixed electrode and the first displaceable electrode, a second capacitance element is constituted of the second fixed electrode and the second displaceable electrode, and these two capacitance elements are used as an inclination degree sensor arranged to detect an inclination degree in relation to the X-axis direction, based on a difference between a static capacitance value of the first capacitance element and a static capacitance value of the second capacitance element.

(7) The seventh feature of the invention resides in a force detection device according to the second feature:

wherein, when the X-axis and the Y-axis are projected onto a top surface of the fixed top plate, a first fixed electrode is formed on a projected image of a positive part of the X-axis, a second fixed electrode is formed on a projected image of a negative part of the X-axis, a third fixed electrode is formed on a projected image of a positive part of the Y-axis, and a fourth fixed electrode is formed on a projected image of a negative part of the Y-axis;

wherein, on a bottom surface of the displaceable top plate, a first displaceable electrode is formed at a position opposing the first fixed electrode, a second displaceable electrode is formed at a position opposing the second fixed electrode, a third displaceable electrode is formed at a position opposing the third fixed electrode, and a fourth displaceable electrode is formed at a position opposing the fourth fixed electrode; and wherein a first capacitance element is constituted of the first fixed electrode and the first displaceable electrode, a second capacitance element is constituted of the second fixed electrode and the second displaceable electrode, a third capacitance element is constituted of the third fixed electrode and the third displaceable electrode, a fourth capacitance element is constituted of the fourth fixed electrode and the fourth displaceable electrode, and these four capacitance elements are used as an inclination degree sensor arranged to detect an inclination degree in relation to the X-axis direction, based on a difference between a static capacitance value of the first capacitance element and a static capacitance value of the second capacitance element, and to detect an inclination degree in relation to the Y-axis direction, based on a difference between a static capacitance value of the third capacitance element and a static capacitance value of the fourth capacitance element.

(8) The eighth feature of the invention resides in a force detection device according to the fifth to the seventh features:

wherein, with respect to a fixed electrode and a displaceable electrode that constitute a capacitance element, an area of one electrode is set wider than an area of the other electrode so that a static capacitance value will not change when the displaceable electrode undergoes a displacement within a predetermined range in a planar direction.

(9) The ninth feature of the invention resides in a force detection device according to the eighth feature:

wherein, the fixed plates and the fixed top plate, or the displaceable plates and the displaceable top plate are formed of a conductive material, and the fixed plates and the fixed top plate, or the displaceable plates and the displaceable top plate are in themselves used as a fixed electrode or a displaceable electrode.

(10) The tenth feature of the invention resides in a force detection device according to the eighth feature:

wherein a box-like structure is formed by mutually joining the displaceable top plate and the plurality of displaceable plates, formed of a conductive material, and the box-like structure is used as a single, common displaceable electrode.

(11) The eleventh feature of the invention resides in a force detection device according to the fourth feature:

wherein fixed electrodes are formed on a top surface of the fixed top plate, displaceable electrodes are formed on a bottom surface of the displaceable top plate, and the rotation angle sensor, detecting a rotation angle about the Z-axis of the displaceable top plate with respect to the fixed top plate, is arranged by capacitance elements, each comprising a fixed electrode and a displaceable electrode that oppose each other, to enable a detection of the rotation angle based on static capacitance values of the capacitance elements.

(12) The twelfth feature of the invention resides in a force detection device according to the eleventh feature:

wherein the displaceable electrodes are positioned at positions that are offset in a predetermined rotation direction with respect to positions that oppose the fixed electrodes to enable detection of a rotation direction along with the rotation angle based on increases or decreases of static capacitance values of the capacitance elements.

(13) The thirteenth feature of the invention resides in a force detection device according to the twelfth feature:

wherein, when the X-axis and the Y-axis are projected onto a top surface of the fixed top plate, a first fixed electrode is formed on a projected image of a positive part of the X-axis, a second fixed electrode is formed on a projected image of a negative part of the X-axis, a third fixed electrode is formed on a projected image of a positive part of the Y-axis, and a fourth fixed electrode is formed on a projected image of a negative part of the Y-axis;

wherein, on a bottom surface of the displaceable top plate, a first displaceable electrode is formed at a position offset in a predetermined rotation direction with respect to a position opposing the first fixed electrode, a second displaceable electrode is formed at a position off set in a rotation direction with respect to a position opposing the second fixed electrode, a third displaceable electrode is formed at a position offset in a rotation direction with respect to a position opposing the third fixed electrode, and a fourth displaceable electrode is formed at a position offset in a rotation direction with respect to a position opposing the fourth fixed electrode; and wherein a first capacitance element is constituted of the first fixed electrode and the first displaceable electrode, a second capacitance element is constituted of the second fixed electrode and the second displaceable electrode, a third capacitance element is constituted of the third fixed electrode and the third displaceable electrode, a fourth capacitance element is constituted of the fourth fixed electrode and the fourth displaceable electrode, and detection of a rotation direction along with a rotation angle is enabled based on an increase or a decrease of a sum of static capacitance values of the four capacitance elements.

(14) The fourteenth feature of the invention resides in a force detection device according to the first to the thirteenth features:

wherein an outer box-like structure, forming a rectangular parallelepiped that is opened at a bottom surface and undergoing elastic deformation by an action of an external force, is joined so that the bottom surface is set on the base plate, side plates or a part thereof of the outer box-like structure are used as the displaceable plates, and a top plate or a part thereof of the outer box-like structure is used as the displaceable top plate.

(15) The fifteenth feature of the invention resides in a force detection device according to the fourteenth feature:

wherein U-shaped slits, opening upward, are formed in side plates of the outer box-like structure and respective parts surrounded by the respective slits are used as the displaceable plates.

(16) The sixteenth feature of the invention resides in a force detection device according to the fifteenth feature:

wherein the U-shaped slit, opening upward, is formed in each of four side plates of the outer box-like structure, edges at which two mutually adjacent side plates intersect are used as columns to arrange a structure, with which a top plate of the outer box-like structure is supported by a total of four pillars, and the outer box-like structure is made to deform by elastic deformation of the four columns.

(17) The seventeenth feature of the invention resides in a force detection device according to the fourteenth to the sixteenth features:

wherein an inner box-like structure, forming a rectangular parallelepiped that is smaller than the outer box-like structure, is joined onto the base plate in a state in which the inner box-like structure is contained in the outer box-like structure and side plates and a top plate of the inner box-like structure are used as the fixed plates and the fixed top plate.

(18) The eighteenth feature of the invention resides in a force detection device according to the first to the thirteenth features:

wherein four columns, formed of a material that undergoes elastic deformation due to an action of an external force and joined in an erected manner to the base plate, and a top plate, four corners of which are joined to upper ends of the four columns are provided; and wherein the displaceable plates are positioned between respective pairs of mutually adjacent columns, upper edges of the displaceable plate are joined to and thereby supported by edges of the top plate, and the top plate or a part thereof is used as the displaceable top plate.

(19) The nineteenth feature of the invention resides in a force detection device according to the fourteenth to the eighteenth features:

wherein by forming slits in the top plate, the top plate is partitioned into a displaceable top plate positioned at a center, peripheral parts positioned at a periphery of the displaceable top plate, and beams having flexibility and connecting the displaceable top plate and the peripheral parts, so that the displaceable top plate is displaced with respect to the peripheral parts by a deflection of the beams and the peripheral parts are connected to the base plate via side plates or columns of the outer box-like structure.

(20) The twentieth feature of the invention resides in a force detection device according to the nineteenth feature:

wherein when the X-axis and the Y-axis are projected onto the top plate, a displaceable top plate having a shape of vanes of a fan is arranged from a first vane-like part, positioned on a projected image of a positive part of the X-axis, a second vane-like part, positioned on a projected image of a negative part of the X-axis, a third vane-like part, positioned on a projected image of a positive part of the Y-axis, a fourth vane-like part, positioned on a projected image of a negative part of the Y-axis, and a central part, positioned on a projected image of an origin O and connected to inner side parts of the first to fourth vane-like parts;

wherein a respective beam is positioned between every two mutually adjacent vane-like parts so that the central part is supported by four beams; and wherein the four beams are connected to the central part at their inner ends and connected to the peripheral parts at their outer ends and the connecting member is connected to a top surface of the central part.

(21) The twenty-first feature of the invention resides in a force detection device according to the twentieth feature:

wherein each beam comprises: a horizontal beam, whose main surface faces a horizontal direction; a vertical beam whose main surface faces a vertical direction; and an intermediate joint, connecting the horizontal beam and the vertical beam; and is thereby made a structure with which both deflection in the horizontal direction and deflection in the vertical direction can occur readily.

(22) The twenty-second feature of the invention resides in a force detection device according to the first to the twenty-first features:

wherein a control member is provided, which, in order to restrict displacements of the force receiving member with respect to the base plate within predetermined ranges, has control surfaces that contact the force receiving member when the force receiving member is about to become displaced beyond the predetermined range.

(23) The twenty-third feature of the invention resides in a force detection device according to the twenty-second feature:

wherein at least a part of the force receiving member and a part of the control member that are involved in contact are formed of a conductive material, and a contact detection circuit, detecting a state of contact of the force receiving member and the control member based on a state of electrical conduction, is provided.

(24) The twenty-fourth feature of the invention resides in a force detection device according to the twenty-third feature:

wherein a hollow part is formed in a vicinity of a control surface of the control member or an opposing surface of the force receiving member that opposes the control surface, a surface layer part at which the hollow part is formed is arranged as a thin part with flexibility, a conductive contact protrusion is formed on a surface of the thin part, and a state of electrical conduction by contacting of the contact protrusion with the opposing surface or the control surface is arranged to be detected prior to contacting of the opposing surface and the control surface.

(25) The twenty-fifth feature of the invention resides in a force detection device according to the twenty-fourth feature:

wherein a conductive conical protrusion, a tip part of which undergoes plastic deformation, is provided on the control surface of the control member or a surface of the force receiving member that opposes the control surface.

BRIEF DESCRIPTION OF THE DRAWINGS

FIG. 11 is a table showing the principle of detection of various forces and moments by the force detection device shown in FIG. 2.

FIG. 12 is a diagram showing the calculation equations for detecting the various forces and moments based on the table shown in FIG. 11.

FIG. 17 is a table showing the principle of detection of various forces and moments by the force detection device with the electrode configuration shown in FIG. 15.

FIG. 18 is a diagram showing the calculation equations for detecting the various forces and moments based on the table shown in FIG. 17.

DESCRIPTION OF THE PREFERRED EMBODIMENTS

This invention shall now be described based on illustrated embodiments.

<<<§1. Structure of a Basic Embodiment >>>

Figure 1:
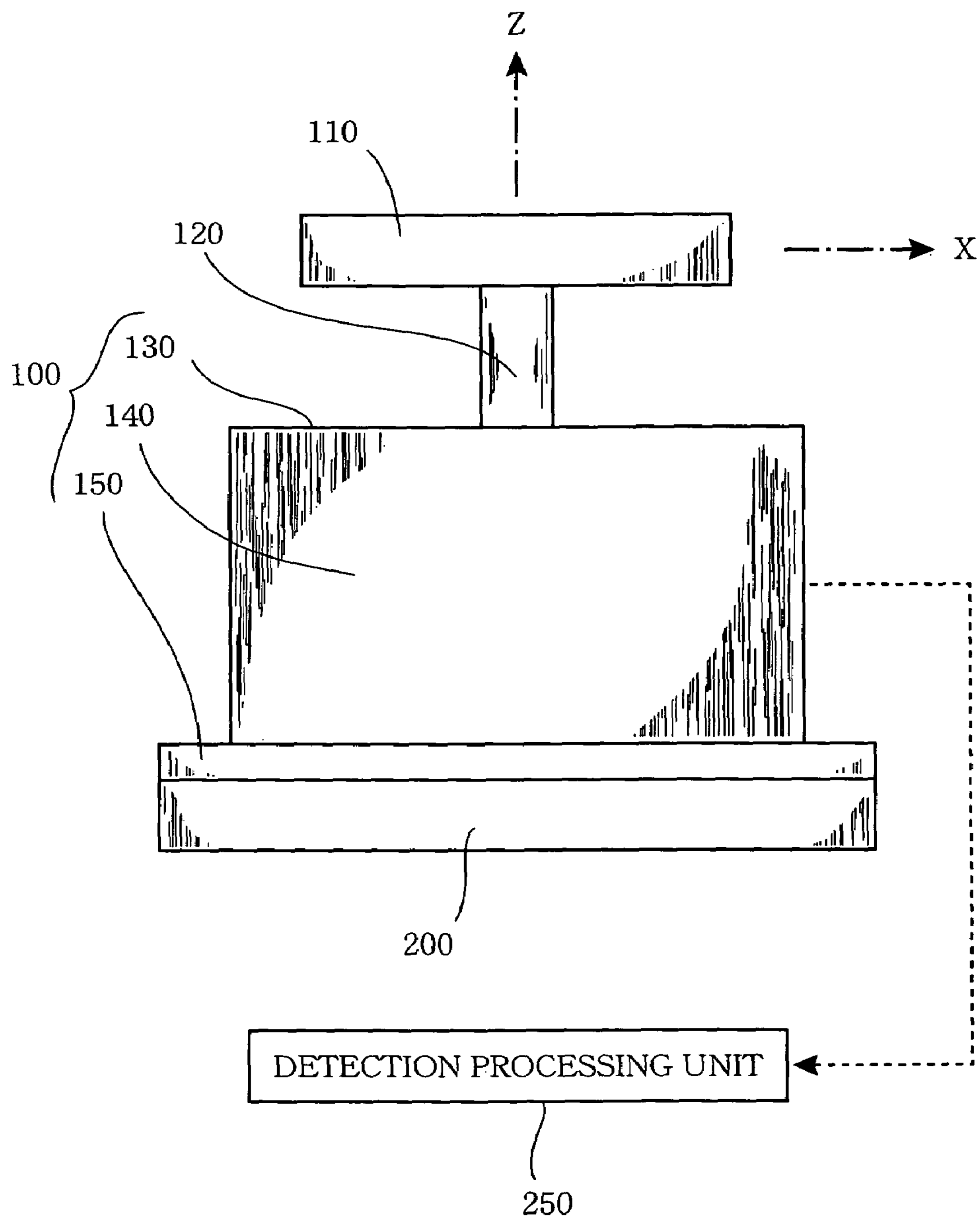
FIG. 1 is a side view of a force detection device of a basic embodiment of the invention (a detection processing unit 250 is indicated by a block) with the Z-axis passing through a central position.

The structure of a force detection device of a basic embodiment of this invention shall first be described with reference to FIGS. 1 to 7. FIG. 1 is a side view of this force detection device. The major components in terms of appearance of this force detection device are, as shown in order from the top, a force receiving member 110, a connecting member 120, a top plate 130, side plates 140, a pedestal 150, and a base plate 200. For the sake of convenience, the box-like structure, formed of upper plate 130, side plates 140, and pedestal 150, shall be referred to hereinafter as "outer box-like structure 100." Though detection processing unit 250 is drawn as a block in this figure, it is actually arranged from an analog or digital computational circuit for performing detection based on the detection principles to be described later.

Here, for the sake of description, an XYZ three-dimensional coordinate system shall be defined with the origin O being set at a central part of force receiving member 110, the X-axis being set in the right direction of the figure, the Z-axis being set in the upper direction of the figure, and the Y-axis being set in the direction perpendicular to and directed towards the rear side of the paper surface of the figure. The top surface of base plate 200 is a plane parallel to the XY plane. The force detection device shown here can detect the five components of a force Fx in the X-axis direction, a force Fy in the Y-axis direction, a force Fz in the Z-axis direction, a moment Mx about the X-axis, and a moment My about the Y-axis independent of each other. In §3, an embodiment, which can detect six components that furthermore include a moment Mz about the Z-axis, shall be described.

In the present application, the term "force" may be used as suitable to refer to a force in the direction of a specific coordinate axis or as a collective force that includes the moment components. For example, whereas in FIG. 1, forces Fx, Fy, and Fz refer to the force components in the direction of the respective coordinate axes and not moments, in the case of the expression, "the six forces of Fx, Fy, Fz, Mx, My, and Mz," the term "force" shall refer to the collective force that includes the force components in the respective coordinate axis directions and the moment components about the respective coordinate axes. Also, a positive moment about a certain coordinate axis shall be defined as being in the direction of rotation of a right-handed screw in the case where the right-handed screw is advanced in the positive direction of the predetermined coordinate axis.

Figure 2:
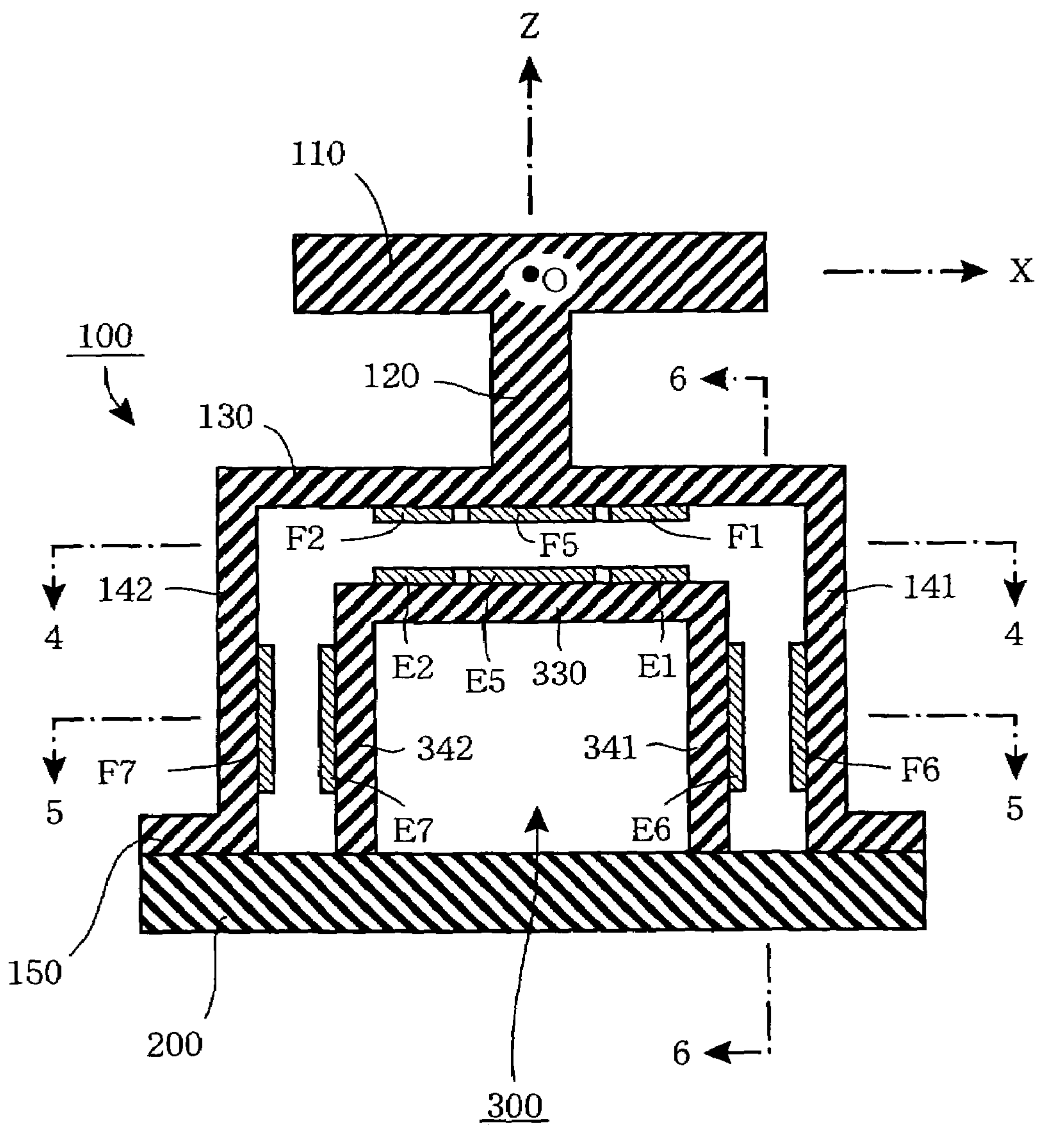
FIG. 2 is a side view in section across the XZ plane of the force detection device shown in FIG. 1.

FIG. 2 is a side view in section along the XZ plane of this force detection device. Origin O of the coordinate system is indicated at the central position of force receiving member 110. As illustrated, outer box-like structure 100 is a hollow, rectangular parallelepiped box, which is opened at the bottom. Though in FIG. 1, this outer box-like structure 100 is illustrated as comprising the three elements of upper plate 130, side plates 140, and pedestal 150, actually a total of four side plates 140 exist. In the following, when referring to each of these four side plates 140 individually, these shall be called "first side plate 141" to "fourth side plate 144." Pedestal 150 is provided to support outer box-like structure 100 in a manner enabling displacement on the top surface of base plate 200 and though it does not serve an essential role in the operation of this force detection device, it is preferably provided in terms of practical use. A somewhat smaller inner box-like structure 300 is contained inside outer box-like structure 100. This inner box-like structure 300 is also a hollow, rectangular parallelepiped box, which is opened at the bottom and is arranged from a single top plate 330 and four side plates 341 to 344.

Figure 3:
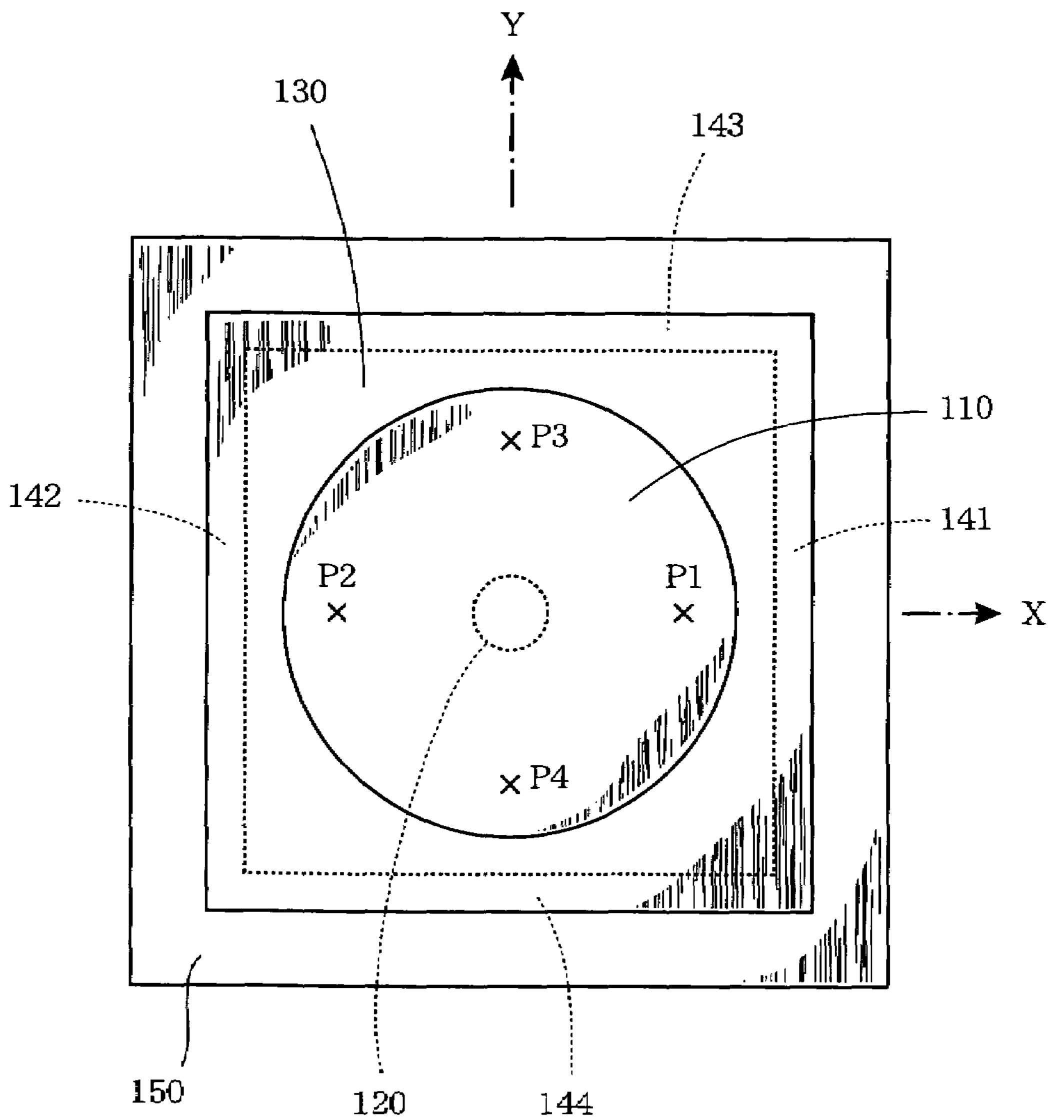
FIG. 3 is a top view of the force detection device shown in FIG. 2.

FIG. 3 is a top view of this force detection device. As illustrated, with this embodiment, force receiving member 110 is a disk-like member and is joined to the cylindrical connecting member 120 as indicated by the broken lines at a central part of its bottom surface. This cylindrical connecting member 120 has the Z-axis passing through its center, has its upper end connected to the central part of the bottom surface of force receiving member 110, and has its lower end connected to a central part of the top surface of top plate 130. Top plate 130 is a square plate that forms the top surface of outer box-like structure 100. Outer box-like structure 100 is positioned with the Z-axis as its center, and as indicated in the figure by the broken lines, first side plate 141 is positioned at a positive region of the X-axis, second side plate 142 is positioned at a negative region of the X-axis, third side plate 143 is positioned at a positive region of the Y-axis, and fourth side plate 144 is positioned at a negative region of the Y-axis. First side plate 141 and second side plate 142 are parallel to the YZ plane and third side plate 143 and fourth side plate 144 are parallel to the XZ plane. Pedestal 150 has a frame structure that surrounds the periphery of the lower edges of the respective side plates 141 to 144 and the bottom surface thereof is joined to the top surface of base plate 200.

As shown in the side view in section of FIG. 2, force receiving member 110, connecting member 120, and outer box-like structure 100 (upper plate 130, first side plate 141 to fourth side plate 144, and pedestal 150) form an integral structure of the same material, and in the case of this basic embodiment, the structure is formed of an insulating material. Likewise, upper plate 330 and first side plate 341 to fourth side plate 344, which form inner box-like structure 300, also form an integral structure of the same material, and in the case of this basic embodiment, the structure is formed of an insulating material. Base plate 200 is also a base plate formed of an insulating material. For practical use however, force receiving member 110, connecting member 120, and outer box-like structure 100 are preferably formed of a metal or other conductive material as shall be described in §4.

Force receiving member 110 is a component that is positioned along the Z-axis above top plate 130 in order to receive a force that is to be detected. The present force detection device has a function of detecting an external force that acts on this force receiving member 110. A force that acts on force receiving member 110 is transmitted by connecting member 120 to top plate 130, and as a result, outer box-like structure 100 undergoes deformation. With this force detection device, the external force that acts on force receiving member 110 is detected by recognition of this deformation of outer box-like structure 100. Outer box-like structure 100 must thus be formed of a material with flexibility that can undergo elastic deformation by the action of the external force. Since elastic deformation will occur with various materials as long as the side plates and the top plate are made somewhat thin in thickness, difficulties will not arise in the selection of material.

Top plate 130 and the respective side plates 141 to 144 that form outer box-like structure 100 thus undergo displacement due to an external force that is transmitted from force receiving member 110. In view of such functions, the respective side plates 141 to 144 shall be referred to hereinafter as "displaceable plates 141 to 144" and top plate 130 shall be referred to hereinafter as "displaceable top plate 130." On the other hand, since the external force from force receiving member 110 does not act on top plate 330 and the respective side plates 341 to 344 that form inner box-like structure 300, these remain fixed to base plate 200. Thus the respective side plates 341 to 344 shall be referred to hereinafter as "fixed plates 341 to 344" and top plate 330 shall be referred to hereinafter as "fixed top plate 330."

As shown in part in the side view in section of FIG. 2, a plurality of electrodes E1 to E9 and F1 to F9 are formed on the outer side surfaces of inner box-like structure 300 and the inner side surfaces of outer box-like structure 100. Here, electrodes E1 to E9, which are formed on the outer side surfaces of inner box-like structure 300, shall be referred to as "fixed electrodes" and electrodes F1 to F9, which are formed on the inner side surfaces of outer box-like structure 100 shall be referred to as "displaceable electrodes." As indicated by these names, whereas fixed electrodes E1 to E9 are electrodes that are fixed onto base plate 200 via inner box-like structure 300, displaceable electrodes F1 to F9 are electrodes that undergo displacement in accompaniment with the deformation of outer box-like structure 100. Displaceable electrodes F1 to F9 are positioned at positions that oppose fixed electrodes E1 to E9, respectively.

Figure 4:
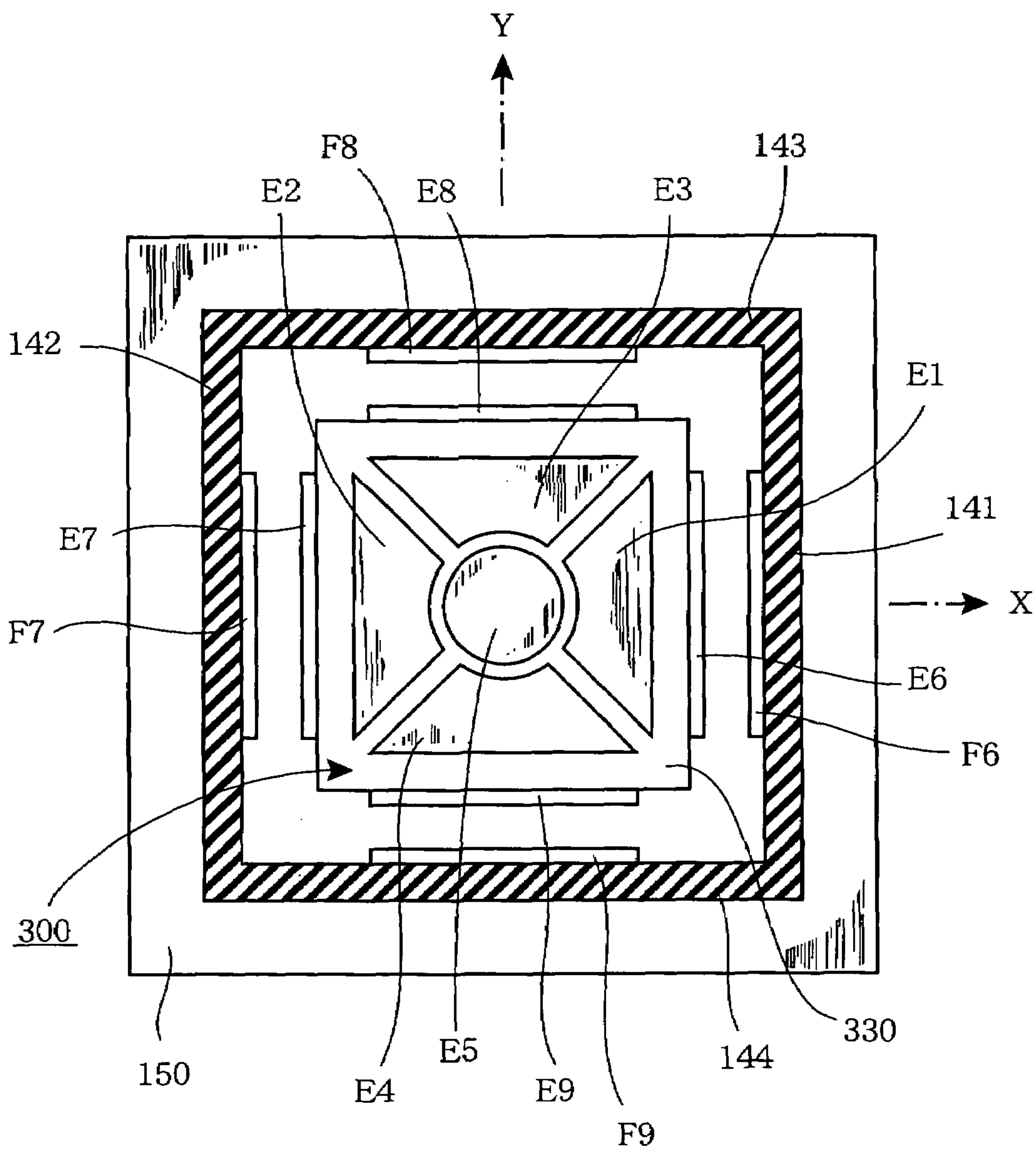
FIG. 4 is a transverse section along line 4—4 of the force detection device shown in FIG. 2.

The shapes and positions of the respective electrodes are shown clearly in FIGS. 4 to 7. FIG. 4 is a transverse section along line 4—4 of the force detection device shown in FIG. 2, and shows, in a sectioned state, the interior of outer box-like structure 100 surrounded by first displaceable plate 141 to fourth displaceable plate 144. In particular, the shapes and positions of the five fixed electrodes E1 to E5, formed on fixed top plate 330, which forms the top surface of inner box-like structure 300, are shown clearly. That is, when the X-axis and the Y-axis are projected onto the top surface of fixed top plate 330, first fixed electrode E1 is formed on the projected image of a positive part of the X-axis, second fixed electrode E2 is formed on the projected image of a negative part of the X-axis, third fixed electrode E3 is formed on the projected image of a positive part of the Y-axis, fourth fixed electrode E4 is formed on the projected image of a negative part of the Y-axis, and fifth fixed electrode E5 is formed on the projected image of the origin O. Here, first fixed electrode E1 to fourth fixed electrode E4 are electrodes of the same size and same shape and are positioned at positions that are symmetrical with respect to the XZ plane or the YZ plane. Meanwhile, fifth fixed electrode E5 is a circular electrode having the Z-axis as the central axis.

Figure 5:
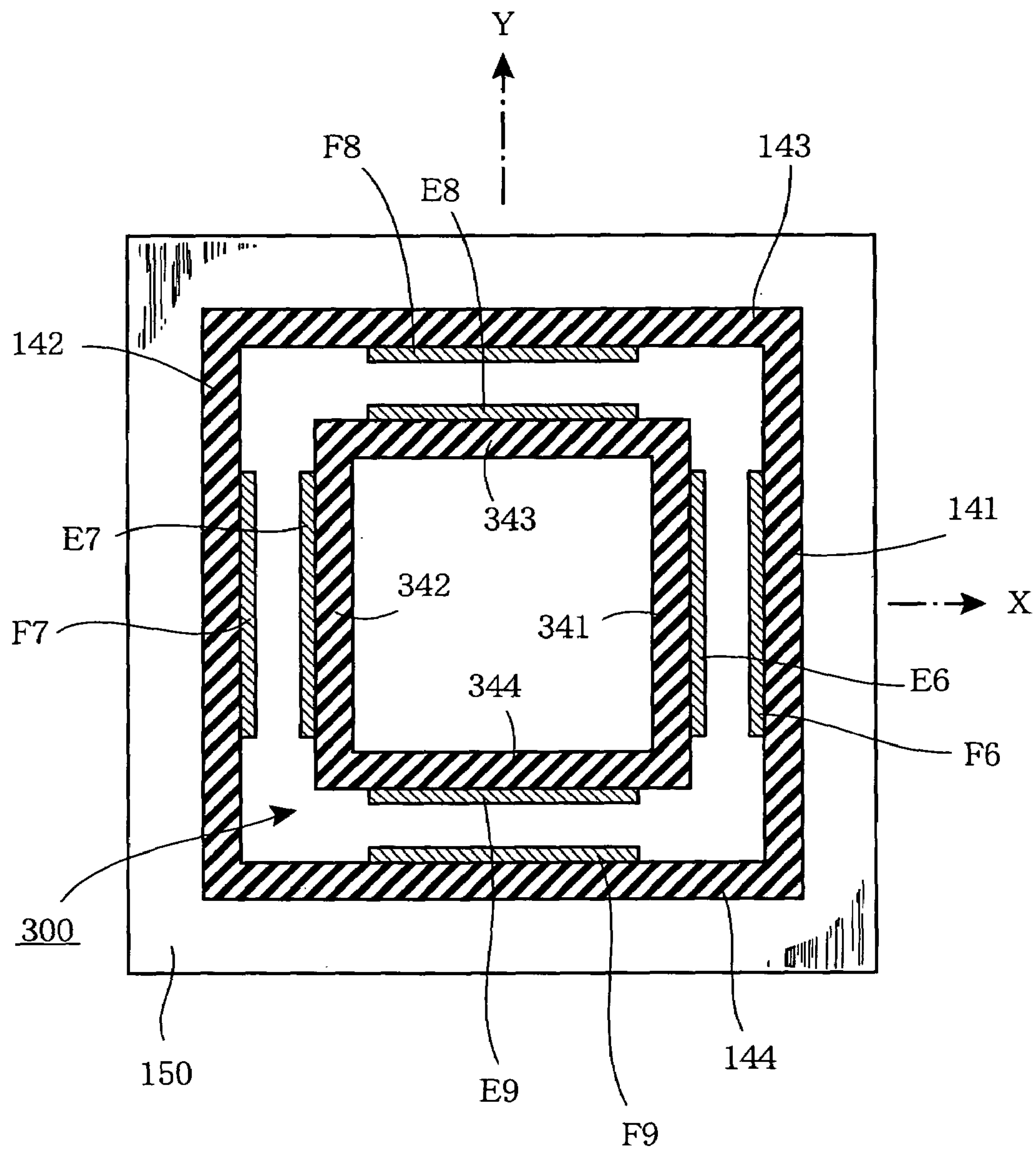
FIG. 5 is a transverse section along line 5—5 of the force detection device shown in FIG. 2.

Meanwhile, fixed electrodes E6 to E9 are positioned respectively at the four side surfaces of inner box-like structure 300, and opposite these positions are disposed displaceable electrodes F6 to F9. The positions of these electrodes are shown clearly in FIG. 5. FIG. 5 is a transverse section along line 5—5 of the force detection device shown in FIG. 2. First displaceable plate 141 to fourth displaceable plate 144, which form the respective side surfaces of outer box-like structure 100, and first fixed plate 341 to fourth fixed plate 344, which form the respective side surfaces of inner box-like structure 300, are respectively shown in section, and displaceable electrodes F6 to F9, formed on the inner side surfaces of the respective displaceable plates 141 to 144, and fixed electrode E6 to E9, formed on the outer side surfaces of the respective fixed plates 341 to 344, are also shown in section.

Figure 6:
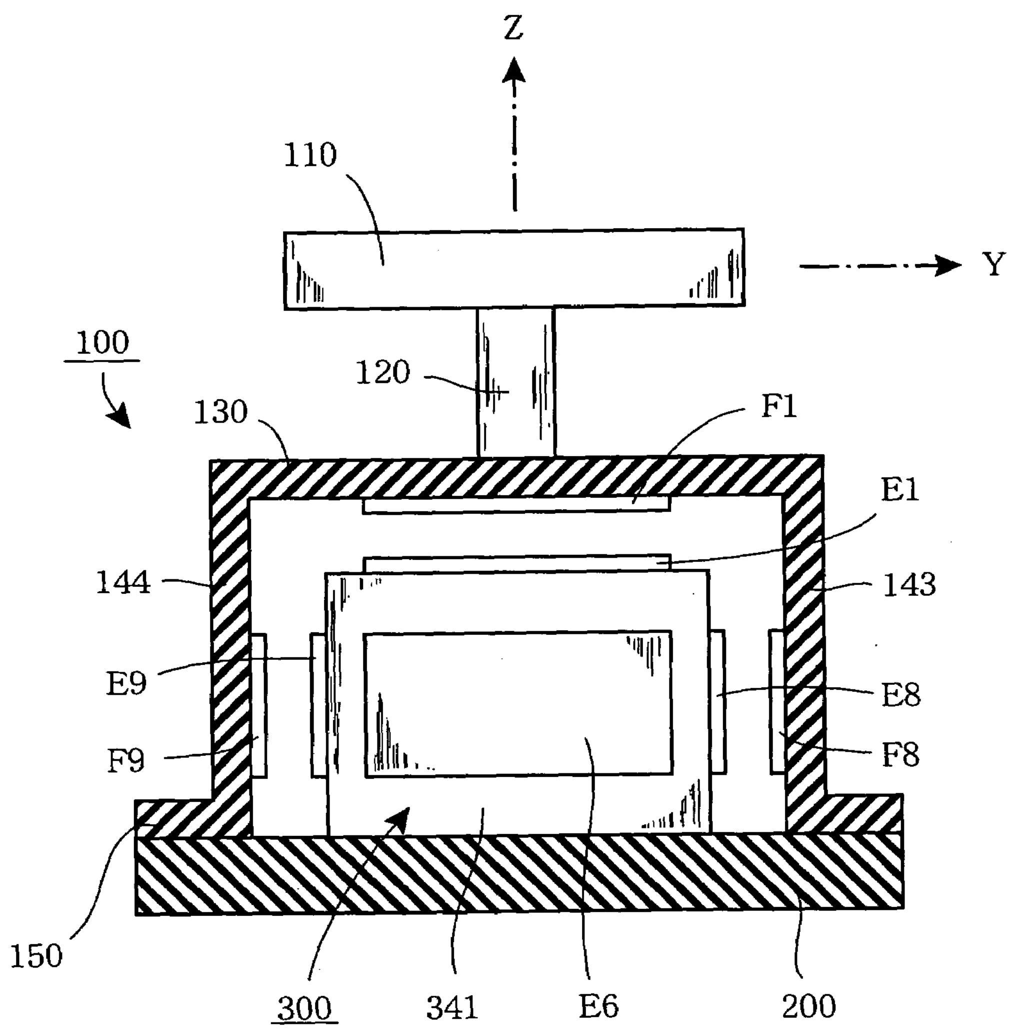
FIG. 6 is a transverse section along line 6—6 of the force detection device shown in FIG. 2.

FIG. 6 is a transverse section along line 6—6 of the force detection device shown in FIG. 2, and the state as viewed from the right direction of FIG. 2 is shown. As shown here, sixth fixed electrode E6, which is formed on first fixed plate 341, is a rectangular, plate-shaped electrode. Though here for the sake of convenience, the four fixed electrodes E6 to E9 and the four displaceable electrode F6 to F9 are described as being plate-shaped electrodes of the same shape and same size, for practical use, a pair of mutually opposing electrodes are preferably differed slightly in size with respect to each other as shall be described later. Here, the conditions in which electrodes E1/F1, electrodes E8/F8, and electrodes E9/F9 oppose each other across a predetermined interval are also shown.

Figure 7:
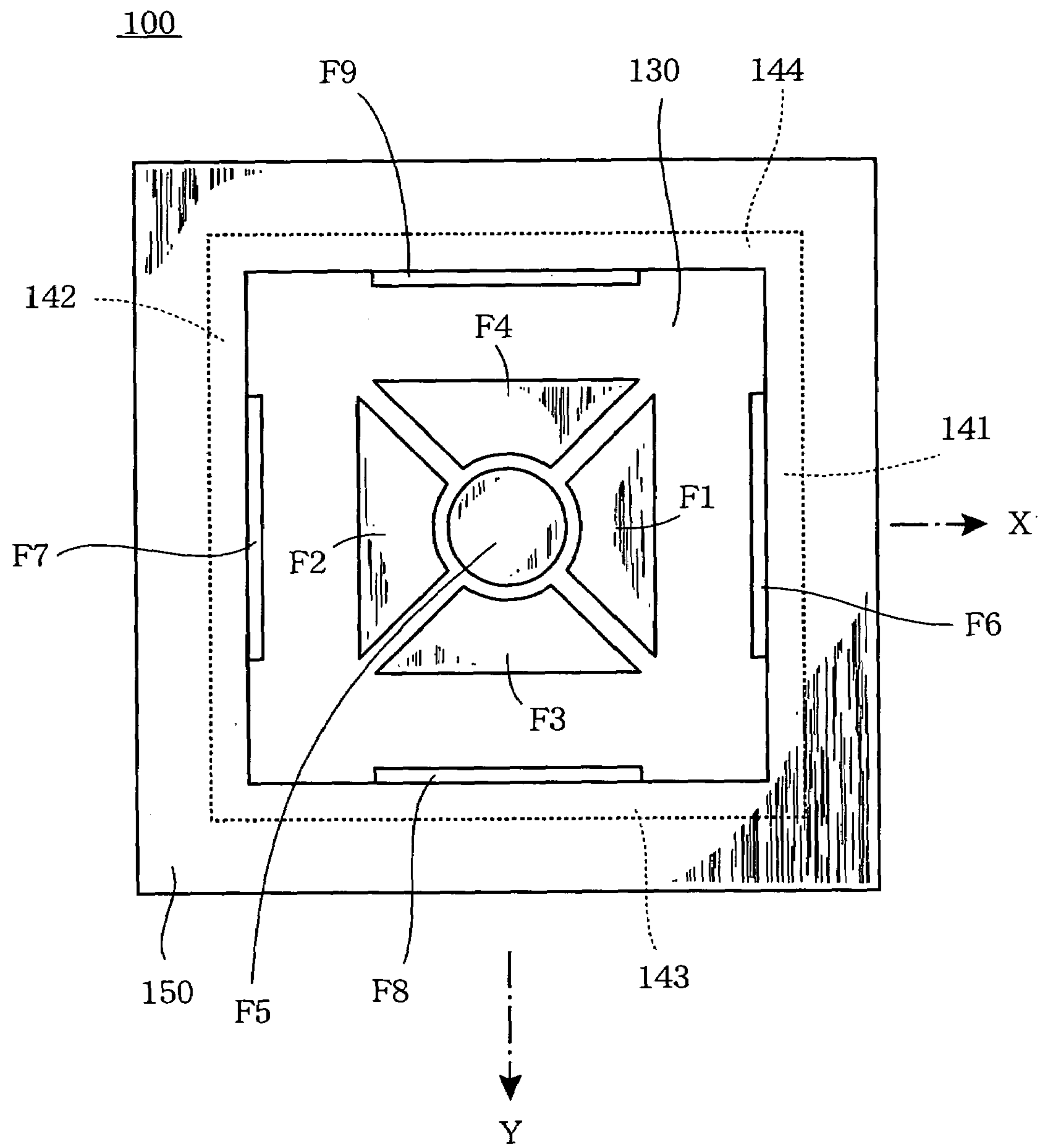
FIG. 7 is a bottom view of an outer box-like structure 100 which is removed from the force detection device shown in FIG. 2.

FIG. 7 is a bottom view of outer box-like structure 100 which is removed from the force detection device shown in FIG. 2. The state of the interior of this outer box-like structure 100 is shown in the space surrounded by the frame-like pedestal 150. As shown here, five displaceable electrodes F1 to F5 are disposed at the bottom face of displaceable top plate 130, which is positioned at the inner side of the figure, and these electrodes respectively oppose the five fixed electrodes E1 to E5, shown in FIG. 4. Though here for the sake of convenience, the five displaceable electrodes F1 to F5 are described as being the same in shape and size as the five fixed electrode E1 to E5, for practical use, the sizes are preferably differed slightly as shall be described later. FIG. 7 also shows the conditions in which displaceable electrodes F6 to F9 are formed at the respective inner side surfaces of displaceable plates 141 to 144.

A space is thus formed between outer box-like structure 100 and inner box-like structure 300 as shown in the side view in section of FIG. 2, and this space is used to form the nine pairs E1/F1 to E9/F9 of mutually opposing electrodes. Here, whereas electrodes E1 to E9, which are formed on the outer side surfaces of inner box-like structure 300, are all fixed electrodes that are fixed via inner box-like structure 300 to base plate 200, electrodes F1 to F9, which are formed on the inner side surfaces of outer box-like structure 100, are all displaceable electrodes, which undergo displacement in accompaniment with the deformation of outer box-like structure 100. Here, for the sake of description, the nine sets of static capacitance elements constituted of the nine electrode pairs E1/F1 to E9/F9 shall respectively be referred to as "capacitance elements C1 to C9." The same symbols C1 to C9 shall also be used to express the respective static capacitance values of capacitance elements C1 to C9 as well.

Capacitance elements C6 to C9 have the role of detecting the displacements of first displaceable plate 141 to fourth displaceable plate 144. For example, in the transverse section of FIG. 5, when first displaceable plate 141 is displaced in the positive X-axis direction (the right direction in the figure), sixth displaceable electrode F6 also moves in the same direction, that is, in the direction of moving away from sixth fixed electrode E6, causing the distance between electrodes of capacitance element C6, constituted of the electrode pair E6/F6, to spread and the static capacitance value C6 to decrease. Oppositely, when first displaceable plate 141 is displaced in the negative X-axis direction (left direction in the figure), the distance between electrodes of capacitance element C6 is narrowed and the static capacitance value C6 increases.

The static capacitance value C6 of capacitance element C6 is thus a parameter that indicates the distance between first displaceable plate 141 and first fixed plate 341. Likewise, the static capacitance value C7 of capacitance element C7, constituted of the electrode pair E7/F7, is a parameter that indicates the distance between second displaceable plate 142 and second fixed plate 342, the static capacitance value C8 of capacitance element C8, constituted of the electrode pair E8/F8, is a parameter that indicates the distance between third displaceable plate 143 and third fixed plate 343, and the static capacitance value C9 of capacitance element C9, constituted of the electrode pair E9/F9, is a parameter that indicates the distance between fourth displaceable plate 144 and fourth fixed plate 344.

The role of capacitance element C5 is to detect the displacement of displaceable top plate 130 in relation to the Z-axis direction. For example, when in the side view in section of FIG. 2, displaceable top plate 130 is displaced in the positive direction along the Z-axis (upward direction in the figure), fifth displaceable electrode F5 also moves in the same direction, that is, in the direction of moving away from fifth fixed electrode E5, causing the distance between electrodes of capacitance element C5, constituted of the electrode pair E5/F5, to spread and the static capacitance value C5 to decrease. Oppositely, when displaceable top plate 130 is displaced in the negative Z-axis direction (downward direction in the figure), the distance between electrodes of capacitance element C5 is narrowed and the static capacitance value C5 increases. The static capacitance value C5 of capacitance element C5 is thus a parameter that indicates the distance between displaceable top plate 130 and fixed top plate 330.

Meanwhile, capacitance elements C1 to C4 have the role of detecting the inclination degree of displaceable top plate 130 with respect to fixed top plate 330. For example, consider the case where a positive moment +My about the Y-axis (a clockwise moment about the axis perpendicular to the paper surface) acts on force receiving member 110 in the side view in section of FIG. 2. In this case, the moment that acts on force receiving member 110 is transmitted via connecting member 120 to displaceable top plate 130. The moment thus transmitted applies to displaceable top plate 130 a force that displaces the right half in the figure downwards and displaces the left half in the figure upwards. As a result, displaceable top plate 130 becomes inclined with respect to the original level state in a manner such that its right side in FIG. 2 is lowered and its left side is raised. In the present Specification, such an inclination degree related to direction shall be referred to as "an inclination degree in relation to the X-axis direction."

This "inclination degree in relation to the X-axis direction" can be detected as a difference in the static capacitance values of capacitance elements C1 and C2. That is, when displaceable top plate 130 is put in an inclined state such as that described above, the distance between electrodes of capacitance element C1, which is constituted of the electrode pair E1/F1 decreases, and the static capacitance value C1 increases. Meanwhile, the distance between electrodes of capacitance element C2, which is constituted of the electrode pair E2/F2 increases, and the static capacitance value C2 decreases. The difference between the two, (C1−C2), is thus a value that indicates the inclination degree in relation to the X-axis direction of displaceable top plate 130. Also, when top plate becomes inclined in a direction such that, with respect to the original level state, the right side in FIG. 2 is raised and the left side is lowered, the distance between electrodes of capacitance element C1 increases so that the static capacitance value C1 decreases and the distance between electrodes of capacitance element C2 decreases so that the static capacitance value C2 increases. The inclination degree in this case can thus be determined as the "inclination degree in relation to the X-axis direction" from the difference between the two capacitance values, (C1−C2) (in this case, the difference, (C1−C2), becomes a negative value). The direction and magnitude of the inclination degree in relation to the X-axis direction can thus be detected as the difference in the static capacitance values of capacitance elements C1 and C2.

By exactly the same principle as the above, the direction and magnitude of the inclination degree in relation to the Y-axis can be detected as the difference, (C3−C4), of the static capacitance values of capacitance elements C3 and C4. That is, if the inclination degree, concerning the inclination direction such that, with respect to the original level state, the right side of displaceable top plate 130 in FIG. 6 (in which the Y-axis direction is the horizontal direction) is lowered and the left side is raised or the opposite inclination degree such that the right side is raised and the left side is lowered, is to be referred to as the "inclination degree in relation to the Y-axis direction," this "inclination degree in relation to the Y-axis direction" can be detected as the difference in the static capacitance values of capacitance elements C3 and C4 and the sign thereof indicates the inclination direction. Capacitance elements C1 to C4 thus have the function of detecting the "inclination degree in relation to the X-axis direction" and the "inclination degree in relation to the Y-axis direction" of displaceable top plate 130 with respect to fixed top plate 330.

<<<§2. Detection Operations of the Basic Embodiment >>>

The detection operations by the force detection device of the above-described basic embodiment shall now be described. As mentioned above, this force detection device can detect the five components of a force Fx in the X-axis direction, a force Fy in the Y-axis direction, a force Fz in the Z-axis direction, a moment Mx about the X-axis, and a moment My about the Y-axis that are applied to force receiving member 110.

Figure 8A:
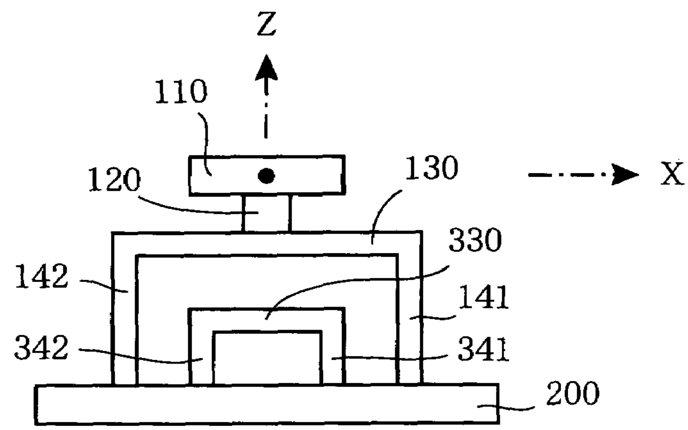
FIGS. 8A to 8C are schematic diagrams illustrating the principle of detection of a force Fx in the X-axis direction by the force detection device shown in FIG. 2.

The principle of detection of a force Fx in the X-axis direction shall first be described with reference to the schematic diagrams of FIGS. 8A to 8C. FIG. 8A is an XZ elevation view that schematically shows the components involved in the detection of a force Fx in the X-axis direction and a moment My about the Y-axis by the present force detection device and shows the state in which no external force is acting. As described in §1, base plate 200 is a base plate having a top surface that is parallel to the XY plane in the XYZ three-dimensional coordinate system, and on this base plate 200 are positioned first displaceable plate 141, second displaceable plate 142, first fixed plate 341, and second fixed plate 342. Also, displaceable top plate 130 is positioned so as to be suspended across the upper end of first displaceable plate 141 and the upper end of second displaceable plate 142 and fixed top plate 330 is positioned so as to be suspended across the upper end of first fixed plate 341 and the upper end of second fixed plate 342.

Also, force receiving member 110 is a component that is positioned on the Z-axis above displaceable top plate 130 in order to receive the force that is to be detected, and connecting member 120 is a component that is positioned along the Z-axis in order to connect force receiving member 110 and displaceable top plate 130. In the present example, connecting member 120 is connected to the central part of the top surface of displaceable top plate 130 and an external force that acts on force receiving member 110 is transmitted via connecting member 120 to displaceable top plate 130.

Figure 8B:
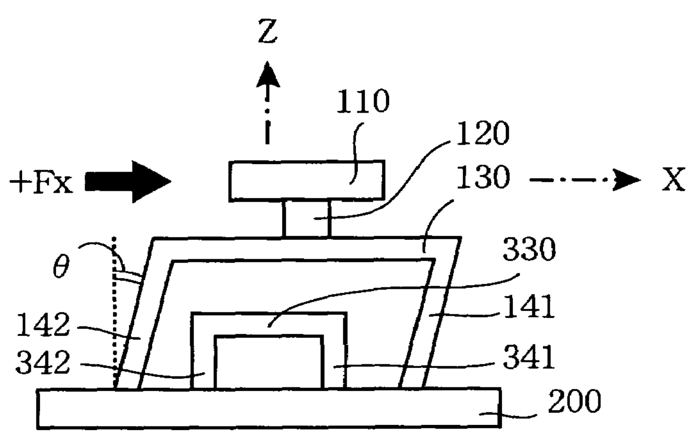

FIG. 8B is a diagram showing the displacement state of the respective parts when a force +Fx in the positive X-axis direction acts on force receiving member 110. As illustrated, the external force +Fx that acts on force receiving member 110 is transmitted via connecting member 120 to displaceable top plate 130 and applies to displaceable top plate 130 a force that makes it move in the right direction in the figure. This force is also transmitted to first displaceable plate 141 and second displaceable plate 142 and the force +Fx in the positive X-axis direction thus acts on the upper edge of first displaceable plate 141 and the upper edge of second displaceable plate 142. As a result, first displaceable plate 141 and second displaceable plate 142 become inclined by just an angle θ towards the positive X-axis direction as illustrated. Since with the structure described in §1, first displaceable plate 141, second displaceable plate 142, and displaceable top plate 130 are arranged as parts of outer box-like structure 100, a side surface of this outer box-like structure 100 becomes deformed to a parallelogram, such as that illustrated.

Due to such deformation, the distance between first displaceable plate 141 and first fixed plate 341 increases and the distance between second displaceable plate 142 and second fixed plate 342 decreases. Oppositely when a force −Fx in the negative X-axis direction acts, the displacement state of the respective parts will be as shown FIG. 8C. That is, first displaceable plate 141 and second displaceable plate 142 become inclined by just an angle θ towards the negative X-axis direction as illustrated (here, the inclination direction is provided with a sign and the inclination angle in this case is expressed as −θ). Due to such deformation, the distance between first displaceable plate 141 and first fixed plate 341 decreases and the distance between second displaceable plate 142 and second fixed plate 342 increases.

Thus when a first X-axis distance sensor, which detects the distance between first displaceable plate 141 and first fixed plate 341, and a second X-axis distance sensor, which detects the distance between second displaceable plate 142 and second fixed plate 342, are provided, the difference in the distance values detected by these sensors will indicate the force Fx in the X-axis direction that acts on force receiving member 110. That is, the magnitude of this difference of detection values indicates the absolute value of the force Fx and the sign of this difference of detection values indicates the direction of the force Fx.

As shown in the side view in section of FIG. 2, with the force detection device described in §1, sixth capacitance element C6, constituted of the electrode pair E6/F6, functions as the first X-axis distance sensor, and seventh capacitance element C7, constituted of the electrode pair E7/F7, functions as the second X-axis distance sensor. The difference (C7−C6) of the static capacitance values of these capacitance elements C6 and C7 can thus be output as the detection value of the force Fx in the X-axis direction. (C7−C6) is used instead of (C6−C7) in the equation for determining the difference so as to provide an Fx having a correct sign in consideration that the magnitude of the distance between electrodes of the electrode pair that constitute a capacitance element is in a reverse relationship with the magnitude of the static capacitance value.

Though the principle of detection of a force Fx in the X-axis direction were described above, the principle of detection of a force Fy in the Y-axis direction is all the same. That is, when a force Fy in the Y-axis direction acts on force receiving member 110, third displaceable plate 143 and fourth displaceable plate 144 become inclined in the Y-axis direction. Thus when a first Y-axis distance sensor, which detects the distance between third displaceable plate 143 and third fixed plate 343, and a second Y-axis distance sensor, which detects the distance between fourth displaceable plate 144 and fourth fixed plate 344, are provided, the difference in the distance values detected by these sensors will indicate the force Fy in the Y-axis direction that acts on force receiving member 110. The magnitude of the difference of the detection values indicates the absolute value of the force Fy and the sign of the difference of the detection values indicates the direction of the force Fy in this case as well.

As shown in the sectional view of FIG. 6, with the force detection device described in §1, eighth capacitance element C8, constituted of the electrode pair E8/F8, functions as the first Y-axis distance sensor, and ninth capacitance element C9, constituted of the electrode pair E9/F9, functions as the second Y-axis distance sensor. The difference (C9−C8) of the static capacitance values of these capacitance elements C8 and C9 can thus be output as the detection value of the force Fy in the Y-axis direction. Here, (C9−C8) is used in the equation for determining the difference in consideration of providing an Fy having a correct sign.

Figure 9A:
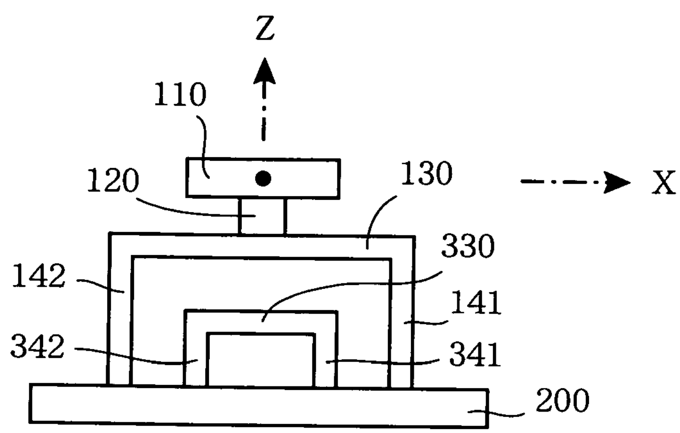
FIGS. 9A to 9C are schematic diagrams illustrating the principle of detection of a force Fz in the Z-axis direction by the force detection device shown in FIG. 2.
Figure 9B:
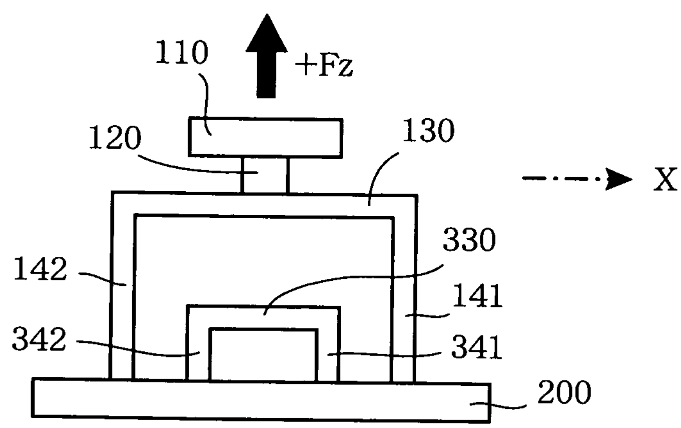
Figure 9C:
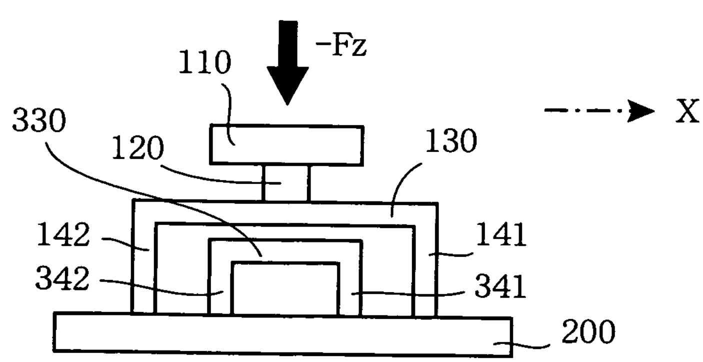

Next, the principle of detection of a force Fz in the Z-axis direction shall be described with reference to the schematic diagrams of FIGS. 9A to 9C. First, let the state shown in FIG. 9A be that in which no external force is acting. When from this state, a force +Fz in the positive Z-axis direction acts, the displacement state of the respective parts will be as shown in FIG. 9B, and when a force −Fz in the negative Z-axis direction acts, the displacement state of the respective parts will be as shown in FIG. 9C. Though for the sake of illustration, states, in which the position of displaceable top plate 130 changes vertically by the extension or shrinkage of first displaceable plate 141 and second displaceable plate 142 in the Z-axis direction, are shown in schematic diagrams 9B and 9C, in actuality, the structure as a whole undergoes a predetermined form of deformation with the respective parts being in mutual relationships. That is, in actuality, when a force Fz in the Z-axis direction acts, first displaceable plate 141 and second displaceable plate 142 extend or shrink in the Z-axis direction and also become somewhat inclined with respect to base plate 200, and displaceable top plate 130 itself undergoes a deformation in which it extends in the planar direction and becomes convex in the upward or downward direction.

Regardless of the actual form of deformation, when a force +Fz of the positive Z-axis direction acts on force receiving member 110, the distance between displaceable top plate 130 and fixed top plate 330 expands and when a force −Fz in the negative Z-axis direction acts, the distance between displaceable top plate 130 and fixed top plate 330 shrinks. Thus if a Z-axis distance sensor that detects the distance between the two top plates is provided, the distance value that is detected by this sensor will indicate the force Fz in the Z-axis direction that acts on force receiving member 110. That is, if the detection value of this Z-axis distance sensor in the state shown in FIG. 9A is set as a reference value, an increase of the detected distance value with respect to the reference value will mean that a force +Fz in the positive Z-axis direction is detected and the amount of increase will indicate the magnitude of the acting force. Oppositely, when the detected distance value decreases with respect to the reference value, this will mean that a force −Fz in the negative Z-axis direction is detected and the amount of decrease will indicate the magnitude of the acting force.

As shown in the side view in section of FIG. 2, with the force detection device described in §1, fifth capacitance element C5, constituted of the electrode pair E5/F5, functions as the Z-axis sensor. Capacitance element C5 can thus be used for detecting the value of the force Fz in the Z-axis direction. However, since the magnitude of the distance between electrode pairs that constitute the capacitance element is in a reverse relationship with respect to the magnitude of the static capacitance value, when the static capacitance value C5 increases with respect to the reference value, this will mean that a force −Fz in the negative Z-axis direction is detected (state of FIG. 9C), and when the static capacitance value C5 decreases with respect to the reference value, this will mean that a force +Fz in the positive Z-axis direction is detected (state of FIG. 9B).

Figure 10A:
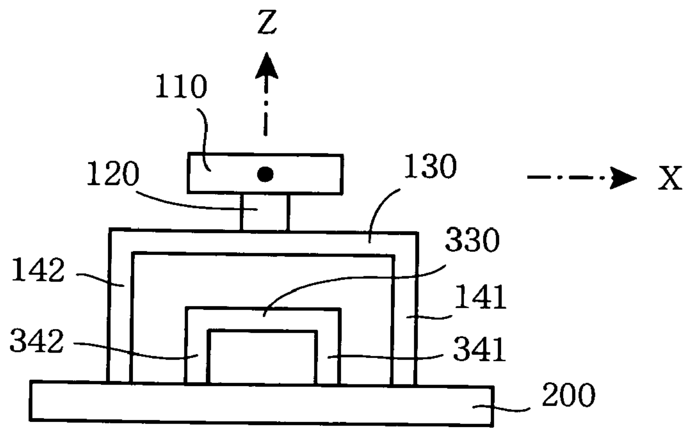
FIGS. 10A to 10C are schematic diagrams illustrating the principle of detection of a moment My about the Y-axis by the force detection device shown in FIG. 2.

Next, the principle of detection of a moment My about the Y-axis shall be described with reference to the schematic diagrams of FIGS. 10A to 10C. First, let the state shown in FIG. 10A be that in which no external force is acting. Then from this state, let a positive moment +My about the Y-axis act on force receiving member 110. Such a moment +My acts, on force receiving member 110 shown in FIG. 3, as a force that pushes an action point P1 downwards perpendicularly with respect to the paper surface and pushes an action point P2 upwards perpendicularly with respect to the paper surface. The respective parts of this force detection device will thus be displaced from the state shown in FIG. 10A to the state shown in FIG. 10B. On the other hand, if oppositely a negative moment −My about the Y-axis acts, the displacement states of the respective parts will be as shown in FIG. 10C. Though for the sake of illustration, states, in which the position of displaceable top plate 130 changes vertically due to the extension or shrinkage of first displaceable plate 141 and second displaceable plate 142 in the Z-axis direction, are illustrated in these schematic diagrams 10B and 10C as well, in actuality, the structure as a whole undergoes a predetermined form of deformation with the respective parts being in mutual relationships. Thus in actuality, first displaceable plate 141 and second displaceable plate 142 extend or shrink in the Z-axis direction and also become somewhat inclined with respect to base plate 200, and displaceable top plate 130 itself becomes deflected as well.

Regardless of the actual form of deformation, when a moment My about the Y-axis acts on force receiving member 110, displaceable top plate 130 becomes inclined in relation to the X-axis direction with respect to fixed top plate 330. Thus if an inclination degree sensor is provided that detects the inclination degree in relation to the X-axis direction of displaceable top plate 130 with respect to fixed top plate 330, the inclination degree value that is detected by this sensor will indicate the moment My about the Y-axis that acts on force receiving member 110. Let assume that an inclination degree sensor is prepared, which can indicate the inclination degree of displaceable top plate 130 in the state shown in FIG. 10A as zero. This sensor outputs the inclination degree upon inclination in the direction shown in FIG. 10B as a positive detection value, and outputs the inclination degree upon inclination in the direction shown in FIG. 10C as a negative detection value. In this case, the output of this inclination degree sensor will indicate the moment My about the Y-axis that acts on force receiving member 110.

As mentioned above, with the force detection device described in §1, the four capacitance elements C1 to C4, constituted of the four fixed electrodes E1 to E4, shown in FIG. 4, and the four displaceable electrodes F1 to F4, shown in FIG. 7, function as inclination degree sensors that detect the inclination degree of displaceable top plate 130 with respect to fixed top plate 330. Since this inclination degree sensor can detect an inclination degree in relation to the X-axis direction as a difference, (C1−C2), between the static capacitance value of first capacitance element C1 and the static capacitance value of second capacitance element C2, a moment My about the Y-axis is consequently detected as the value of (C1−C2).

The detection of a moment Mx about the X-axis that acts on force receiving member 110 can also be detected based on exactly the same principle. A moment Mx about the X-axis acts on force receiving member 110 in FIG. 3 as a force that pushes an action point P4 downwards perpendicularly with respect to the paper surface and pushes an action point P3 upwards perpendicularly with respect to the paper surface. Displaceable top plate 130 thus undergoes an inclination in relation to the Y-axis direction with respect to fixed top plate 330. Since with the force detection device described in §1, the inclination degree in relation to the Y-axis direction can be detected as the difference, (C4−C3), between the static capacitance value of third capacitance element C3 and the static capacitance value of fourth capacitance element C4, a moment Mx about the X-axis is consequently detected as the value of (C4−C3). Here, (C4−C3) is used in consideration of obtaining an Mx with the correct sign.

Thus by using the force detection device of the basic embodiment described in §1, the five components of a force Fx in the X-axis direction, a force Fy in the Y-axis direction, a force Fz in the Z-axis direction, a moment Mx about the X-axis, and a moment My about the Y-axis that act on force receiving member 110 can be detected in consideration of their respective signs. FIG. 11 shows a table that indicates, in consideration of the signs of the acting forces, the modes of variation of the static capacitance values of the respective capacitance elements C1 to C9 when forces of these five components act, and here "0" indicates no change, "+" indicates an increase, and "−" indicates a decrease.

In consideration that the results such as those shown in the table of FIG. 11 are obtained, by preparing, as detection processing unit 250 shown as a block in FIG. 1, a circuit that measures the static capacitance values of the nine capacitance elements C1 to C9 and a processing device that performs operations based on the equations shown in FIG. 12, it becomes possible to obtain the five components of Fx, Fy, Fz, Mx, and My.

The equations shown in FIG. 12 are equations in which the sign of the force that is obtained is considered. For example, a force Fx in the X-axis direction is determined by the difference, (C7−C6), a force Fy in the Y-axis direction is determined by the difference, (C9−C8), and the sign of each of these differences indicates whether the force is directed in the positive direction or the negative direction of the respective coordinate axis. Likewise, the moment Mx about the X-axis is determined by the difference (C4−C3), the moment My about the Y-axis is determined by the difference (C1−C2), and the sign of each of these differences indicates whether the moment is a positive direction moment (with a direction of rotation by which a right-handed screw is made to progress in the positive direction of the corresponding axis) about the respective coordinate axis or a negative direction moment (with a direction of rotation by which a right-handed screw is made to progress in the negative direction of the corresponding coordinate axis) about the respective axis. With regard to a force Fz in the Z-axis direction, since this is determined not as a difference of the static capacitance values of two capacitance elements but is determined by the static capacitance value C5 of fifth capacitance element C5 alone, the amount of increase or decrease of this capacitance value C5 with respect to a predetermined reference value indicates the magnitude of the force Fz that acts in the Z-axis direction as described above. Though in the equation of FIG. 12, Fz=−C5 and a minus sign is added to the front, this indicates that the increase/decrease relationship of the capacitance value C5 is opposite in sign to the force Fz (that is, an amount of increase of C5 indicates a force −Fz in the negative Z-axis direction and an amount of decrease of C5 indicates a force +Fz in the positive Z-axis direction). Also, as can be understood from the table of FIG. 11, a force Fz in the Z-axis direction can be determined by the equation, Fz=−(C1+C2+C3+C4+C5) or Fz=−(C1+C2+C3+C4).

As mentioned above, in the table of FIG. 11, a cell in which "+" is indicated signifies that when the corresponding force acts, the static capacitance value of the corresponding capacitance element increases and a cell in which "−" is indicated signifies that when the corresponding force acts, the static capacitance value of the corresponding capacitance element decreases. The reasons why such increases and decreases of static capacitance values occur have been described above using the schematic diagrams of FIGS. 8A to 10C. On the other hand, though a cell in which "0" is indicated signifies that even when the corresponding force acts, the static capacitance value of the corresponding capacitance element does not change, in actuality, the change of static capacitance will not necessarily be completely zero in all such cases. The validity of the contents of the respective cells of the table of FIG. 11 in which "0" is indicated shall now be examined.

Figure 8C:
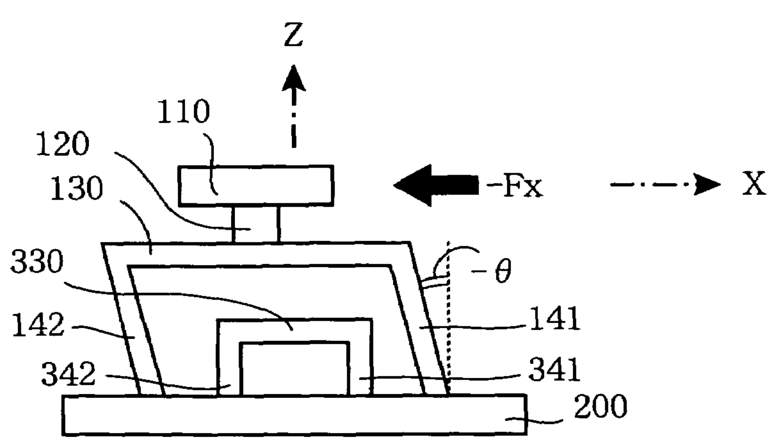

In the rows of ±Fx and rows of ±Fy in the table of FIG. 11, the contents of all of the cells for capacitance elements C1 to C5 are "0," and this is based on the premise that when a deformation such as that shown in FIG. 8B or 8C occurs, the distance between displaceable top plate 130 and fixed top plate 330 does not change at all. However in actuality, since when side surfaces deform to a parallelogram as shown in FIG. 8B or 8C, the distance between displaceable top plate 130 and fixed top plate 330 is slightly shortened, the contents of the respective cells mentioned above should not be "0" but should be "+." Also, even when just a force Fx in the X-axis direction acts on force receiving member 110, since the force is transmitted to displaceable top plate 130 via connecting member 120, the force will not necessarily be transmitted as a force that moves displaceable top plate 130 in parallel in the right direction of the figure but may cause displaceable top plate 130 to become slightly inclined from the level state as well. However when a force ±Fx actually acts, the changes of the static capacitance values of capacitance elements C1 to C5 will be small in comparison to the changes of the static capacitance values of capacitance elements C6 and C7, and when a force ±Fy acts, the changes of the static capacitance values of capacitance elements C1 to C5 will be small in comparison to the changes of the static capacitance values of capacitance elements C8 and C9. Thus within the range of measurement precision in which the changes of the static capacitance values of capacitance elements C1 to C5 when a force Fx or Fy acts can be ignored, the contents of the abovementioned cells can be considered as being practically "0."

Also in the rows of ±Fx in the table of FIG. 11, the contents of the cells for capacitance elements C8 and C9 are "0," and this is based on the premise that when a deformation such as shown in FIG. 8B or 8C occurs, third displaceable plate 143 and fourth displaceable plate 144 will be kept in vertical states and will not become inclined. This premise is also not necessarily satisfied in actuality. In particular, with the basic embodiment described in §1, since outer box-like structure 100 deforms in an overall manner, it can be considered that the abovementioned premise will not be satisfied completely. However, even in this case, the changes will normally be within a range that can be ignored in comparison to the changes of the static capacitance values of the cells in which "+" or "−" is indicated and can thus be considered to be "0." The same applies likewise to the cells for capacitance elements C6 and C7 in the rows of ±Fy.

The same reason applies furthermore as to why the contents of the cells for capacitance elements C6 to C9 in the rows of ±Fz in the table of FIG. 11 are "0." That is, when a deformation such as shown in FIG. 9B or 9C occurs, though first displaceable plate 141 to fourth displaceable plate 144 will not necessarily be kept in the vertical states and thus slight changes may occur in the static capacitance values of capacitance elements C6 to C9, it can be considered that such changes will normally be within a range that can be ignored.

Figure 10B:
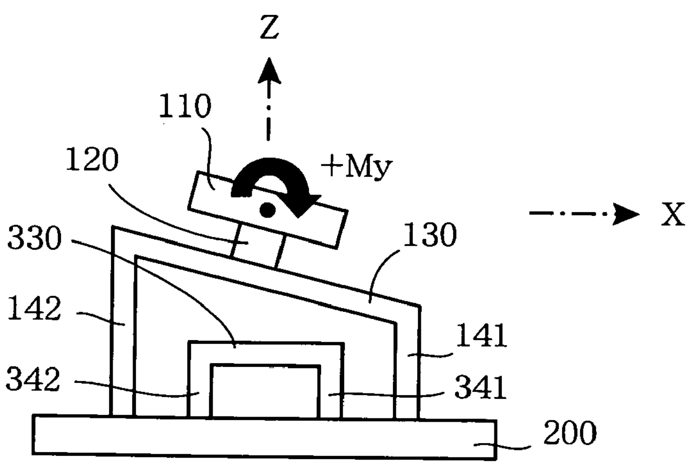
Figure 10C:
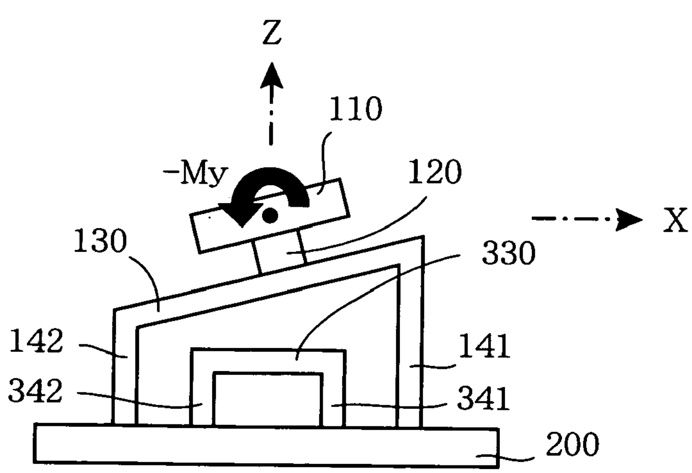

Next, in the table of FIG. 11, the contents of the cells for capacitance element C5 in the rows of ±Mx and the rows of ±My are "0." The contents of these cells for capacitance element C5 are "0" based on the reasoning that fifth fixed electrode E5, shown in FIG. 4, and fifth displaceable electrode F5, shown in FIG. 7, have shapes that are symmetrical with respect to the X-axis and Y-axis and thus even when a deformation such as that shown in FIG. 10B or 10C occurs, the electrode interval of capacitance element C5 will increase at a part but decrease at another part so that in total, the static capacitance value C5 will not change. Thus though the contents of the cells for capacitance element C5 may not actually be completely zero, there will not be a problem normally even if these are handled as being zero. The reason why the contents of the cells for capacitance elements C1 and C2 in the rows of ±Mx are "0" and why the contents of the cells for capacitance elements C3 and C4 in the rows of ±My are "0" is the same, and with these cases, it can be considered that though the electrode interval will increase at a part, it will decrease at another part so that the electrode interval will not change in total.

Also, the reason why the contents of the cells for capacitance elements C6 to C9 in the rows of ±Mx and ±My in the table of FIG. 11 are "0" is because, even though when a deformation such as that shown in FIG. 10B or 10C occurs, first displaceable plate 141 to fourth displaceable plate 144 may not necessarily be kept in the vertical states and thus slight changes may occur in the static capacitance values of capacitance elements C6 to C9, it can be considered that such changes will normally be within a range that can be ignored.

As another factor by which a "0" in the table shown in FIG. 11 may not be strictly "0," the effective areas of the electrodes must be considered. The parameters that determine the static capacitance value of a capacitance element are the dielectric constant between the electrodes, the electrode interval, and the electrode area. Though in the description up until now, only the electrode interval of a capacitance element was noted in considering changes of the static capacitance value, the electrode area of a capacitance element is also a parameter that changes the static capacitance value. Thus when a planar deviation occurs in the pair of opposing electrodes that constitute a capacitance element, the effective area in terms of the electrodes that constitute the capacitance element decreases and the static capacitance value thus changes.

In consideration of this point, the contents of the cells for capacitance elements C8 and C9 in the rows of ±Fx in the table of FIG. 11 are also affected by changes in the effective area of the electrodes and will not be strictly "0" due to this factor as well. For example, with the structure shown in FIG. 5, if due to an external force +Fx, first displaceable plate 141 and second displaceable plate 142 become inclined in the right direction of the figure and, as a result, the positions of third displaceable plate 143 and fourth displaceable plate 144 become shifted even slightly in the right direction of the figure, the effective areas in terms of the electrodes that constitute the capacitance elements decrease and changes of the static capacitance values of C8 and C9 cannot be avoided even if there are no changes in the electrode intervals of the electrode pair E8/F8 and electrode pair E9/F9. However, as long as the change of static capacitance value that is caused by such a change of effective area is within a range that can be ignored in comparison to a change of static capacitance value in a cell in which "+" or "−" is indicated, there will be no problem in setting the contents of the respective cells mentioned above to "0."

Thus in the table shown in FIG. 11, though with the cells in which "0" is indicated, the change of static capacitance value may not be strictly zero, if the degrees of change in the cells in which "+" or "−" is indicated are adequately significant in comparison to the degrees of change in the cells in which "0" is indicated, the five force components can be detected independent of each other by the detection principles based on this table. Designs, for making the actual capacitance value changes, which are related to the cells in which "0" is indicated, close to zero, shall be described in detail in §4 and §5.

Though with the force detection device described in §1, first displaceable plate 141 to fourth displaceable plate 144 and displaceable top plate 130 are prepared as side surfaces and the top surface of outer box-like structure 100 and first fixed plate 341 to fourth fixed plate 344 and fixed top plate 330 are prepared as side surfaces and the top surface of inner box-like structure 300, such box structures do not have to be used necessarily in putting this invention to practice. For example, for detection of a force Fx in the X-axis direction and a moment My about the Y-axis, it is adequate to prepare just the structure shown in FIG. 8A.

Also, though with the force detection device described in §1, first displaceable plate 141 to fourth displaceable plate 144 and first fixed plate 341 to fourth fixed plate 344 are positioned so as to be perpendicular to base plate 200 (and parallel to the YZ plane or the XZ plane), in principle, these do not necessarily have to be positioned perpendicular to base plate 200.

That is, it is sufficient that first displaceable plate 141 be positioned along a plane that intersects with a positive part of the X-axis and be supported directly on or indirectly via a member that undergoes elastic deformation on base plate 200 so as to be displaceable, second displaceable plate 142 be positioned along a plane that intersects with a negative part of the X-axis and be supported directly on or indirectly via a member that undergoes elastic deformation on base plate 200 so as to be displaceable, third displaceable plate 143 be positioned along a plane that intersects with a positive part of the Y-axis and be supported directly on or indirectly via a member that undergoes elastic deformation on base plate 200 so as to be displaceable, and fourth displaceable plate 144 be positioned along a plane that intersects with a negative part of the Y-axis and be supported directly on or indirectly via a member that undergoes elastic deformation on base plate 200 so as to be displaceable.

Also, it is sufficient that first fixed plate 341 be positioned between the Z-axis and first displaceable plate 141 and be fixed in some form onto base plate 200, second fixed plate 342 be positioned between the Z-axis and the second displaceable plate 142 and be fixed in some form onto base plate 200, third fixed plate 343 be positioned between the Z-axis and third displaceable plate 143 and be fixed in some form onto base plate 200, and fourth fixed plate 344 be positioned between the Z-axis and fourth displaceable plate 144 and be fixed in some form onto base plate 200.

Furthermore, it is sufficient that fixed top plate 330 be positioned along a plane spanning the vicinity of the upper edge of first fixed plate 341 and the vicinity of the upper edge of second fixed plate 342 and be fixed in some form to base plate 200 and displaceable top plate 130 be positioned above fixed top plate 330, be supported via a member that undergoes elastic deformation so as to be displaceable with respect to substrate 200, and be able to transmit forces along the XY plane onto the upper edge of first displaceable plate 141 and the upper edge of second displaceable plate 142.

<<<§3. Detection of a Moment Mz about the Z-axis >>>

With respect to the force detection device of the basic embodiment described in §1, the detection operations were explained in §2 so that the five force components of Fx, Fy, Fz, Mx, and My can be detected separately and independent of each other by carrying out calculations based on the equations shown in FIG. 12. Here, designs for detecting a sixth forth component, in other words, a moment Mz about the Z-axis shall be described.

Figure 13:
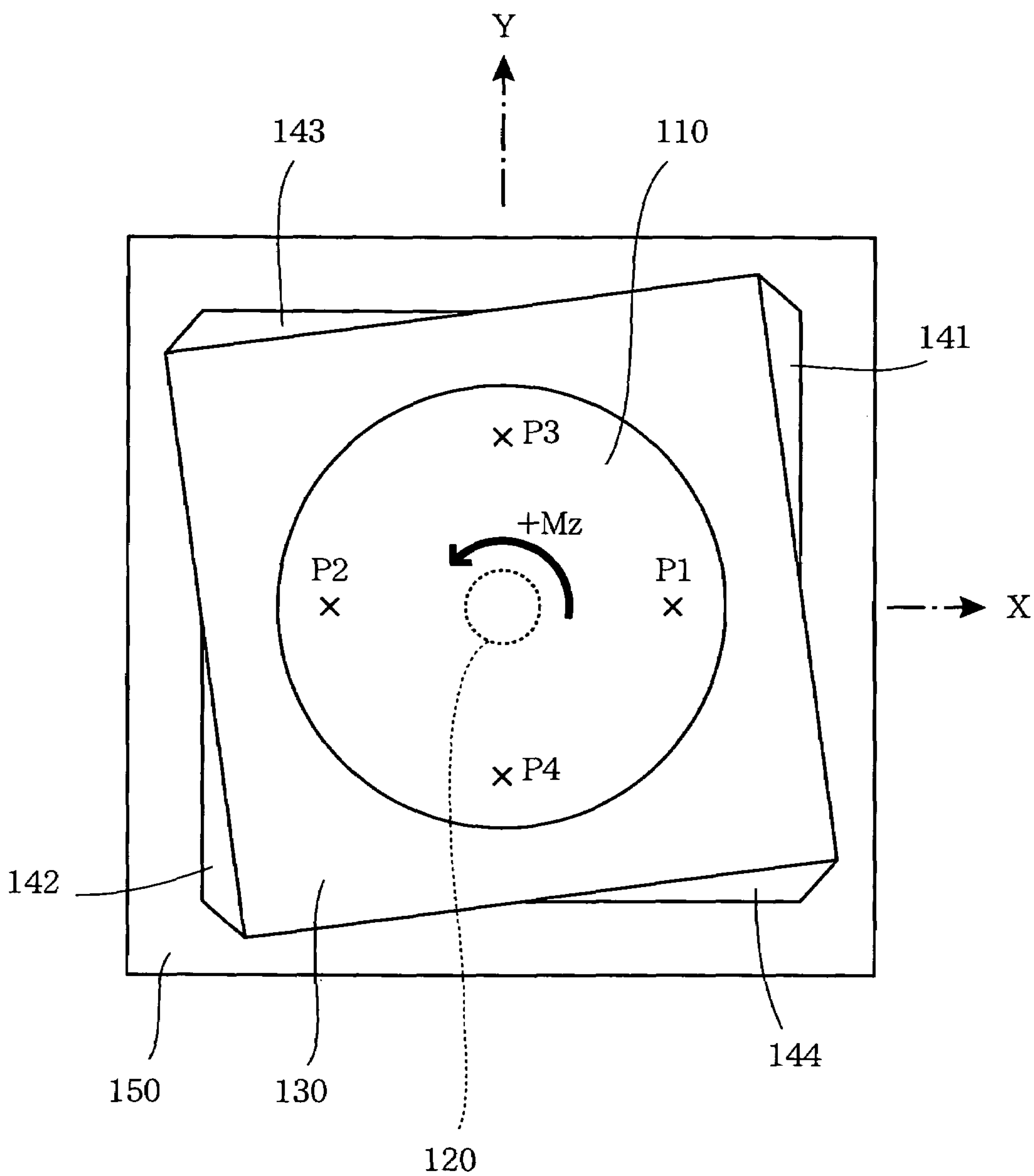
FIG. 13 is a top view showing a state in which a positive moment +Mz about the Z-axis is acting on the force detection device shown in FIG. 2.

FIG. 13 is a top view showing the state in which a positive moment +Mz about the Z-axis is acting on force receiving member 110 of this force detection device. As illustrated, the moment +Mz is a force that rotates force receiving member 110 counterclockwise and is a force that moves action points P1 to P4 on force receiving member 110 counterclockwise about the Z-axis. Since such a force is transmitted via connecting member 120 to displaceable top plate 130 as a twisting force, first displaceable plate 141 to fourth displaceable plate 144 become deflected as illustrated and displaceable top plate 130 also rotates counterclockwise. Needless to say, the rotation angle here will be in accordance with the magnitude of the acting moment Mz about the Z-axis. Thus by providing a rotation angle sensor for detecting a rotation angle about the Z-axis of displaceable top plate 130 with respect to fixed top plate 330, a moment Mz about the Z-axis that acts on force receiving member 110 can be detected based on the detection value of this rotation angle sensor.

Figure 14A:
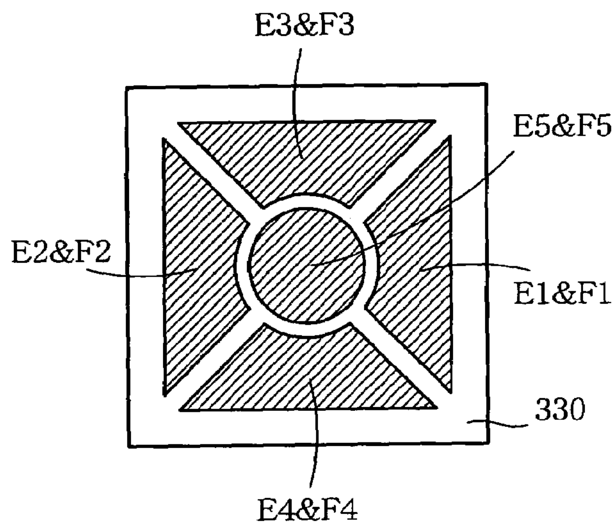
FIGS. 14A to 14C are top projections showing the principle of detection of a moment Mz about the Z-axis by the force detection device shown in FIG. 2 (the hatching indicates the effective area portions of electrode pairs that form capacitance elements and does not indicate cross sections).

Actually, the magnitude of this rotation angle can be detected using first capacitance element C1 to fourth capacitance element C4. The principle shall now be described with reference to the top projections of FIGS. 14A to 14C. FIG. 14A is a top projection showing the positional relationships of the five fixed electrodes E1 to E5 formed on the top surface of fixed top plate 330 and the five displaceable electrodes F1 to F5 formed on the bottom surface of displaceable top plate 130 in the state in which no external force is acting on the force detection device of the basic embodiment described in §1. Here, the hatching indicates the effective areas of the electrode pairs that constitute a capacitance element and does not indicate cross sections. As illustrated, in this state, the five displaceable electrodes F1 to F5 completely overlap with the five fixed electrodes E1 to E5 and the region corresponding to the total area (hatched part) of the actual electrodes contributes as a capacitance element.

Figure 14B:
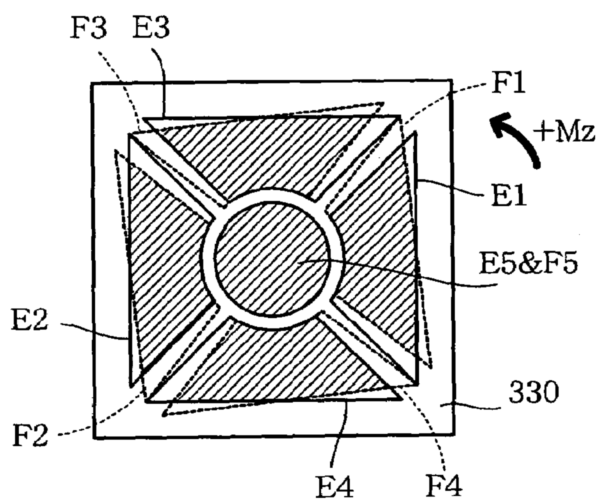

However, when as shown in FIG. 13, a positive moment +Mz about the Z-axis acts and displaceable top plate 130 rotates counterclockwise, the positional relationships of the respective electrodes change as shown in FIG. 14B. That is, though the positional relationship of the circular fixed electrode E5 and displaceable electrode F5, which are disposed at the center, do not change, since the four displaceable electrodes F1 to F4 (indicated by the broken lines) move counterclockwise, the effective area indicated by the hatching decreases. The static capacitance values of all four capacitance elements C1 to C4 thus decrease. Here, since the static capacitance value of capacitance element C5, formed by the electrode pair E5/F5, does not change, in the case where changes occur in C1 to C4 even though there is no change in C5, it can be judged a moment Mz about the Z-axis is acting.

Figure 14C:
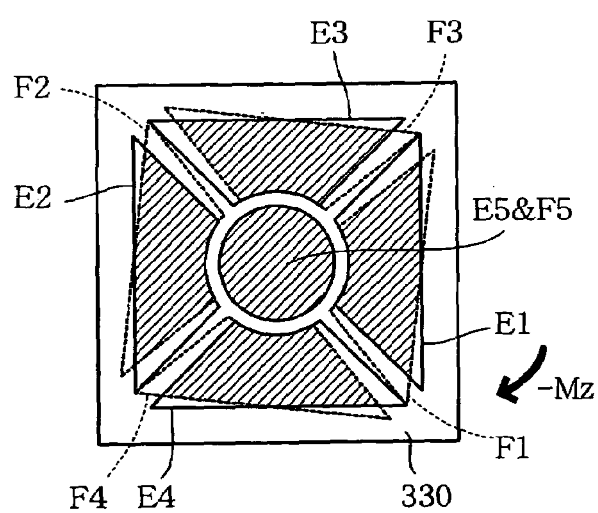

By making use of such principle, the magnitude of a moment Mz about the Z-axis can be detected even with the force detection device of the basic embodiment described in §1. However, the direction of moment Mz cannot be detected. That is, even in the case where a negative moment −Mz about the Z-axis acts and displaceable top plate 130 rotates clockwise, though the positional relationships of the respective electrodes will change as shown in FIG. 14C, the values of the static capacitance value C1 to C4 will still decrease. Thus though in the case where changes occur in C1 to C4 and there is no change in C5, the degree of change indicates the magnitude of the moment Mz about the Z-axis, the direction in which the moment is acting (that is, the sign of Mz) cannot be specified.

To perform detection that considers the direction (sign) of a moment Mz about the Z-axis, displaceable electrodes F1 to F4 are positioned at positions that are offset in a predetermined rotation direction with respect to the positions at which they oppose fixed electrodes E1 to E4. By doing so, it becomes possible to detect the rotation direction along with the rotation angle based on increases or decreases of the static capacitance values of capacitance elements C1 to C4.

Figure 15A:
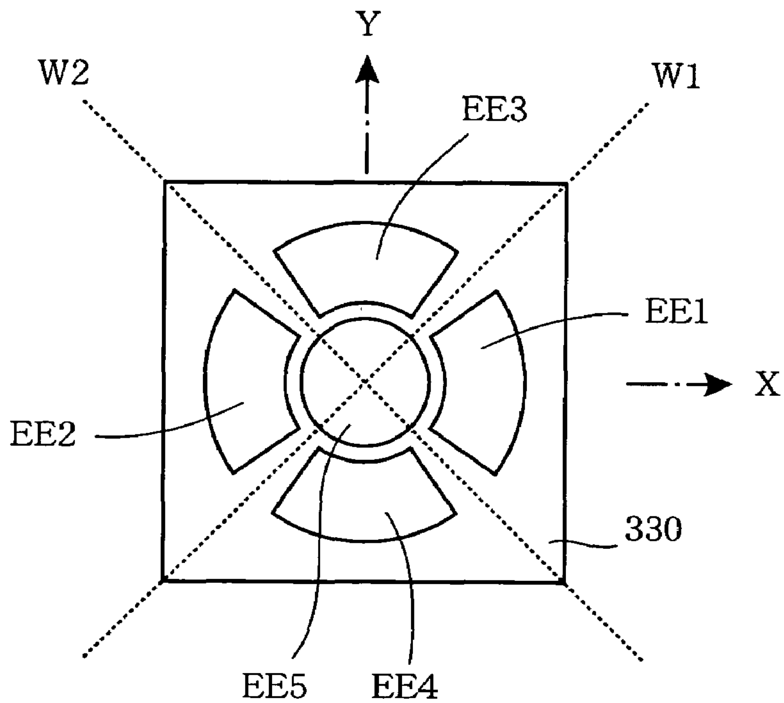
FIGS. 15A and 15B are top projections illustrating the electrode configuration of a modification example for detecting both the direction and magnitude of a moment Mz about the Z-axis by the force detection device shown in FIG. 2.

For example, five fixed electrodes EE1 to EE5 are formed on the top surface of fixed top plate 330 as shown in FIG. 15A. That is, when the X-axis and the Y-axis are projected onto the top surface of fixed top plate 330, first fixed electrode EE1 is formed on the projected image of a positive part of the X-axis, second fixed electrode EE2 is formed on the projected image of a negative part of the X-axis, third fixed electrode EE3 is formed on the projected image of a positive part of the Y-axis, fourth fixed electrode EE4 is formed on the projected image of a negative part of the Y-axis, and fifth fixed electrode EE5 is formed on the projected image of the origin O. Though in this example, fixed electrodes EE1 to EE4 have vane-like shapes, these do not have to be vane-like in shape. Also, fifth fixed electrode EE5 is used for the detection of a force Fz in the Z-axis direction and is not used in the detection of a moment about the Z-axis.

Figure 15B:
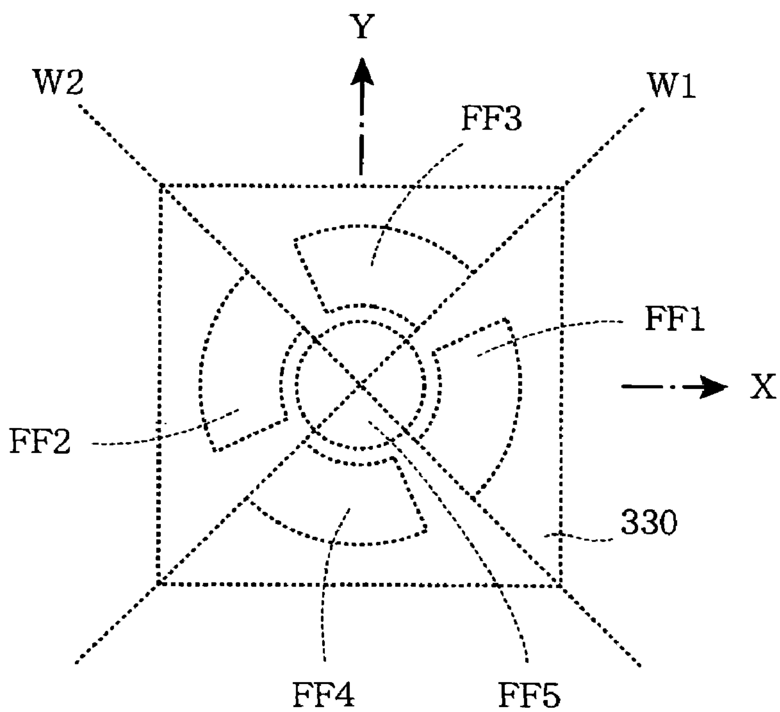

Meanwhile, on the bottom surface of displaceable top plate 130, five displaceable electrodes FF1 to FF5 are formed as shown in FIG. 15B. FIG. 15B does not show the bottom surface of displaceable top plate 130 but shows the positions of five displaceable electrodes FF1 to FF5 with respect to fixed top plate 330, in other words, shows the projected images when the five displaceable electrodes FF1 to FF5, formed on the bottom surface of displaceable top plate 130, are projected onto the top surface of fixed top plate 330. Thus in FIG. 15B, fixed top plate 330 and the five displaceable electrodes FF1 to FF5 are shown by broken lines.

In both FIGS. 15A and 15B, reference axes W1 and W2 are indicated by broken lines. These reference axes W1 and W2 correspond to the diagonals of a square that forms the top surface of fixed top plate 330. A comparison of the positional relationships of the respective reference axes W1 and W2 and the respective fixed electrodes EE1 to EE4 shown in FIG. 15A and the positional relationships of the respective reference axes W1 and W2 and the respective displaceable electrodes FF1 to FF4 shown in FIG. 15B shows that displaceable electrodes FF1 to FF4 are positioned at positions that are offset by just a predetermined rotation angle in the clockwise direction. For example, first displaceable electrode FF1 is positioned at a position that is offset by just a predetermined rotation angle in the clockwise direction with respect to the position that opposes first fixed electrode EE1.

Figure 16A:
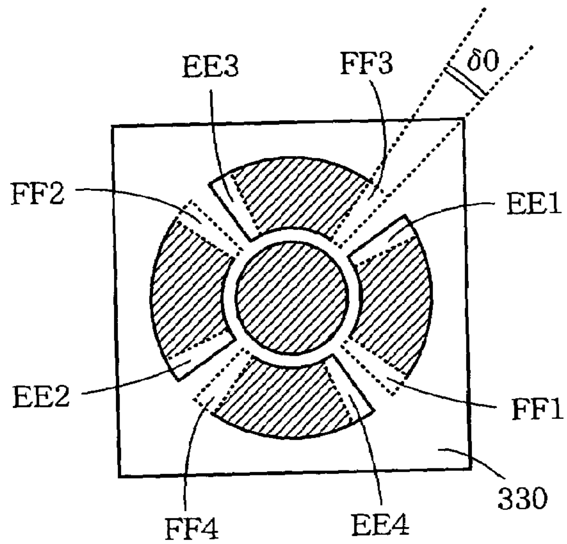
FIGS. 16A to 16C are top projections showing the principle of detection of a moment Mz about the Z-axis by the force detection device with the electrode configuration shown in FIG. 15 (the hatching indicates the effective area portions of electrode pairs that form capacitance elements and does not indicate cross sections).
Figure 16B:
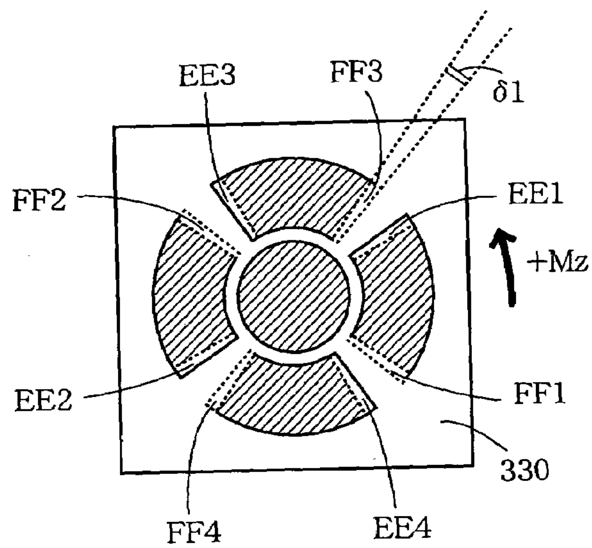
Figure 16C:
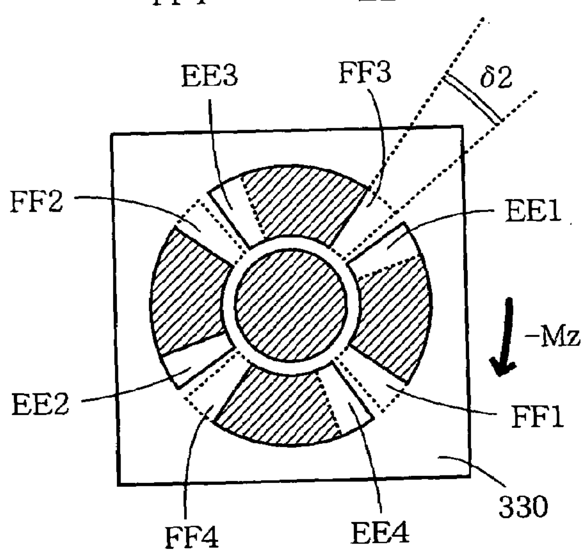

FIGS. 16A to 16C show top projections for illustrating the changes of the effective areas of the electrodes in the force detection device with such an offset electrode configuration. The hatching does not indicate cross sections but indicates the effective areas of electrode pairs that constitute capacitance elements in this figure as well. First, FIG. 16A shows the positional relationships of the five fixed electrodes EE1 to EE5 (indicated by solid lines), formed on the top surface of fixed top plate 330, and the five displaceable electrodes FF1 to FF5 (indicated by broken lines), formed on the bottom surface of displaceable top plate 130, in the state in which no external force is acting. As illustrated, in this state, the four displaceable electrodes FF1 to FF4 are shifted by just an offset angle $\delta$ 0 with respect to the four fixed electrodes EE1 to EE4. In this state, the effective areas in terms of the electrodes constituting the capacitance elements are the areas of the regions indicated by the hatching in the figure.

Here, when a positive moment +Mz about the Z-axis acts and displaceable top plate 130 rotates counterclockwise, the positional relationships of the respective electrodes change as shown in FIG. 16B. That is, the offset angle decreases to $\delta$ 1 and the effective areas of the electrodes increase. This means that the static capacitance values of the four capacitance elements C1 to C4 increase. Oppositely, when a negative moment −Mz about the Z-axis acts and displaceable top plate 130 rotates clockwise, the positional relationships of the respective electrodes change as shown in FIG. 16C. That is, the offset angle increases to $\delta$ 2 and the effective areas of the electrodes decrease. This means that the static capacitance values of the four capacitance elements C1 to C4 decrease. Thus by determining the sum of the static capacitance values of the four capacitance elements C1 to C4, the rotation angle and the rotation direction can be determined based on the increase or decrease of this sum.

The table shown in FIG. 17 has the rows for moments ±Mz about the Z-axis added to the table of FIG. 11, and with the equations shown in FIG. 18, an equation concerning Mz is added to the equations shown in FIG. 12. Thus by using fixed electrodes EE1 to EE5, shown in FIG.15A, and displaceable electrodes FF1 to FF5, shown in FIG. 15B, in place of the fixed electrodes E1 to E5 and displaceable electrodes F1 to F5 of the force detection device described in §1, detection by the principles illustrated in the table of FIG. 17 becomes possible and the six components of Fx, Fy, Fz, Mx, My, and Mz can be detected independent of each other as indicated by the equations of FIG. 18.

As is clear from the table of FIG. 17, even if all of the static capacitance values of capacitance elements C1 to C4 increase or decrease, the cause of such increase or decrease is not necessarily based on the actions of a moment Mz about the Z-axis in all cases. This is because increases or decreases of the static capacitance values of capacitance elements C1 to C4 can also occur due to the action of a force Fz in the Z-axis direction. Meanwhile, an increase or decrease of the static capacitance value of capacitance element C5 will mostly be due to the action of a force Fz in the Z-axis direction. Thus under an environment in which a force Fz in Z-axis direction acts, a correction of eliminating the amount due to the action of a Z-axis direction force Fz must be performed on the sum of the static capacitance values of the four capacitance elements C1 to C4 and the corrected value must be used as that of the moment Mz about the Z-axis. The correction term f (Fz) indicated in the equation for Mz in FIG. 18 is a term for performing such a correction.

<<<§4. Embodiment with a Simplified Electrode Configuration >>>

With the embodiment described in §1, nine fixed electrodes E1 to E9 are formed on the inner box-like structure 300 and nine displaceable electrodes F1 to F9 are formed on the outer box-like structure 100, that is, a total of 18 electrodes are used to arrange a total of nine capacitance elements C1 to C9. However, 18 electrodes are not necessarily required to arrange the nine capacitance elements. For example, the nine fixed electrodes E1 to E9 may be arranged as a single common fixed electrode or the nine displaceable electrodes F1 to F9 can be arranged as single common displaceable electrodes. The embodiment described here is an example of the latter. According to this embodiment, though nine fixed electrodes E1 to E9 must be formed on the inner box-like structure 300, a single common displaceable electrode is arranged on the outer box-like structure 100 to simplify the electrode configuration.

Moreover with the embodiment described here, since outer box-like structure 100 is formed of a conductive material and first displaceable plate 141 to fourth displaceable plate 144 and displaceable top plate 130 are themselves used as displaceable electrodes, the electrode configuration can be practically realized by simply preparing nine fixed electrodes E1 to E9 on the inner box-like structure 300.

Figure 19:
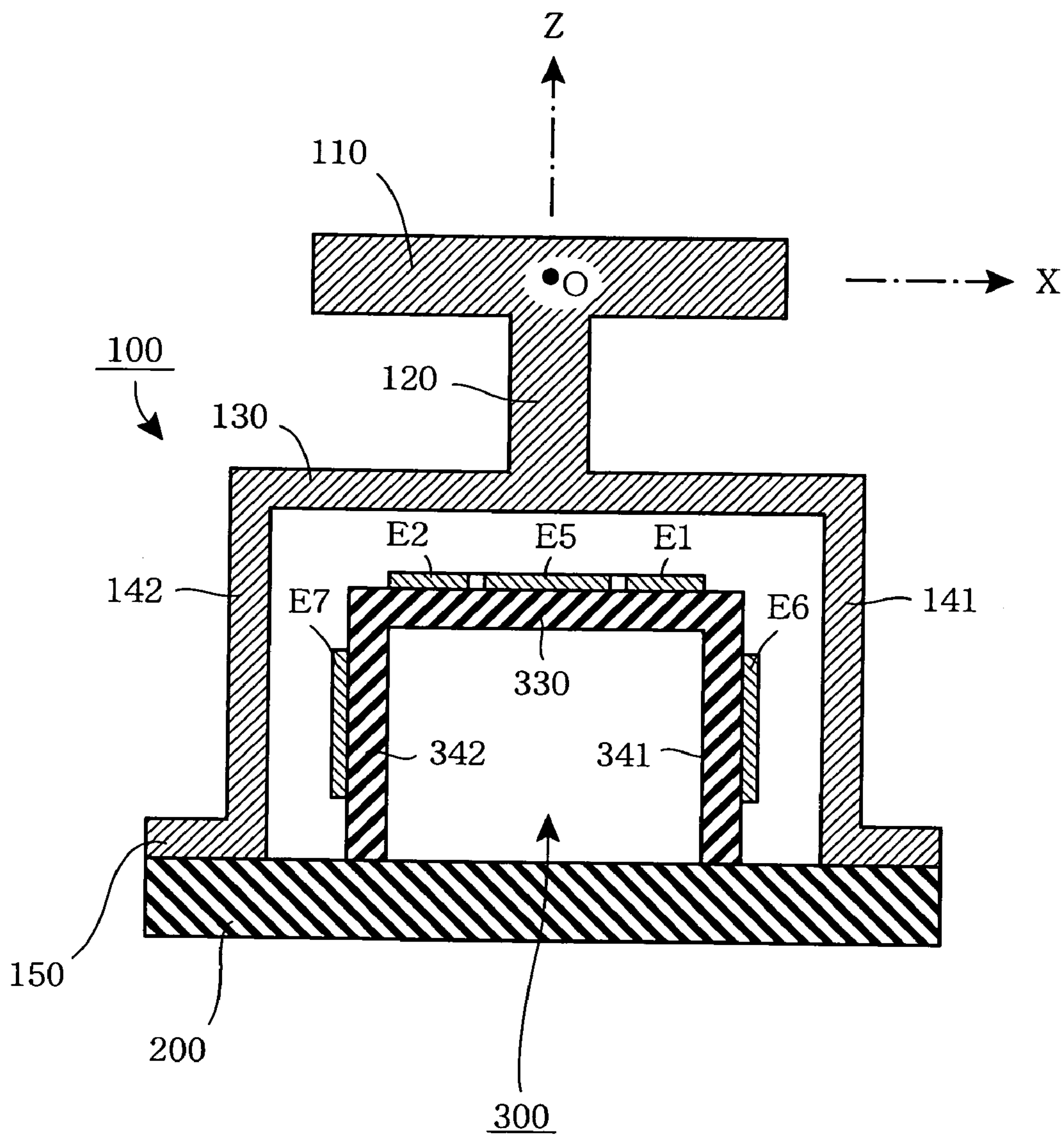
FIG. 19 is a side view in section of a force detection device of an embodiment with which the electrode configuration is simplified.

FIG. 19 is a side view in section (section along the XZ plane) showing the basic arrangement of a force detection device of an embodiment to be described in this §4 and corresponds to FIG. 2 for the embodiment described in §1. The differences with respect to the force detection device shown in FIG. 2 are that force receiving member 110, connecting member 120, and outer box-like structure 100 (displaceable top plate 130, first displaceable plate 141 to fourth displaceable plate 144, and pedestal 150) are formed of a conductive material and displaceable electrodes F1 to F9 are all omitted. Since the entirety of outer box-like structure 100 is formed of a conductive material, the parts of outer box-like structure 100 that oppose the respective fixed electrodes E1 to E9 serve the functions of displaceable electrodes F1 to F9, respectively. In other words, outer box-like structure 100 itself functions as a single common displaceable electrode. The detection operations of the force detection device shown in FIG. 19 are exactly the same as the detection operations of the force detection device shown in FIG. 2 and are as has been described in §2.

Though the force detection device shown in FIG. 19 thus has the merit of being simple in mechanical structure in comparison to the force detection device shown in FIG. 2, this is not the only merit. In §2, a change of the effective area of an electrode was described as a cause as to why "0" is not realized strictly even when "0" is indicated in the table shown in FIG. 11. For example, as has been described above, with the force detection device shown in FIG. 2, when for the structure shown in FIG. 5, first displaceable plate 141 and second displaceable plate 142 become inclined in the right direction of the figure due to the action of an external force +Fx and consequently the positions of third displaceable plate 143 and fourth displaceable plate 144 becomes shifted even slightly in the right direction in the figure, the effective areas of the electrode pair E8/F8 and the electrode pair E9/F9 decrease and cause changes in the static capacitance values C8 and C9. However, with the force detection device shown in FIG. 19, changes in the static capacitance values due to such a cause will not occur.

To be specific, with the force detection device shown in FIG. 19, capacitance element C6 is constituted of fixed electrode E6 and a displaceable electrode formed by a part (the region that opposes fixed electrode E6) of displaceable plate 141, and here, no matter how displaceable plate 141 becomes displaced, the effective electrode area that constitutes capacitance element C6 is fixed. That is, by setting the area of either one of the fixed electrode and displaceable electrode, which constitute a capacitance element as a pair, wider than the area of the other, the static capacitance value can be prevented from changing even if the displaceable electrode undergoes a displacement within a predetermined range in a planar direction. With the force detection device shown in FIG. 19, since outer box-like structure 100 is a single common displaceable electrode, the area of a displaceable electrode will always be set wider than the area of a fixed electrode and a change in the static capacitance value will not occur even if the displaceable electrode is displaced in a planar direction.

A metal is most suited as the conductive material for forming outer box-like structure 100. Due to the principles of detection by this force detection device, outer box-like structure 100 must be able to undergo elastic deformation with some degree of freedom. A metal has the property of being able to undergo some degree of elastic deformation, is conductive, and moreover has integrity. With the force detection device shown in FIG. 19, for example, force receiving member 110, connecting member 120, and outer box-like structure 100 may be formed of a metal, such as aluminum. Base plate 200 and inner box-like structure 300 may be formed of an insulating material, such as a ceramic. However, in order to avoid the occurrence of changes in the electrode intervals of the capacitance elements due to thermal expansion of the respective parts caused by changes of the temperature environment, all parts are preferably formed of the same metal, such as aluminum. When all parts are formed of the same metal, since fixed electrodes E1 to E9 must be in electrically separated states, for example, ceramic substrates may be adhered onto the outer surfaces of inner box-like structure 300 and the respective fixed electrodes E1 to E9 may be formed on top of these ceramic substrates. Ceramic substrates are excellent in insulating property, small in the thermal expansion coefficient, and are thus optimal for the above use. Needless to say, in putting the present invention into practice, the materials of the respective parts are not restricted to specific materials With the arrangement shown in FIG. 19, a force detection device with the function of detecting a moment Mz about the Z-axis cannot be realized as described in §3. This is because displaceable top plate 130, which is conductive, acts in itself as a single common displaceable electrode with respect to fixed electrodes E1 to E4 and even when a rotational displacement about the Z-axis occurs with displaceable top plate 130, a change in effective area will not occur in terms of the electrodes constituting capacitance elements C1 to C4.

Figure 20:
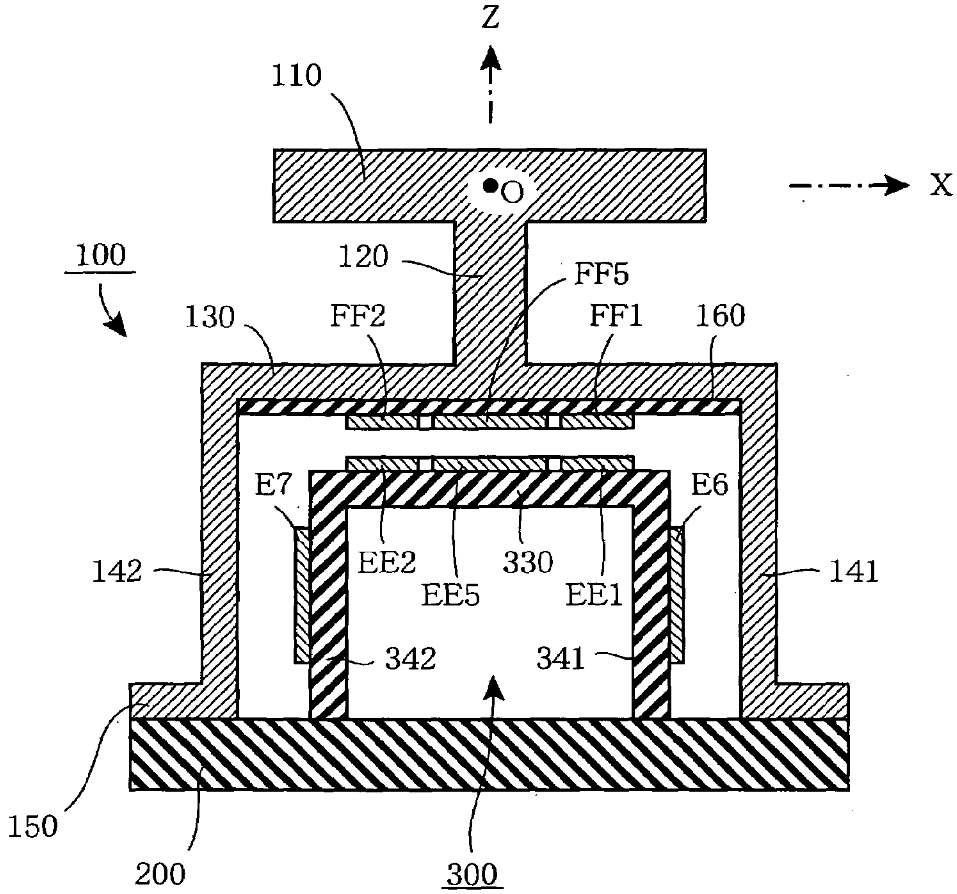
FIG. 20 is a side view in section of a force detection device of another embodiment with which the electrode configuration is simplified.

In order to realize a force detection device with the function detecting a moment Mz about the Z-axis, an arrangement such as shown in the side view in section of FIG. 20 may be used. Though this force detection device is the same as the force detection device shown in FIG. 19 in that the entirety of outer box-like structure 100 is formed of a conductive material, here, five displaceable electrodes FF1 to FF5 are formed on an insulating layer 160 on the bottom surface of displaceable top plate 130 and five fixed electrodes EE1 to EE5 are formed on the top surface of fixed top plate 330 so as to oppose the displaceable electrodes. Here, displaceable electrodes FF1 to FF4 and fixed electrodes EE1 to EE4 are positioned as shown in FIGS. 15A and 15B and arranged so that there is an offset in a predetermined rotation direction.

Figure 21:
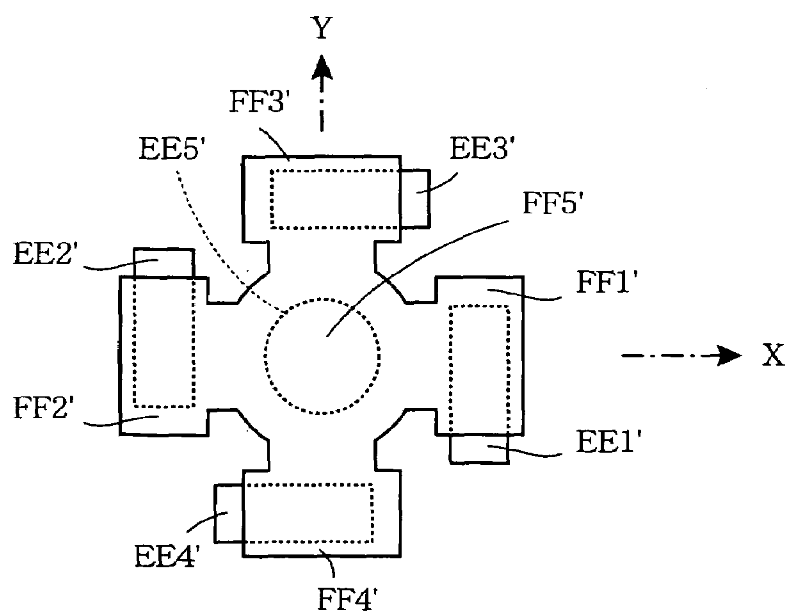
FIG. 21 is a plan view showing an example of an electrode configuration suited for the detection of a moment Mz about the Z-axis.

FIG. 21 is a plan view showing an example of an electrode configuration of fixed electrodes and displaceable electrodes that is considered to be most preferable in realizing a force detection device having the function of detecting a moment Mz about the Z-axis. The five electrodes EE1' to EE5' shown in the figure are fixed electrodes positioned on the top surface of fixed top plate 330, and the opposing electrodes FF1' to FF5' are displaceable electrodes positioned on the bottom surface of displaceable top plate 130. FIG. 21 is a plan view showing the state in which displaceable electrodes FF1' to FF5' are positioned above fixed electrodes EE1' to EE5', and the parts of fixed electrodes EE1' to EE5' that are indicated by broken lines are the parts that are hidden below displaceable electrodes FF1' to FF5'. As illustrated there is an offset in a predetermined rotation direction between displaceable electrodes FF1' to FF4' and fixed electrodes EE1' to EE4'.

Also as illustrated, whereas the five electrodes EE1' to EE5' are electrodes that are physically independent of each other, displaceable electrodes FF1' to FF5' are fused mutually and form a single common displaceable electrode. Even when displaceable electrodes FF1' to FF5' are thus arranged as a single common displaceable electrode, five capacitance elements C1 to C5 are still constituted and the six force components can be detected based on the principles shown by the table of FIG. 17.

With the electrode configuration shown in FIG. 21, displaceable electrodes FF1' to FF5' are arranged as a single common displaceable electrode and the area of each individual displaceable electrode is set to be always wider than the area of a fixed electrode. Thus even if a displaceable electrode is displaced in a planar direction (a direction parallel to the XY plane), erroneous detection of this displacement as a moment Mz about the Z-axis can be prevented. For example, even if the entirety of displaceable electrodes FF1' to FF5' moves slightly parallel in the right direction of the figure from the state shown in FIG. 21, (such a parallel movement will occur if a force +Fx is applied), the effective area related to the electrode pair EE1'/FF1' and the effective area related to the electrode pair EE2'/FF2' will not change. Though in this case, the effective area related to the electrode pair EE3'/FF3' will increase, since the effective area related to the electrode pair EE4'/FF4' will oppositely decrease, the total of the static capacitance values of the four capacitance elements will not change. In the equation shown in FIG. 18, a moment Mz about the Z-axis is detected by the total of the static capacitance values of the four capacitance elements C1 to C4 in consideration of this merit. With the electrode configuration shown in FIG. 21, when a force +Fx is applied, since the static capacitance value C3 increases and C4 decreases, the same capacitance value changes as those of the cells of ±Mx in the table of FIG. 17 occur. However, since the capacitance change due to an increase or decrease of the effective area of an electrode is adequately small in comparison to a capacitance change caused by an increase or decrease of an electrode interval, a force Fx in the X-axis direction will not be detected significantly as a moment Mx about the X-axis. Likewise, a force Fy in the Y-axis direction will not be detected significantly as a moment My about the Y-axis.

<<<§5. Embodiment with a Practical Structure >>>

With the force detection device of the basic embodiment described in §1, outer box-like structure 100, having a rectangular parallelepiped shape with an open bottom surface and formed of a material that undergoes elastic deformation due to the action of an external force, has its bottom surface joined to base plate 200 so as to be set on the base plate, the four side plates 141 to 144 of this outer box-like structure 100 are used as the displaceable plates, and top plate 130 of this outer box-like structure 100 is used as the displaceable top plate. Also, inner box-like structure 300, having a rectangular parallelepiped shape that is smaller than outer box-like structure 100, is joined to base plate 200 in the state in which it is contained in outer box-like structure 100, and the four side plates 341 to 344 and top plate 330 of this inner box-like structure 300 are used as the fixed plates and the fixed top plate.

Such use of outer box-like structure 100 and inner box-like structure 300 is useful in that the components necessary for carrying out the present invention can be positioned at the required position by comparatively simple structures. However, the structure of the basic embodiment described in §1 may not always carry out measurements at adequate precision. The reason is that, as was described in §2, though in the table of FIG. 11 or 17, the cells in which "0" is indicated signifies that even when a corresponding force acts, changes will not occur in the static capacitance values of the corresponding capacitance elements, in actuality, the changes of the static capacitance values will not be completely zero in all of these cases. If a significant change in static capacitance value is detected in relation to a cell in which "0" is indicated in an abovementioned table, the detection result of each individual force component will be interfered by the other force components and it will not be possible to detect the respective force components independent of each other.

In order to eliminate the interference of other force components as much as possible and obtain detection values of high precision, a structure satisfying the following conditions must be realized. A first condition is that when a force Fx in the X-axis direction or a force Fy in the Y-axis direction acts on force receiving member 110, though displacements will occur with displaceable electrodes F6 to F9, which are formed at the displaceable plates 141 to 144, no displacement will occur with displaceable electrodes F1 to F5, which are formed on the displaceable top plate 130 or even if displacements occur, such displacements will be extremely small in comparison to the displacements that occur with displaceable electrodes F6 to F9. A second condition is that when a force Fz in the Z-axis direction, a moment Mx about the X-axis, or a moment My about the Y-axis acts on force receiving member 110, though displacements will occur with displaceable electrodes F1 to F5, which are formed on the displaceable top plate 130, no displacement will occur with displaceable electrodes F6 to F9, which are formed on displaceable plates 141 to 144, or even if displacements occur, such displacements will be extremely small in comparison to the displacements that occur with displaceable electrodes F1 to F5.

Here, modification examples with structural designs that are effective for satisfying the above two conditions shall be described. First, with the modification example shown in FIG. 22, a U-shaped slit S, which opens upward, is formed in a side plate 140 of the force detection device of the basic embodiment shown in FIG. 1 and a part 140A that is surrounded by this slit S is used as a displaceable plate. As illustrated, due to U-shaped slit S, side plate 140 is divided into a part 140A, which is surrounded by slit S, and a margin plate 140B at the outer side of slit S. Here, the part 140A, which is surrounded by slit S, is used as a displaceable plate. Since outer box-like structure 100 actually has first side plate 141 to fourth side plate 144, U-shaped slits S1 to S4, which open upward, are formed respectively in the four side plates to form first displaceable plate 141A to fourth displaceable plate 144A and margin plates 141B to 144B.

Figure 23:
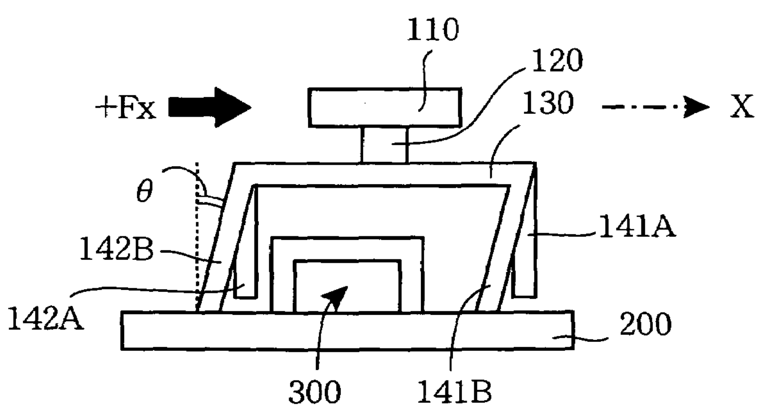
FIG. 23 is a schematic diagram illustrating the principle of detection of a force Fx in the X-axis direction by the force detection device shown in FIG. 22.

When a force Fx in the X-axis direction acts on outer box-like structure 100 in which slits S are formed in such a manner in the respective side plates, the overall frame structure of outer box-like structure 100 deform to a parallelepiped as shown in FIG. 23. However, since the parts forming this frame structure are parts, such as margin plates 141B and 142B that are at the outer sides of slits S, displaceable plates 141A and 142A, which are parts at the inner sides of slits S, move in parallel in the positive X-axis direction along with displaceable top plate 130. It can be understood from a comparison of FIG. 23 with FIG. 8B that by the forming of these slits S, the effect of increasing the displacements of displaceable plates 141A and 142A is provided.

Figure 24:
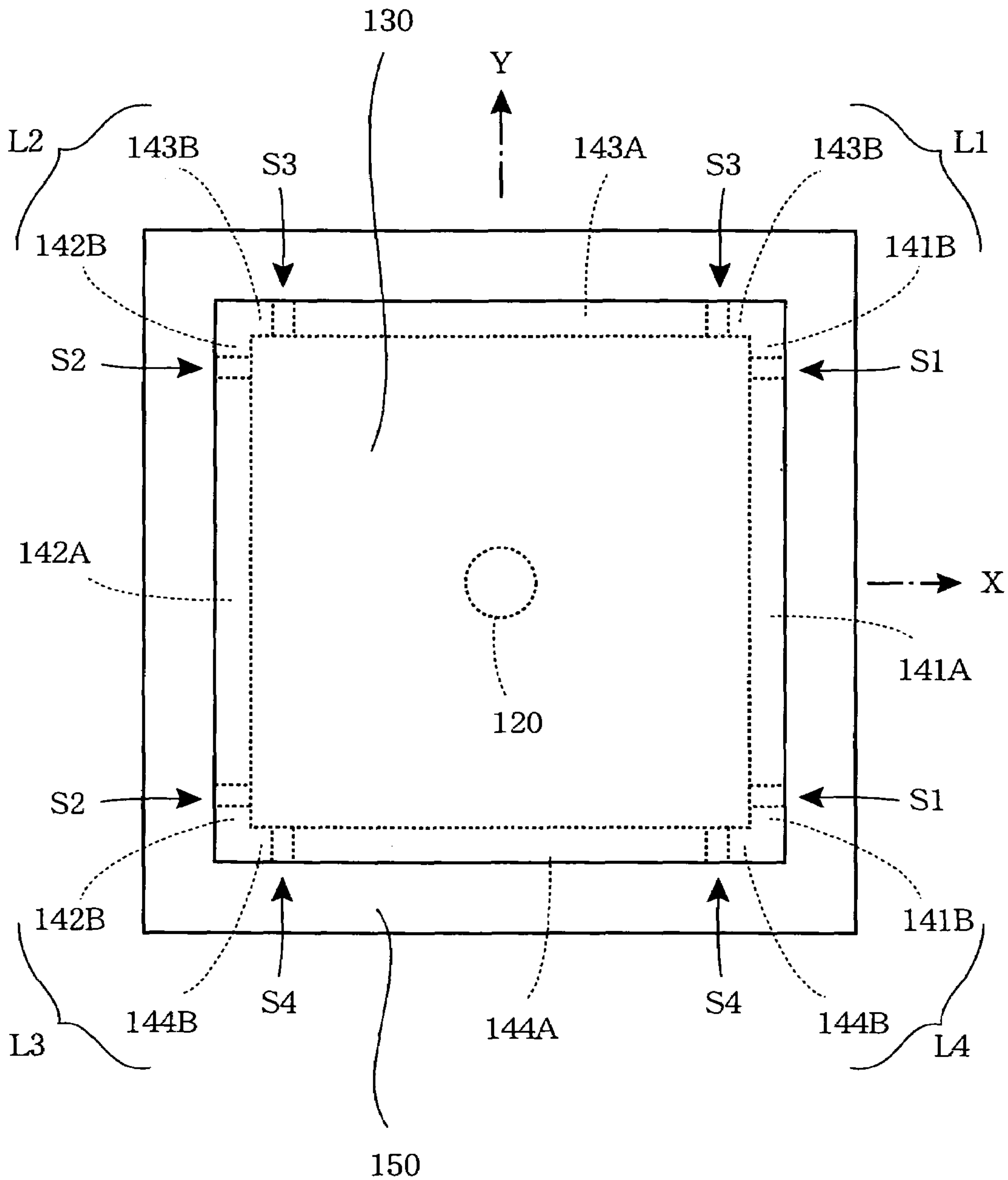
FIG. 24 is a top view of the force detection device shown in FIG. 22 (a force receiving member 110 and a connecting member 120 are omitted from illustration).

FIG. 24 is a top view showing a state in which slits S1 to S4 are formed respectively in the four side plates 141 to 144 that form outer box-like structure 100 to thereby form first displaceable plate 141A to fourth displaceable plate 144A and margin plates 141B to 144B (force receiving member 110 and connecting member 120 are omitted from illustration). Here, if the edges parallel to the Z-axis at the intersections of two mutually adjacent side plates are considered as being columns, a total of four columns L1 to L4 are formed by margin plates 141B to 144B, which exist at the positions of the four corners of displaceable top plate 130 as illustrated. The structure is thus one in which displaceable top plate 130 is supported by these four columns L1 to L4 and outer box-like structure 100 deforms by the elastic deformation of these four columns L1 to L4.

Figure 22:
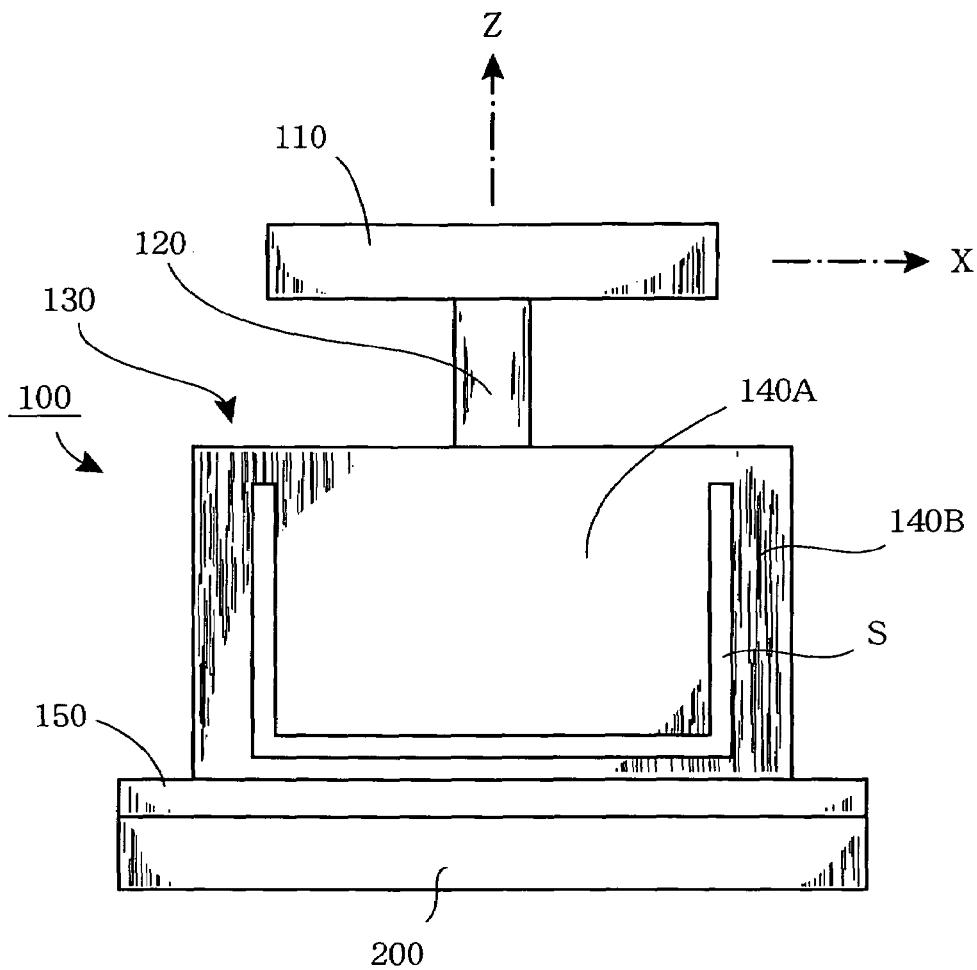
FIG. 22 is a side view of a force detection device of a practical embodiment of this invention.

In other words, outer box-like structure 100, which is shown in FIGS. 22 and 24, has a structure wherein four columns L1 to L4, formed of a material that undergoes elastic deformation due to the action of an external force, are joined in a perpendicularly erected state to base plate 200 and the four corners of top plate 130, which functions as a displaceable top plate, are joined to the upper ends of the four columns L1 to L4. Moreover, each of displaceable plates 141A to 144A is positioned between a pair of mutually adjacent columns and the upper edge of each of displaceable plates 141A to 144A is joined to one edge of top plate 130. Each of displaceable plates 141A to 144A is thus supported on base plate 200 by its upper edge being joined to one edge of top plate 130.

With such a structure with slits S, when a force Fx in the X-axis direction or a force Fy in the Y-axis direction acts on force receiving member 110, the displacements that occur in regard to displaceable electrodes F1 to F5, formed on the displaceable top plate 130, can be made extremely small in comparison to the displacements that occur in regard to displaceable electrodes F6 to F9. The abovementioned first condition is thus satisfied.

Figure 25:
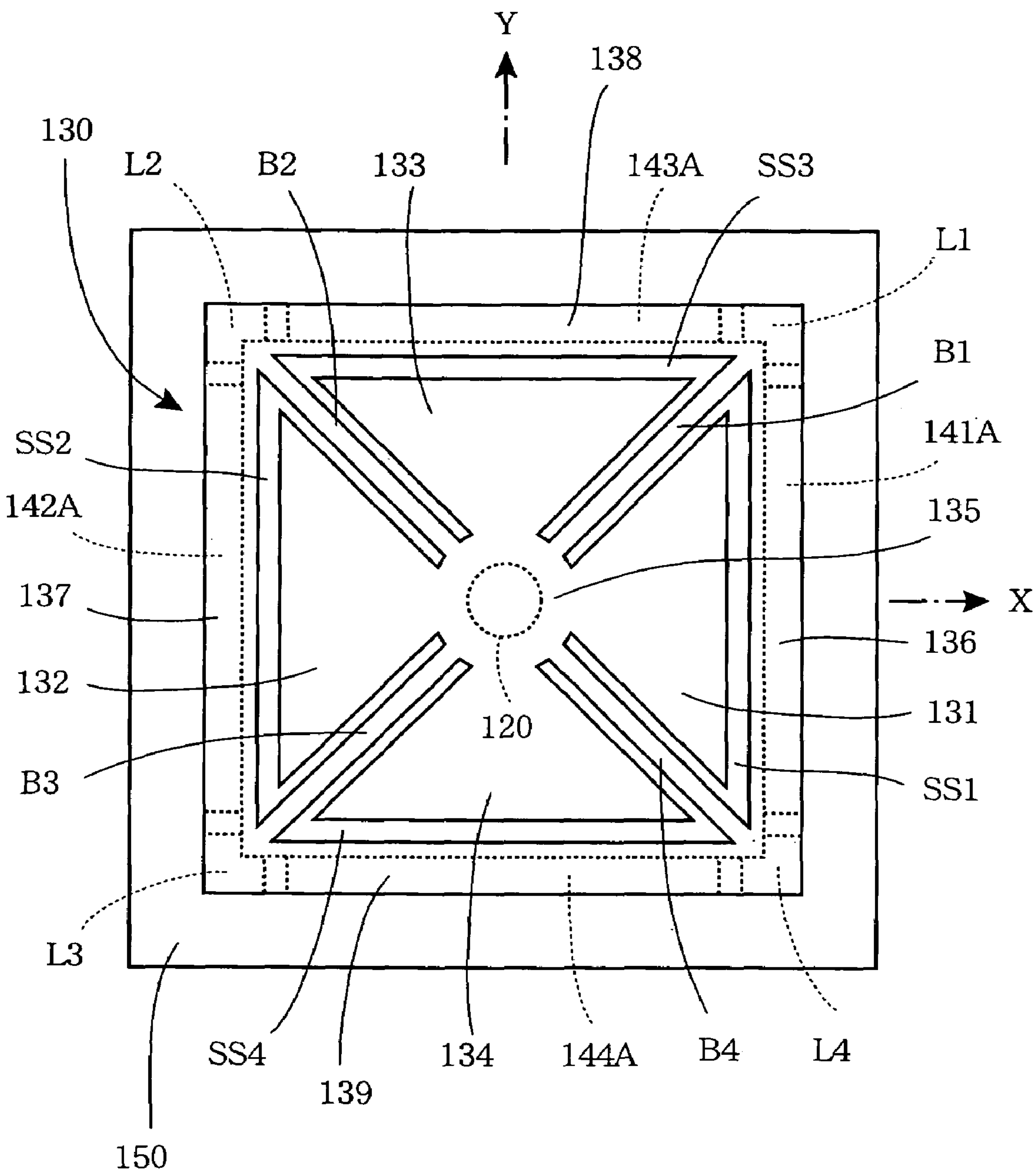
FIG. 25 is a top view of a modification example of the force detection device shown in FIG. 22 (force receiving member 110 and connecting member 120 are omitted from illustration).
Figure 26:
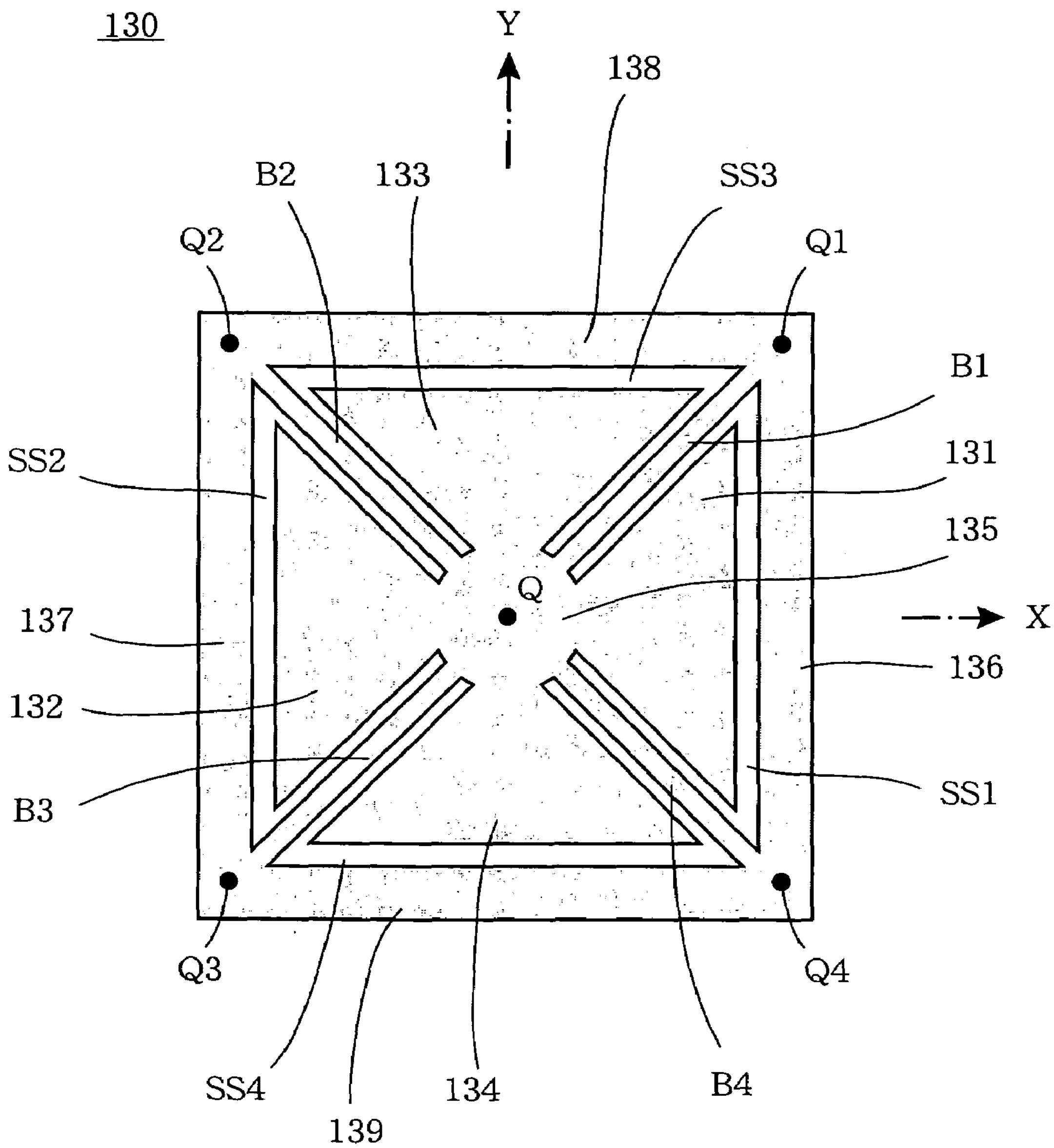
FIG. 26 is a diagram showing the structure of a top plate 130 of the modification example shown in FIG. 25.

FIG. 25 shows a top view of modification example with which a further improvement is added to the modification example of FIG. 24 (force receiving member 110 and connecting member 120 are omitted from illustration). The difference with respect to the modification example shown in FIG. 24 is that four "C"-shaped slits SS1 to SS4 are formed on top plate 130 as well. Each of these four "C"-shaped slits SS1 to SS4 is formed so that the open part of the letter "C" faces the center. Since FIG. 25 is somewhat complicated, a plan view, with which just top plate 130 is extracted, is shown in FIG. 26. The parts drawn in gray in this figure are the parts that are partitioned by slits SS1 to SS4.

That is, as illustrated, top plate 130 is partitioned into displaceable top plates 131 to 135, which are positioned at the center, peripheral parts 136 to 139, which are positioned at the periphery of the top plates, and four beams B1 to B4, which has flexibility and connects the top plates and peripheral parts to each other. Displaceable top plates 131 to 135, which are positioned at the center, are, as a whole, like the vanes of a fan, and are arranged so that when the X-axis and the Y-axis are projected onto this top plate 130, a first vane-like part 131 is positioned at the projected image of a positive part of the X-axis, a second vane-like part 132 is positioned at the projected image of a negative part of the X-axis, a third vane-like part 133 is positioned at the projected image of a positive part of the Y-axis, a fourth vane-like part 134 is positioned at the projected image of a negative part of the Y-axis, and a central part 135, which is connected to the inner side parts of the respective vane-like parts 131 to 134, is positioned at the projected image of the origin O. The displaceable top plates are thus formed of parts (that is, vane-like parts 131 to 134 and central part 135) of top plate 130.

Also, by the positioning of a beam between every two adjacent vane parts, central part 135 is structurally supported by the four beams B1 to B4. That is, the inner ends of the four beams B1 to B4 are connected to central part 135 and the outer ends are connected to peripheral parts 136 to 139. A force in a direction along the XY plane that acts on central part 135 is thus transmitted by the four beams B1 to B4 to peripheral parts 136 to 139 and furthermore to displaceable plates 141A to 144A. Connecting member 120 is connected to an action point Q on the top surface of central part 135 and an external force acting on force receiving member 110 is thereby transmitted to this action point. Meanwhile, action points Q1 to Q4, to which the outer ends of the four beams B1 to B4 are connected, are respectively supported by columns L1 to L4. Thus by the deflection of the four beams B1 to B4, the entirety of the displaceable top plate, having the shape of the vanes of a fan, becomes displaced with respect to peripheral parts 136 to 139. Moreover, at the positions of action points Q1 to Q4, peripheral parts 136 to 139 are connected via columns L1 to L4 to base plate 200.

By providing top plate 130 with such a structure, it becomes possible to cause large displacements to occur in regard to displaceable top plates 131 to 135, which are like the vanes of a fan, when a force Fz in the Z-axis direction, a moment Mx about the X-axis, or a moment My about the Y-axis acts on force receiving member 110. In particular, since the outer peripheral parts of vane-like parts 131 to 134 are arranged as free ends that are separated from peripheral parts 136 to 139 due to slits SS1 to SS4, comparatively large displacements can be made to occur. Moreover, the displacements of these vane-like parts 131 to 134 will not be transmitted directly to peripheral parts 136 to 139. Since forces Fz, Mx, and My, which are transmitted from connecting member 120 to action point Q, will be transmitted directly to vane-like parts 131 to 134, vane-like parts 131 to 134 will be displaced effectively based on the forces Fz, Mx, and My and these forces are thus detected effectively based on the above-described principles. Meanwhile, since the forces Fz, Mx, and My are transmitted to peripheral parts 136 to 139 only via the four beams B1 to B4, these will hardly be transmitted to displaceable plates 141 to 144 connected to peripheral parts 136 to 139. This thus satisfies the abovementioned second condition, that is, the condition that when a force Fz, Mx, or My acts on force receiving member 110, though displacements will occur with displaceable electrodes F1 to F5, which are formed at the displaceable top plate side, the displacements that occur with displaceable electrodes F6 to F9, which are formed on displaceable plates 141 to 144, will be extremely small.

Figure 27:
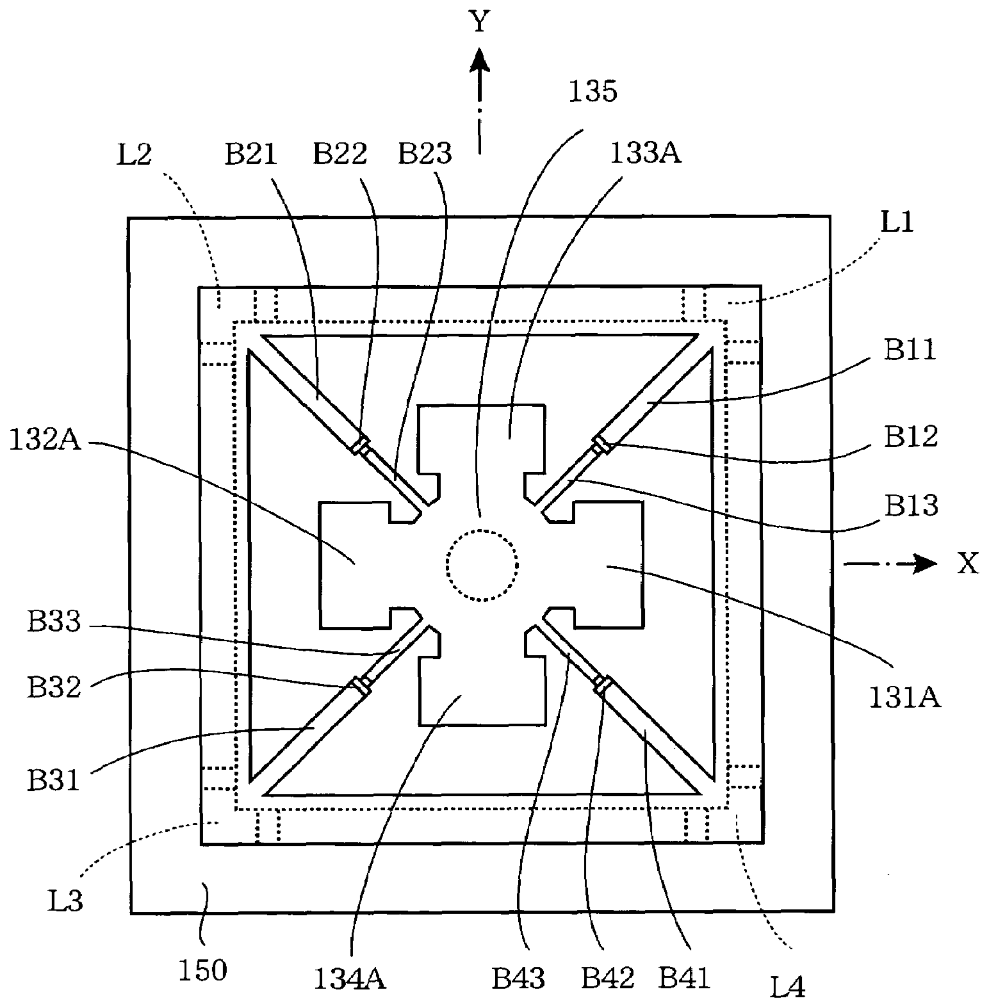
FIG. 27 is a top view of a modification example, with which the modification example of the force detection device shown in FIG. 25 is modified further (force receiving member 110 and connecting member 120 are omitted from illustration).

FIG. 27 is a top view of a modification example, with which further improvements are made on the modification example shown in FIG. 25 (force receiving member 110 and connecting member 120 are omitted from illustration). This modification example provides the merit of improving the detection sensitivity of the force detection device with the function of detecting a moment Mz about the Z-axis, which was described in §3. As was shown in FIG. 13, in order to detect a moment Mz about the Z-axis, the entirety of outer box-like structure 100 must undergo a deformation of twisting about the Z-axis. When a structure, in which central part 135 is supported by four beams B1 to B4, is employed as in the example shown in FIG. 25, since all four beams B1 to B4 are made flexible, a deformation of twisting about the Z-axis is much more likely to occur in comparison to a structure without slits, such as that shown in FIG. 13. With the modification example shown in FIG. 27, the structure of the four beams is designed so that this deformation of twisting about the Z-axis occurs even more readily.

Figure 28:
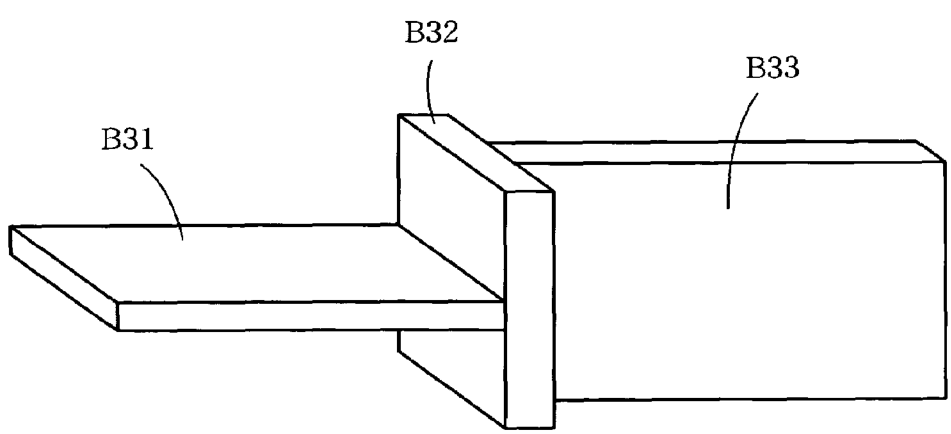
FIG. 28 is an enlarged perspective view of a beam used in the modification example shown in FIG. 27.

That is, as illustrated, the four beams making the connection between columns L1 to L4 and central part 135 are respectively formed of horizontal beams B11, B21, B31, and B41, which are positioned at the outer side, intermediate joints B12, B22, B32, and B42, which are positioned in the middle, and vertical beams B13, B23, B33, and B43, which are positioned at the inner side. FIG. 28 shows an enlarged perspective view of the third beam that is shown at the lower left of FIG. 27. As illustrated, horizontal beam B31 is a beam with which its main surface faces the horizontal direction and has the property of deflecting readily in the vertical direction. On the other hand, beam B33 is a beam with which its main surface faces the vertical direction and has the property of deflecting readily in the horizontal direction. Intermediate joint B32 is a member that connects the two types of beams at the middle. By using such a beam, a structure with which both deflection in the vertical direction and deflection in the horizontal direction occur readily can be realized and a deformation of twisting about the Z-axis can be made to occur readily, thus making it possible to detect a moment Mz about the Z-axis readily.

The modification example shown in FIG. 27 also differs from the example shown in FIG. 25 in the shape of the displaceable top plate. That is, with the example shown in FIG. 25, a displaceable top plate with the shape of the vanes of a fan is provided by four vane-like parts 131 to 134, each with the shape of an isosceles triangle, and circular central part 135, positioned at the center. On the other hand, with the modification example shown in FIG. 27, though the circular central part 135 is the same, each of the four vane-like parts 131A to 134A are changed to the shapes illustrated. These shapes correspond to displaceable electrodes FF1' to FF5', shown in FIG. 21. That is, with the modification example shown here in FIG. 27, the entirety of top plate 130 is formed of a metal or other conductive material, and the displaceable top plate with the illustrated shape functions in itself as a single common displaceable electrode. Though in order to avoid the figure from becoming too complicated, the illustration of inner box-like structure 300 is omitted from FIG. 27, in actuality, fixed electrodes EE1' to EE5' are positioned at positions of the top surface of fixed top plate 330 that are offset as shown in FIG. 21.

<<<§6. Embodiment Using a Control Member >>>

Figure 29:
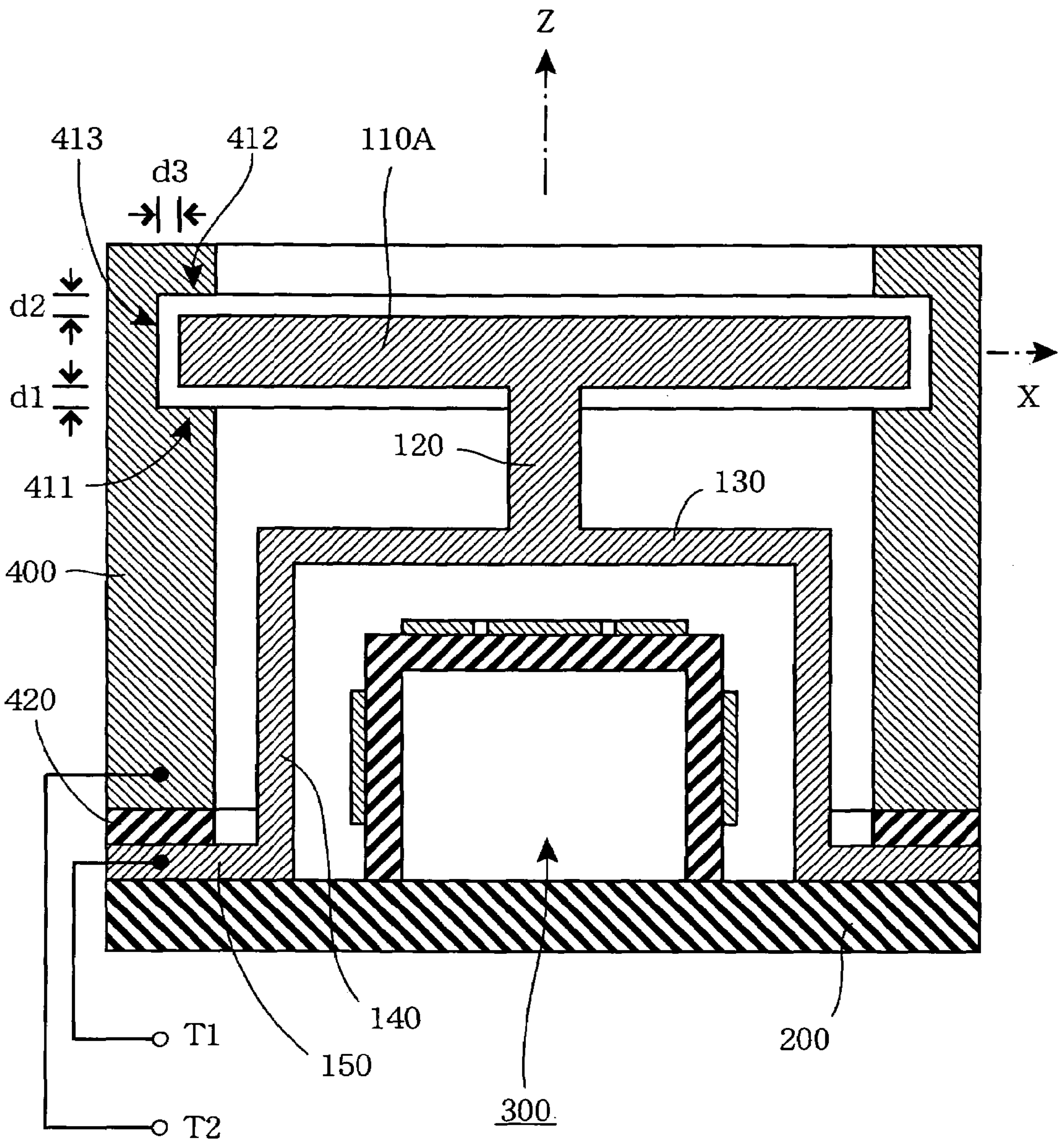
FIG. 29 is a sectional side view of a modification example, wherein a control member for controlling displacement is added to the embodiment shown in FIG. 19.

FIG. 29 is a side view in section showing the structure of a modification example with which a control member 400 is added to the force detection device of the embodiment shown in FIG. 19. As mentioned above, with the force detection device of the embodiment of FIG. 19, an external force that acts on force receiving member 110 is transmitted to outer box-like structure 100, and the acting external force is detected by recognition of the form of deformation that arises in outer box-like structure 100. Outer box-like structure 100 thus has a structure that is provided with some degree of flexibility and undergoes elastic deformation by the action of an external force. However, when an excessive external force acts on force receiving member 110, a force that exceeds the range of elastic deformation may be applied to outer box-like structure 100 and mechanical damage, such as the inability to return to the original shape even after the external force is eliminated or the forming of cracks in structural parts, etc. may be sustained.

The modification example shown in FIG. 29 is an example wherein a control member 400, for restricting the displacement of force receiving member 110 with respect to base plate 200 within a predetermined range, is provided in order to prevent mechanical damage due to the transmission of an excessive force to outer box-like structure 100 in the above-described manner. As illustrated, with this example, a control member 400, which is erected from outer peripheral parts of base plate 200, is provided. As illustrated, control surfaces 411, 412, and 413 are formed on the control member 400, and by the contacting of control surfaces 411, 412, and 413 with a force receiving member 110A, when force receiving member 110A is about to be displaced beyond a predetermined range, such excessive displacements can be prevented. Force receiving member 110A of this modification example shown in FIG. 29 is formed of a disk that is larger in diameter than force receiving member 110 shown in FIG. 19 and its circumferential parts are the surfaces opposing control surfaces 411, 412, and 413.

For example, displacement of this force receiving member 110A downward (in the −Z direction) is restricted to be within the illustrated dimension d1 by control surface 411. Even if a large downward force acts on force receiving member 110A, the bottom surface of force receiving member 110A contacts control surface 411 at the point at which the downward displacement of force receiving member 110A reaches the dimension d1 and further displacement is thus prevented.

Also, displacement of force receiving member 110A upward (in the +Z direction) is restricted to be within the illustrated dimension d2 by control surface 412. Even if a large upward force acts on force receiving member 110A, the top surface of force receiving member 110A contacts control surface 412 at the point at which the upward displacement of force receiving member 110A reaches the dimension d2 and further displacement is thus prevented.

Furthermore, displacement of force receiving member 110A in a lateral direction (in the ±X direction or ±Y direction) is restricted to be within the illustrated dimension d3 by control surface 413. Even if a large force in a lateral direction acts on force receiving member 110A, a side surface of force receiving member 110A contacts control surface 413 at the point at which the displacement of force receiving member 110A in the lateral direction reaches the dimension d3 and further displacement is thus prevented.

The force detection device shown in FIG. 29 is equipped with a function of enabling electrical detection of an anomaly when the anomalous situation of force receiving member 110 contacting any of control surfaces 411, 412, and 413 occurs. That is, with this force detection device, force receiving member 110A, connecting member 120, displaceable top plate 130, displaceable plate 140, and pedestal 150 are arranged as an integral structure formed of a metal or other conductive material, and control member 400 is also formed of a metal or other conductive material. An insulating layer 420 is inserted between pedestal 150 and control member 400 so that in the illustrated state, pedestal 150 and control member 400 are electrically insulated from each other. Also, pedestal 150 is wired to a terminal T1 and control member 400 is wired to a terminal T2.

Here, if a circuit that detects the state of electrical conduction across terminals T1 and T2 is provided, this circuit will function as a contact detection circuit that detects the state of contact of force receiving member 110A and control member 400 based on the state of electrical conduction. That is, when force receiving member 11A and control member 400 come in contact at any of the control surfaces 411, 412, and 413, since a state of electrical conduction across terminals T1 and T2 will be realized via this contacting part, the contact can be detected electrically.

By using such a function, it becomes possible, when an external force that exceeds a predetermined tolerable range is applied to the force detection device, to electrically detect this fact and issue an alarm, to record the occurrence of this fact, and take appropriate measures.

Figure 30A:
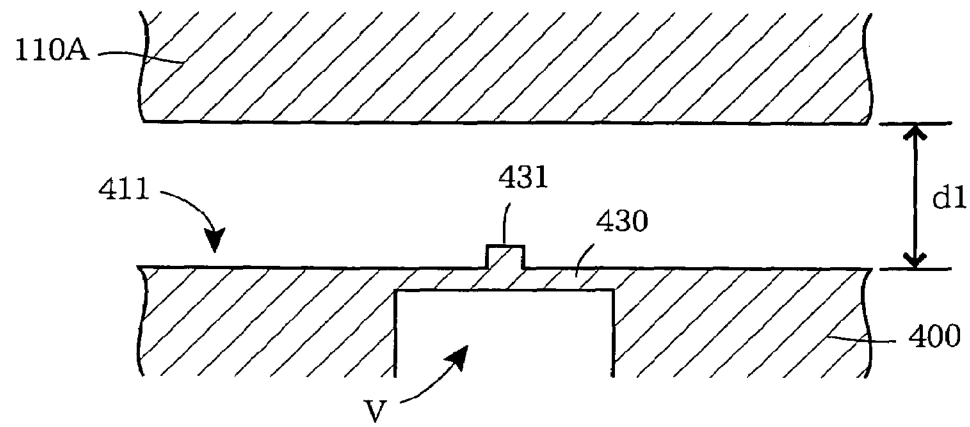
FIGS. 30A to 30C are enlarged sectional views showing a structural example and an operation of the control member of the modification example shown in FIG. 29.
Figure 30B:
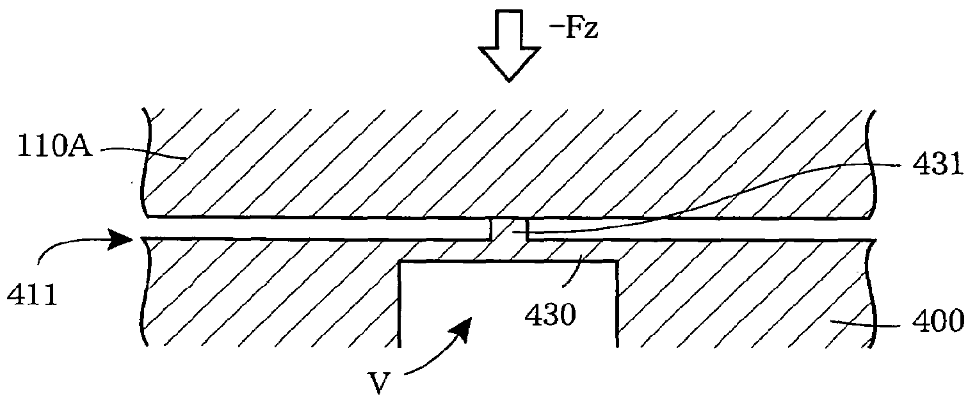
Figure 30C:
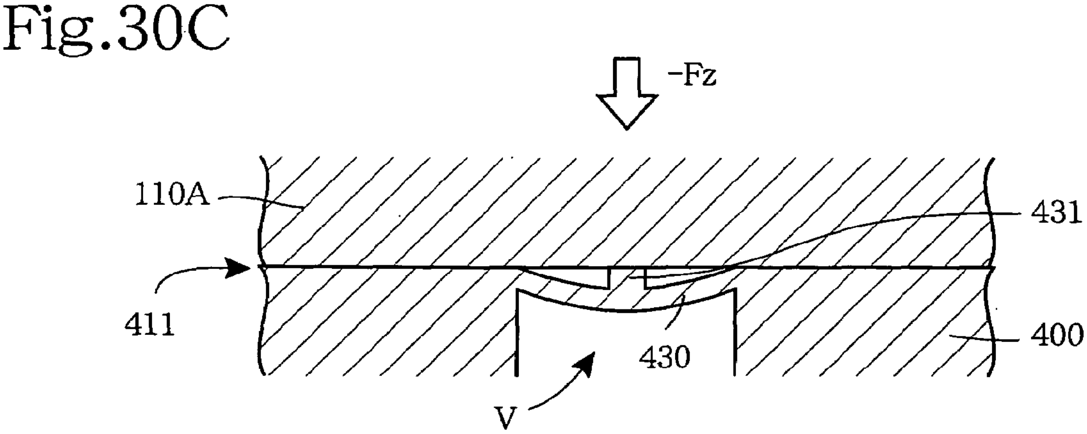

FIGS. 30A to 30C show diagrams concerning a design related to control surface 411 of the above-described force detection device shown in FIG. 29, that is, shows enlarged sectional views of an example of the structure of control surface 411 at the control member 400 side. As shown in FIG. 30A, a hollow part V is formed in the vicinity of control surface 411 of control member 400, and a thin part 430 with flexibility is formed by the surface layer part at which hollow part V is formed. Moreover, a conductive contact protrusion 431 is disposed on the top surface of this thin part 430.

FIG. 30A shows a state in which the predetermined interval d1 is maintained between control surface 411, having such a structure, and the opposing surface at the force receiving member 110A side. Here, when an external force −Fz, directed in the negative Z-axis direction (downward direction in the figure), acts on force receiving member 110A, force receiving member 110A moves downward and its bottom surface comes in contact with contact protrusion 431 as shown in FIG. 30B. When the state shown in FIG. 30B is entered, since the contacting of the components can be detected electrically as described above, measures, such as the issuing of an alarm, can be taken. When the external force −Fz increases further, thin part 430 deflects as shown in FIG. 30C and contact protrusion 431 becomes pushed in towards hollow part V. As a result, a state in which the bottom surface (the surface opposing control surface 411) of force receiving member 110 is in complete contact with control surface 411 is entered.

A merit of such an arrangement is that, electrical contact can be detected and measures, such as the issuing of an alarm, can be taken at a stage immediately prior to force receiving member 110A coming in contact with control surface 411 (that is, the stage at which contact protrusion 431 contacts force receiving member 110A as shown in FIG. 30B). In other words, whereas when the state shown in FIG. 30C is reached, since force receiving member 110A will actually collide with control surface 411 and it will be too late to take measures, such as the issuing of an alarm, etc., if measures, such as the issuing of an alarm, etc., can be taken at the stage of FIG. 30B, there is a possibility for prevention of the reaching of the state of FIG. 30C. Moreover, even when the state of FIG. 30C is reached, since contact protrusion 431 will be in a state in which it is pushed into hollow part V and will be protected, it will not break.

Though in the example illustrated in FIGS. 30A to 30C, hollow part V, thin part 430, and contact protrusion 431 are formed in the vicinity of control surface 411 at the control member 400 side, these may be formed instead in the vicinity of the opposing surface at the force receiving member 110A side.

Figure 31A:
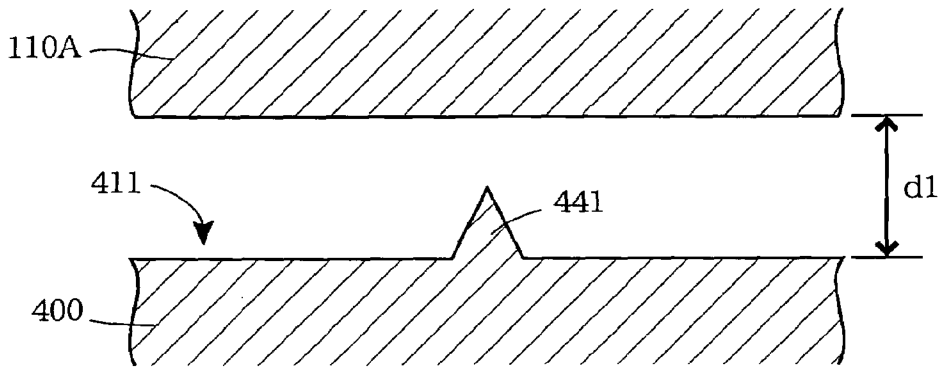
FIGS. 31A to 31C are enlarged sectional views showing another structural example and an operation of the control member of the modification example shown in FIG. 29.
Figure 31B:
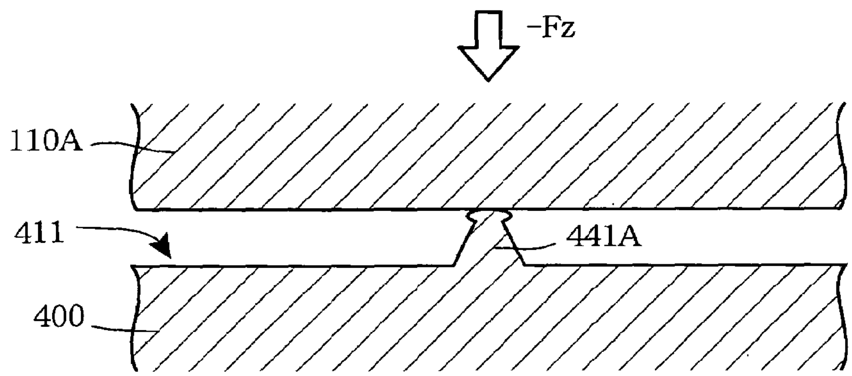
Figure 31C:
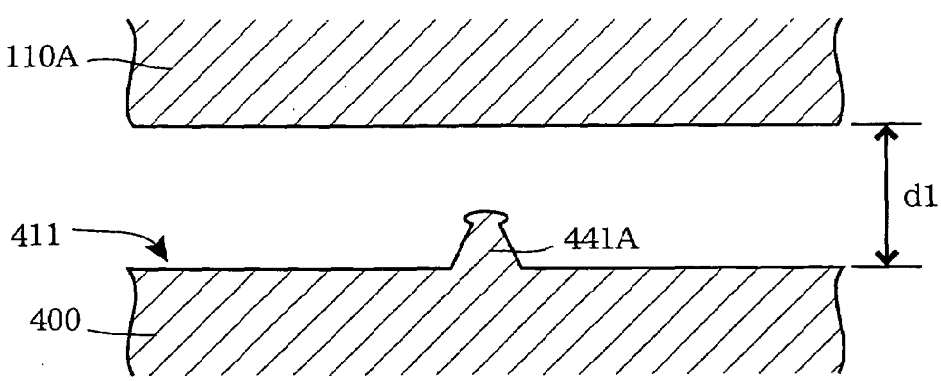

FIGS. 31A to 31C show enlarged sectional views of another design concerning control surface 411. In this example, a conductive, conical protrusion 441, the tip part of which undergoes plastic deformation, is formed on control surface 411 as shown in FIG. 31A. The material of conical protrusion 441 does not need to be made different from the material of control member 400 in order to make the tip part undergo plastic deformation. For example, by using aluminum or other general metal for control member 400 and forming conical protrusion 441 out of the same metal material, a sharp tip part will undergo some degree of plastic deformation.

FIG. 31A shows the state in which the predetermined interval d1 is maintained between control surface 411 with such a structure and the opposing surface at the force receiving member 110A side. Here, when an external force −Fz, directed in the negative Z-axis direction (downward direction in the figure) is made to act on force receiving member 110A, force receiving member 110A moves downward and its bottom surface comes in contact with the tip part of conical protrusion 441 as shown in FIG. 31B. As a result, the tip part of conical protrusion 441 becomes squashed as illustrated and conical protrusion 441 deforms to a conical protrusion 441A with a squashed tip. Since this deformation is a plastic deformation, even after the external force −Fz is removed and the interval between force receiving member 110A and control surface 411 returns to the original interval as shown in FIG. 31C, the tip of conical protrusion 441A will remain in the squashed state.

In view of such a phenomenon, it can be understood that control surface 411, provided with conical protrusion 441, is useful for realizing an accurate alarm function. This shall now be described by way of a specific example. For example, suppose that there is a need to use a force detection device that can issue some form of anomaly alarm when a load of 1 kg or more is applied to force receiving member 110A. To manufacture a force detection device that can answer this need, the dimension between force receiving member 110A and control surface 411 must be controlled accurately. However, if an actual mass production process is considered, the smaller the dimension d1 that is illustrated, the more difficult it will be to achieve accurate dimensional control and scattering of the dimensional values will occur among lots. There will thus arise a case, for example, where with one lot, an alarm is issued when a load of 0.9 kg is applied while with another lot, an alarm is not issued until a load of 1.1 kg is applied. It is thus difficult to mass produce the desired force detection device that can accurately issue an alarm when a load of 1 kg is applied.

However, by using the force detection device with control surface 411 (control surface with conical protrusion 441 formed thereon) such as shown in FIG. 31A, a device, which can accurately issue an alarm when a load of 1 kg is applied as desired, can be mass produced even if the dimensional precision according to each individual lot is not high. That is, upon mass producing a device with the structure shown in FIG. 31A, a process of accurately applying a load of 1 kg to force receiving member 110 of each device is performed. By this process, conical protrusion 441 of each lot will become a conical protrusion 441A with a squashed tip as shown in FIG. 31B, and this deformation will be maintained as a plastic deformation even after the load of 1 kg is removed as shown in FIG. 31C. Here, if the original dimensional precision of lots is not high, the form of plastic deformation will vary according to lot. However, all lots share the property that when a load of 1 kg is applied again to force receiving member 110A, the state of FIG. 31B will be entered and the squashed tip of conical protrusion 441A will contact the opposing surface of force receiving member 110A to enable an alarm to be issued. The lots will thus satisfy the desired specifications.

Needless to say, when a load, for example, of 1.2 kg is applied when such a lot is used, conical protrusion 441A will become deformed further and the lot will no longer be one that satisfies the desired specifications. However, since at least an alarm will definitely be issued at the point at which the load of 1.2 kg is applied, the lot can be handled at that point as a damaged lot. Conical protrusion 441 does not necessarily have to be disposed on control surface 411 at the control member 400 side and may instead be disposed on the opposing surface at the force receiving member 110A side (surface opposing control surface 411).

By forming, below control surface 411 on which conical protrusion 441A is formed, a hollow part V and a thin part, with flexibility, at the surface layer part (as in a structure with which conical protrusion 441A is formed in place of contact protrusion 431 in FIG. 30A), since conical protrusion 441A will become pushed into hollow part V when a large load is applied, the state of the squashed tip part of conical protrusion 441A can be maintained. In this case, since hollow part V must be formed below conical protrusion 441 from the stage illustrated in FIG. 31A, at the stage shown in FIG. 31B, that is, at the stage at which a specific load is applied to squash the tip of conical protrusion 441 and make it into conical protrusion 441A, hollow part V is temporarily filled with some form of filler so that the force will not escape to hollow part V.

<<<§7. Other Modification Examples >>>

Though this invention has been described based on the illustrated embodiments, this invention is not limited to these embodiments and can be carried out in various other modes.

For example, though with the above-described embodiments, static capacitance type force sensors are used as the X-axis distance sensor, the Y-axis distance sensor, the Z-axis distance sensor, and the inclination degree sensor, these respective sensors do not necessarily have to be static capacitance type force sensors in realizing force detection devices according to the present invention, and piezoresistance force sensors, force sensors using piezoelectric elements, etc. may be used instead. However, in terms of simplifying the structure, the use of static capacitance type force sensors as in the above-described embodiment is most preferable.

Also, detection processing unit 250, which serves the function of determining the final detection values of forces and moments, can actually be realized in various arrangements. For example, a method may be employed wherein the static capacitance values of the individual capacitance elements are measured as analog voltage values, and after conversion of these measured values into digital signals, the operations indicated by the equations in FIG. 12 or FIG. 18 are executed using a CPU or other computing device, or a method may be employed wherein the measured values of the static capacitance values of the individual capacitance elements are handled as they are in the form of analog voltage values and the final detection values are output as analog signals. In a case where the latter method is employed, the electrodes of the respective capacitance elements are connected as necessary to an analog operation circuit, comprising an analog adder or an analog subtracter.

Also, though with the embodiment shown in FIG. 24, a structure with which top plate 130 is supported by four columns L1 to L4 was described, in consideration of making top plate 130 be displaced smoothly along the XY plane, the four columns L1 to L4 are preferably formed of cylindrical columns with flexibility. Also, there is no need for the interior of inner box-like structure 300 to be hollow and the interior may instead be filled with some form of material.

Figure 32:
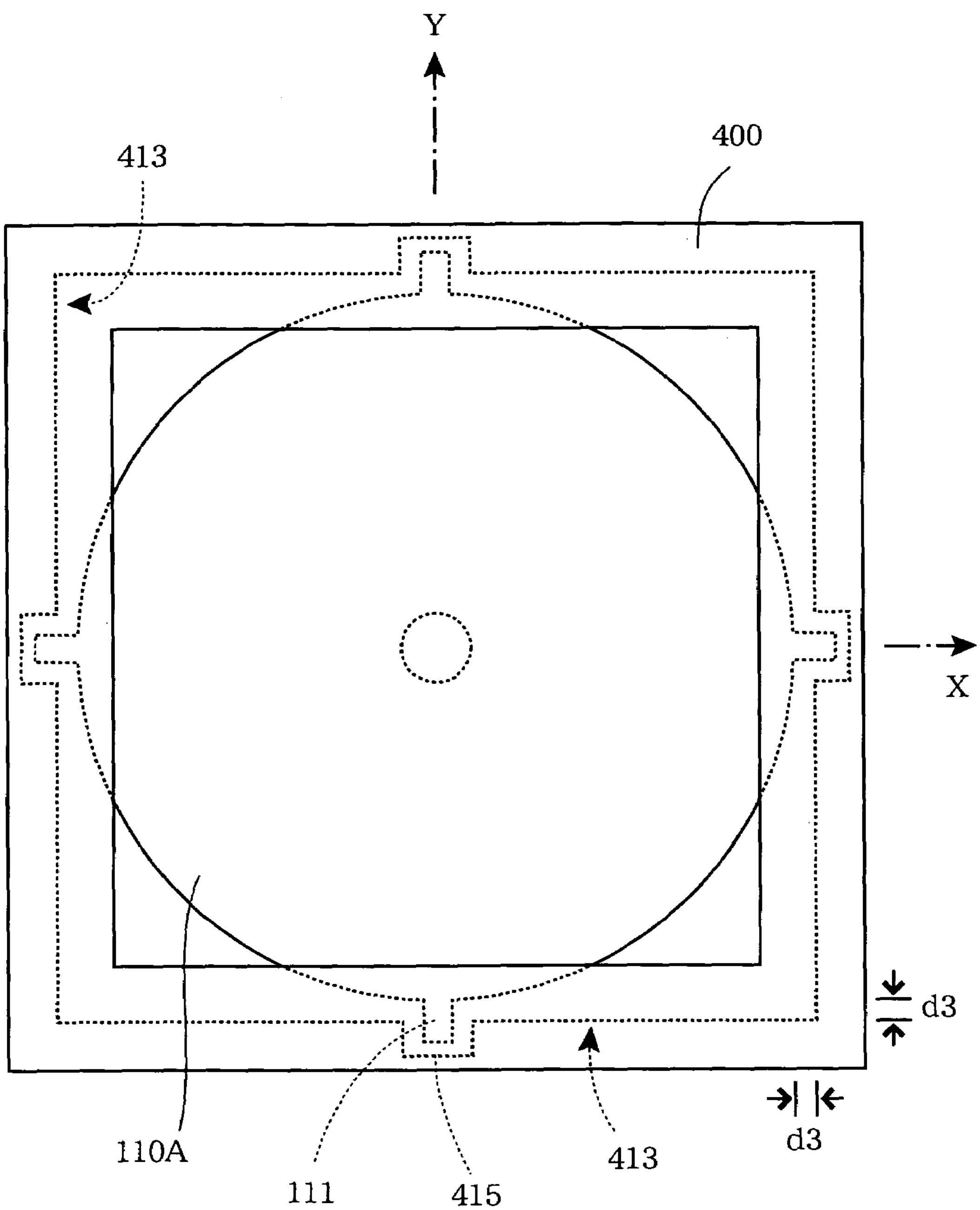
FIG. 32 is a top view showing a modification example of control member 400 shown in FIG. 29.

Lastly, a modification example of control member 400, shown in FIG. 29, shall be described. FIG. 32 is a top view of a control member 400 and a disk-like force receiving member 110A of this embodiment. As illustrated, with this example, groove parts 415 are formed at positions along the respective coordinate axes of control surface 413 and protruding parts 111 are formed at the same positions of force receiving member 110A. A certain gap is formed between each protruding part 111 and groove part 415, when an excessive moment Mz about the Z-axis acts on force receiving member 110A, protruding parts 111 contact groove parts 415 and further rotation is restricted. This modification example shown in FIG. 32 thus has, in addition to the functions of the example shown in FIG. 29, the function of restricting displacements due to a moment Mz about the Z-axis.

As described above, in a force detection device according to the present invention, forces and moments can be detected in a distinguished manner by means of a structure that is as simple as possible.

What is claimed is:

1. A force detection device comprising:

a base plate, having a top surface parallel to an XY plane in an XYZ three-dimensional coordinate system having an X-axis, a Y-axis and a X-axis;

a first displaceable plate, positioned along a plane intersecting a positive part of the X-axis and supported on said base plate in a displaceable manner;

a second displaceable plate, positioned along a plane intersecting a negative part of the X-axis and supported on said base plate in a displaceable manner;

a first fixed plate, positioned between the Z-axis and said first displaceable plate and fixed onto said base plate;

a second fixed plate, positioned between the Z-axis and said second displaceable plate and fixed onto said base plate;

a fixed top plate, positioned along a plane spanning across a vicinity of an upper edge of said first fixed plate and a vicinity of an upper edge of said second fixed plate;

a displaceable top plate, positioned above said fixed top plate, supported so as to be displaceable with respect to said base plate, and transmitting, to an upper edge of said first displaceable plate and an upper edge of said second displaceable plate, a force in a direction along the XY plane;

a force receiving member, positioned on the Z-axis above said displaceable top plate in order to receive a force that is to be detected;

a connecting member, positioned along the Z-axis in order to connect said force receiving member and said displaceable top plate;

a first X-axis distance sensor, detecting a distance between said first displaceable plate and said first fixed plate;

a second X-axis distance sensor, detecting a distance between said second displaceable plate and said second fixed plate;

an inclination degree sensor, detecting an inclination degree of said displaceable top plate with respect to said fixed top plate; and a detection processing unit, detecting a force Fx in the X-axis direction, acting on said force receiving member, based on a difference between a detection value of said first X-axis distance sensor and a detection value of said second X-axis distance sensor, and detecting a moment My about the Y-axis, acting on said force receiving member, based on a detection value of an inclination degree in relation to the X-axis direction that is detected by said inclination degree sensor.

2. The force detection device according to claim 1, further comprising:

a third displaceable plate, positioned along a plane intersecting a positive part of the Y-axis and supported on said base plate in a displaceable manner;

a fourth displaceable plate, positioned along a plane intersecting a negative part of the Y-axis and supported on said base plate in a displaceable manner;

a third fixed plate, positioned between the Z-axis and said third displaceable plate and fixed onto said base plate;

a fourth fixed plate, positioned between the Z-axis and said fourth displaceable plate and fixed onto said base plate;

a first Y-axis distance sensor, detecting a distance between said third displaceable plate and said third fixed plate; and a second Y-axis distance sensor, detecting a distance between said fourth displaceable plate and said fourth fixed plate; and wherein the detection processing unit detects a force Fy in the Y-axis direction, acting on the force receiving member, based on a difference between a detection value of said first Y-axis distance sensor and a detection value of said second Y-axis distance sensor, and detects a moment Mx about the X-axis, acting on the force receiving member, based on a detection value of an inclination degree in relation to the Y-axis direction that is detected by said inclination degree sensor.

3. The force detection device according to claim 1:

a Z-axis distance sensor, detecting a distance between the displaceable top plate and the fixed top plate;

wherein the detection processing unit detects a force Fz in the Z-axis direction, acting on the force receiving member, based on a detection value of said Z-axis distance sensor.

4. The force detection device according to claim 1:

a rotation angle sensor, detecting a rotation angle about the Z-axis of the displaceable top plate with respect to the fixed top plate;

wherein the detection processing unit detects a moment Mz about the Z-axis, acting on the force receiving member, based on a detection value of said rotation angle sensor.

5. The force detection device according to claim 1:

wherein fixed electrodes are formed on surfaces of the fixed plates that oppose the displaceable plates, displaceable electrodes are formed on surfaces of the displaceable plates that oppose the fixed plates, and distance sensors for detecting distances between said fixed plates and said displaceable plates are arranged by capacitance elements, each comprising a fixed electrode and a displaceable electrode that oppose each other, to enable detection of distances based on static capacitance values of said capacitance elements.

6. The force detection device according to claim 1:

wherein, when the X-axis and the Y-axis are projected onto a top surface of the fixed top plate, a first fixed electrode is formed on a projected image of a positive part of the X-axis and a second fixed electrode is formed on a projected image of a negative part of the X-axis;

wherein, on a bottom surface of the displaceable top plate, a first displaceable electrode is formed at a position opposing said first fixed electrode and a second displaceable electrode is formed at a position opposing said second fixed electrode; and wherein a first capacitance element is constituted of said first fixed electrode and said first displaceable electrode, a second capacitance element is constituted of said second fixed electrode and said second displaceable electrode, and these two capacitance elements are used as an inclination degree sensor arranged to detect an inclination degree in relation to the X-axis direction, based on a difference between a static capacitance value of said first capacitance element and a static capacitance value of said second capacitance element.

7. The force detection device according to claim 2:

wherein, when the X-axis and the Y-axis are projected onto a top surface of the fixed top plate, a first fixed electrode is formed on a projected image of a positive part of the X-axis, a second fixed electrode is formed on a projected image of a negative part of the X-axis, a third fixed electrode is formed on a projected image of a positive part of the Y-axis, and a fourth fixed electrode is formed on a projected image of a negative part of the Y-axis;

wherein, on a bottom surface of the displaceable top plate, a first displaceable electrode is formed at a position opposing said first fixed electrode, a second displaceable electrode is formed at a position opposing said second fixed electrode, a third displaceable electrode is formed at a position opposing said third fixed electrode, and a fourth displaceable electrode is formed at a position opposing said fourth fixed electrode; and wherein a first capacitance element is constituted of said first fixed electrode and said first displaceable electrode, a second capacitance element is constituted of said second fixed electrode and said second displaceable electrode, a third capacitance element is constituted of said third fixed electrode and said third displaceable electrode, a fourth capacitance element is constituted of said fourth fixed electrode and said fourth displaceable electrode, and these four capacitance elements are used as an inclination degree sensor arranged to detect an inclination degree in relation to the X-axis direction, based on a difference between a static capacitance value of said first capacitance element and a static capacitance value of said second capacitance element, and to detect an inclination degree in relation to the Y-axis direction, based on a difference between a static capacitance value of said third capacitance element and a static capacitance value of said fourth capacitance element.

8. The force detection device according to claim 5:

wherein, with respect to a fixed electrode and a displaceable electrode that constitute a capacitance element, an area of one electrode is set wider than an area of the other electrode so that a static capacitance value will not change when the displaceable electrode undergoes a displacement within a predetermined range in a planar direction.

9. The force detection device according to claim 8:

wherein, the fixed plates and the fixed top plate, or the displaceable plates and the displaceable top plate are formed of a conductive material, and the fixed plates and the fixed top plate, or the displaceable plates and the displaceable top plate are in themselves used as a fixed electrode or a displaceable electrode.

10. The force detection device according to claim 8:

wherein a box-like structure is formed by mutually joining the displaceable top plate and the plurality of displaceable plates, formed of a conductive material, and said box-like structure is used as a single, common displaceable electrode.

11. The force detection device according to claim 4:

wherein fixed electrodes are formed on a top surface of the fixed top plate, displaceable electrodes are formed on a bottom surface of the displaceable top plate, and the rotation angle sensor, detecting a rotation angle about the Z-axis of said displaceable top plate with respect to said fixed top plate, is arranged by capacitance elements, each comprising a fixed electrode and a displaceable electrode that oppose each other, to enable a detection of the rotation angle based on static capacitance values of said capacitance elements.

12. The force detection device according to claim 11:

wherein the displaceable electrodes are positioned at positions that are offset in a predetermined rotation direction with respect to positions that oppose the fixed electrodes to enable detection of a rotation direction along with the rotation angle based on increases or decreases of static capacitance values of the capacitance elements.

13. The force detection device according to claim 12:

wherein, when the X-axis and the Y-axis are projected onto a top surface of the fixed top plate, a first fixed electrode is formed on a projected image of a positive part of the X-axis, a second fixed electrode is formed on a projected image of a negative part of the X-axis, a third fixed electrode is formed on a projected image of a positive part of the Y-axis, and a fourth fixed electrode is formed on a projected image of a negative part of the Y-axis;

wherein, on a bottom surface of the displaceable top plate, a first displaceable electrode is formed at a position offset in a predetermined rotation direction with respect to a position opposing said first fixed electrode, a second displaceable electrode is formed at a position offset in a rotation direction with respect to a position opposing said second fixed electrode, a third displaceable electrode is formed at a position offset in a rotation direction with respect to a position opposing said third fixed electrode, and a fourth displaceable electrode is formed at a position offset in a rotation direction with respect to a position opposing said fourth fixed electrode; and wherein a first capacitance element is constituted of said first fixed electrode and said first displaceable electrode, a second capacitance element is constituted of said second fixed electrode and said second displaceable electrode, a third capacitance element is constituted of said third fixed electrode and said third displaceable electrode, a fourth capacitance element is constituted of said fourth fixed electrode and said fourth displaceable electrode, and detection of a rotation direction along with a rotation angle is enabled based on an increase or a decrease of a sum of static capacitance values of the four capacitance elements.

14. The force detection device according to claim 1:

wherein an outer box-like structure, forming a rectangular parallelepiped that is opened at a bottom surface and undergoing elastic deformation by an action of an external force, is joined so that said bottom surface is set on the base plate, side plates or a part thereof of said outer box-like structure are used as the displaceable plates, and a top plate or a part thereof of said outer box-like structure is used as the displaceable top plate.

15. The force detection device according to claim 14:

wherein U-shaped slits, opening upward, are formed in side plates of the outer box-like structure and respective parts surrounded by the respective slits are used as the displaceable plates.

16. The force detection device according to claim 15:

wherein the U-shaped slit, opening upward, is formed in each of four side plates of the outer box-like structure, edges at which two mutually adjacent side plates intersect are used as columns to arrange a structure, with which a top plate of said outer box-like structure is supported by a total of four pillars, and said outer box-like structure is made to deform by elastic deformation of the four columns.

17. The force detection device according to claim 14:

wherein an inner box-like structure, forming a rectangular parallelepiped that is smaller than the outer box-like structure, is joined onto the base plate in a state in which said inner box-like structure is contained in said outer box-like structure and side plates and a top plate of said inner box-like structure are used as the fixed plates and the fixed top plate.

18. The force detection device according to claim 1:

wherein four columns, formed of a material that undergoes elastic deformation due to an action of an external force and joined in an erected manner to the base plate, and a top plate, four corners of which are joined to upper ends of said four columns are provided; and wherein the displaceable plates are positioned between respective pairs of mutually adjacent columns, upper edges of the displaceable plate are joined to and thereby supported by edges of said top plate, and said top plate or a part thereof is used as the displaceable top plate.

19. The force detection device according to claim 14:

wherein by forming slits in the top plate, said top plate is partitioned into a displaceable top plate positioned at a center, peripheral parts positioned at a periphery of said displaceable top plate, and beams having flexibility and connecting said displaceable top plate and said peripheral parts, so that said displaceable top plate is displaced with respect to said peripheral parts by a deflection of said beams and said peripheral parts are connected to the base plate via side plates or columns of the outer box-like structure.

20. The force detection device according to claim 19:

wherein when the X-axis and the Y-axis are projected onto the top plate, a displaceable top plate having a shape of vanes of a fan is arranged from a first vane-like part, positioned on a projected image of a positive part of the X-axis, a second vane-like part, positioned on a projected image of a negative part of the X-axis, a third vane-like part, positioned on a projected image of a positive part of the Y-axis, a fourth vane-like part, positioned on a projected image of a negative part of the Y-axis, and a central part, positioned on a projected image of an origin O and connected to inner side parts of said first to fourth vane-like parts;

wherein a respective beam is positioned between every two mutually adjacent vane-like parts so that said central part is supported by four beams; and wherein said four beams are connected to said central part at their inner ends and connected to the peripheral parts at their outer ends and the connecting member is connected to a top surface of said central part.

21. The force detection device according to claim 20:

wherein each beam comprises: a horizontal beam, whose main surface faces a horizontal direction; a vertical beam whose main surface faces a vertical direction; and an intermediate joint, connecting said horizontal beam and said vertical beam; and is thereby made a structure with which both deflection in the horizontal direction and deflection in the vertical direction can occur readily.

22. The force detection device according to claim 1:

wherein a control member is provided, which, in order to restrict displacements of the force receiving member with respect to the base plate within predetermined ranges, has control surfaces that contact said force receiving member when said force receiving member is about to become displaced beyond said predetermined range.

23. The force detection device according to claim 22:

wherein at least a part of the force receiving member and a part of the control member that are involved in contact are formed of a conductive material, and a contact detection circuit, detecting a state of contact of said force receiving member and said control member based on a state of electrical conduction, is provided.

24. The force detection device according to claim 23:

wherein a hollow part is formed in a vicinity of a control surface of the control member or an opposing surface of the force receiving member that opposes said control surface, a surface layer part at which the hollow part is formed is arranged as a thin part with flexibility, a conductive contact protrusion is formed on a surface of said thin part, and a state of electrical conduction by contacting of said contact protrusion with said opposing surface or said control surface is arranged to be detected prior to contacting of said opposing surface and said control surface.

25. The force detection device according to claim 24:

wherein a conductive conical protrusion, a tip part of which undergoes plastic deformation, is provided on the control surface of the control member or a surface of the force receiving member that opposes said control surface.

* * * * *